United States Patent
Uesugi et al.

(10) Patent No.: US 11,650,516 B2
(45) Date of Patent: May 16, 2023

(54) DEVELOPING APPARATUS, ELECTROPHOTOGRAPHY PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Tomoya Uesugi, Shizuoka (JP); Kazuaki Nagaoka, Shizuoka (JP); Toru Ishii, Shizuoka (JP); Ryo Sugiyama, Shizuoka (JP); Akio Nishi, Tokyo (JP); Kentaro Yamawaki, Shizuoka (JP); Minoru Nakamura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/659,418

(22) Filed: Apr. 15, 2022

(65) Prior Publication Data

US 2022/0236663 A1 Jul. 28, 2022

Related U.S. Application Data

(63) Continuation of application No. PCT/JP2020/039611, filed on Oct. 21, 2020.

(30) Foreign Application Priority Data

Oct. 23, 2019 (JP) .............................. JP2019-192787
Jul. 29, 2020 (JP) .............................. JP2020-128321

(51) Int. Cl.
 *G03G 15/08* (2006.01)
(52) U.S. Cl.
 CPC ..... *G03G 15/0818* (2013.01); *G03G 15/0806* (2013.01); *G03G 15/0808* (2013.01);
 (Continued)

(58) Field of Classification Search
 CPC .......... G03G 15/0806; G03G 15/0808; G03G 15/0818; G03G 2215/0858; G03G 2215/0861
 See application file for complete search history.

(56) References Cited

U.S. PATENT DOCUMENTS 7,727,134 B2  6/2010  Nakamura et al.
7,797,833 B2  9/2010  Nakamura et al.
(Continued)

FOREIGN PATENT DOCUMENTS

JP  2009-237463 A  10/2009
JP  2014-197064 A  10/2014
(Continued)

OTHER PUBLICATIONS

U.S. Appl. No. 17/663,305, Akio Nishi, filed May 13, 2022.

*Primary Examiner* — Joseph S Wong
(74) *Attorney, Agent, or Firm* — Venable LLP

(57) ABSTRACT

Provided is a developing device including: a toner; and a developer carrying member. The developer carrying member includes an electroconductive substrate and a surface layer on the substrate, the surface layer being a single layer and including a matrix containing a crosslinked urethane resin as a binder, wherein $E1 \geq 200$ MPa and $10$ MPa$\leq E2 \leq 100$ MPa, where E1 is an elastic modulus of the matrix in a first region from an outer surface of the surface layer to a depth of 0.1 and E2 is an elastic modulus of the matrix in a second region from a depth of 1.0 to 1.1 μm from the outer surface. The toner includes a toner particle containing a binder resin and a colorant and having a Martens hardness of 85 to 1,100 MPa when measured under a condition of a maximum load of $2.0 \times 10^{-4}$ N.

12 Claims, 4 Drawing Sheets

(52) U.S. Cl.
CPC ............... *G03G 2215/0858* (2013.01); *G03G 2215/0861* (2013.01)

(56) References Cited

U.S. PATENT DOCUMENTS

| | | | |
|---|---|---|---|
| 7,798,948 B2 | 9/2010 | Kawamura et al. | |
| 7,799,398 B2 | 9/2010 | Nakamura et al. | |
| 8,176,632 B2 | 5/2012 | Kawamura et al. | |
| 8,600,273 B2 | 12/2013 | Yamada et al. | |
| 8,655,222 B2 | 2/2014 | Nakamura et al. | |
| 8,655,238 B2 | 2/2014 | Uno et al. | |
| 8,706,011 B2 | 4/2014 | Anan et al. | |
| 8,745,870 B2 | 6/2014 | Kawamura et al. | |
| 8,768,227 B2 | 7/2014 | Urushihara et al. | |
| 8,798,508 B2 | 8/2014 | Yamada et al. | |
| 8,837,985 B2 | 9/2014 | Ishida et al. | |
| 8,846,287 B2 | 9/2014 | Yamada et al. | |
| 8,874,007 B2 | 10/2014 | Kawamura et al. | |
| 8,913,930 B2 | 12/2014 | Ishii et al. | |
| 9,017,239 B2 | 4/2015 | Ishida et al. | |
| 9,625,854 B2 | 4/2017 | Koyanagi et al. | |
| 9,846,407 B2 | 12/2017 | Nakamura et al. | |
| 9,921,518 B2 | 3/2018 | Sakurai et al. | |
| 9,952,531 B2 | 4/2018 | Ishii et al. | |
| 9,952,532 B2 | 4/2018 | Sugiyama et al. | |
| 10,031,438 B2 | 7/2018 | Wakabayashi et al. | |
| 10,310,447 B2 | 6/2019 | Morishita et al. | |
| 10,539,891 B1 | 1/2020 | Ishii et al. | |
| 10,571,825 B1 | 2/2020 | Urushihara et al. | |
| 10,635,019 B2 | 4/2020 | Doi et al. | |
| 10,642,186 B2 | 5/2020 | Sakurai et al. | |
| 10,678,161 B2 | 6/2020 | Tsuru et al. | |
| 10,705,449 B2 | 7/2020 | Ishida et al. | |
| 10,712,684 B2 | 7/2020 | Wakabayashi et al. | |
| 10,732,538 B2 | 8/2020 | Moriai et al. | |
| 10,747,130 B2 | 8/2020 | Okuda et al. | |
| 10,831,126 B2 | 11/2020 | Matsunaga et al. | |
| 10,831,127 B2 | 11/2020 | Utsuno et al. | |
| 10,935,903 B2 | 3/2021 | Sugiyama et al. | |
| 10,942,471 B2 | 3/2021 | Ogawa et al. | |
| 10,976,683 B2 | 4/2021 | Ishida et al. | |
| 2009/0010684 A1* | 1/2009 | Satoh | G03G 15/0818 399/286 |
| 2009/0245892 A1 | 10/2009 | Obara | |
| 2013/0130022 A1 | 5/2013 | Uesugi et al. | |
| 2013/0164038 A1 | 6/2013 | Kusaba et al. | |
| 2013/0266339 A1 | 10/2013 | Sugiyama et al. | |
| 2015/0248101 A1 | 9/2015 | Hayashi | |
| 2017/0139336 A1 | 5/2017 | Nagaoka et al. | |
| 2017/0293238 A1* | 10/2017 | Kawamura | G03G 15/0818 |
| 2018/0329327 A1 | 11/2018 | Yamawaki | |
| 2019/0369529 A1 | 12/2019 | Yagi et al. | |
| 2020/0041921 A1 | 2/2020 | Yamaguchi et al. | |
| 2020/0310283 A1* | 10/2020 | Ogawa | G03G 15/0818 |
| 2022/0100113 A1 | 3/2022 | Tanaka et al. | |

FOREIGN PATENT DOCUMENTS

| | | |
|---|---|---|
| JP | 2017-49282 A | 3/2017 |
| JP | 2018-194837 A | 12/2018 |

* cited by examiner

DEVELOPING APPARATUS, ELECTROPHOTOGRAPHY PROCESS CARTRIDGE, AND ELECTROPHOTOGRAPHIC IMAGE FORMING APPARATUS

CROSS-REFERENCE TO RELATED APPLICATIONS

This application is a Continuation of International Patent Application No. PCT/JP2020/039611, filed Oct. 21, 2020, which claims the benefit of Japanese Patent Application No. 2019-192787 filed on Oct. 23, 2019 and Japanese Patent Application No. 2020-128321 filed on Jul. 29, 2020, all of which are hereby incorporated by reference herein in their entirety.

BACKGROUND

Technical Field

The present disclosure relates to a developing device to be incorporated into an apparatus adopting an electrophotographic system. The present disclosure also relates to an electrophotographic process cartridge and an electrophotographic image forming apparatus each including the developing device.

Description of the Related Art

In an electrophotographic image forming apparatus (also referred to as "electrophotographic apparatus"), a developing device includes a developer carrying member for carrying a developer (toner) on its surface, and serves to supply the toner on the developer carrying member to an electrostatic latent image on an electrophotographic photosensitive member to form a toner image.

In recent years, a further increase in speed of the electrophotographic apparatus, a further improvement in image quality thereof, and a further improvement in durability thereof have started to be required. Accordingly, in the developing device, the improvements of the developer carrying member and the toner have been performed for suppressing a reduction in developability.

In, for example, Japanese Patent Application Laid-Open No. 2014-197064, there are disclosures of a modified rubber elastic body including a rubber elastic body having rubber elasticity and a surface-treated layer including a cured product of a photocurable composition impregnated from the surface of the rubber elastic body, and an electrophotographic member using the modified rubber elastic body. The photocurable composition contains a (meth)acrylic monomer, a photopolymerizable polymer having a silicone group and/or a fluorine-containing group, and a (meth)acryloyl group in a molecule thereof, and a photopolymerization initiator. In addition, in the literature, there is a description that according to such electrophotographic member, both of toner releasability and a low friction property are achieved.

Meanwhile, in the toner, quick charge rise-up by triboelectric charging has started to become necessary, and hence an improvement in abrasion resistance has been required. In, for example, Japanese Patent Application Laid-Open No. 2018-194837, there is a disclosure of a high-hardness toner whose Martens hardness is specified. In the literature, there is a description that the high-hardness toner is significantly improved in abrasion resistance, and hence even when high-speed continuous printing is performed at a high print percentage, charge rise-up is satisfactory, and a development stripe and a ghost hardly occur.

The inventors have performed a test in which a developing device including a developer carrying member formed of such modified rubber elastic body as described in Japanese Patent Application Laid-Open No. 2014-197064 and such high-hardness toner as described in Japanese Patent Application Laid-Open No. 2018-194837 is used in the formation of many electrophotographic images under a high-temperature and high-humidity environment. As a result, although a development stripe and a ghost are satisfactorily suppressed, an image detrimental effect, such as density unevenness or leakage, caused by filming or a flaw on the surface of the developer carrying member has occurred in some cases. Further, when a fogging evaluation is performed after the use in the formation of many electrophotographic images under the high-temperature and high-humidity environment, it has been impossible to satisfy fogging performance in some cases.

SUMMARY OF THE DISCLOSURE

At least one aspect of the present disclosure is directed to providing a developing device that can satisfactorily suppress a development stripe, a ghost, filming and a flaw on the surface of its developer carrying member, and fogging at the same time even when used in the formation of many electrophotographic images under a high-temperature and high-humidity environment. In addition, other aspects of the present disclosure are directed to providing an electrophotographic process cartridge and an electrophotographic image forming apparatus each including the developing device. According to one aspect of the present disclosure, there is provided a developing device including: a toner; and a developer carrying member configured to carry the toner on a surface thereof. The developer carrying member includes an electroconductive substrate and a surface layer on the substrate, the surface layer being a single layer and including a matrix containing a crosslinked urethane resin as a binder. $E1 \geq 200$ MPa and $10 \text{ MPa} \leq E2 \leq 100$ MPa, where $E1$ is an elastic modulus of the matrix in a first region from an outer surface of the surface layer to a depth of 0.1 μm, measured in a cross section of the surface layer in a thickness direction, and $E2$ is an elastic modulus of the matrix in a second region from a depth of 1.0 to 1.1 μm from the outer surface, measured in a cross section of the surface layer in a thickness direction. The toner includes a toner particle containing a binder resin and a colorant and having a Martens hardness of 85 to 1,100 MPa when measured under a condition of a maximum load of $2.0 \times 10^{-4}$ N. According to further aspect of the present disclosure, there is provided an electrophotographic process cartridge which is detachably attachable to an electrophotographic image forming apparatus, comprising the afore-mentioned developing device. According to still further aspect of the present disclosure, there is provide an electrophotographic image forming apparatus comprising at least the afore mentioned developing device.

Further features of the present disclosure will become apparent from the following description of exemplary embodiments with reference to the attached drawings.

DESCRIPTION OF THE EMBODIMENTS

Figure 1A:
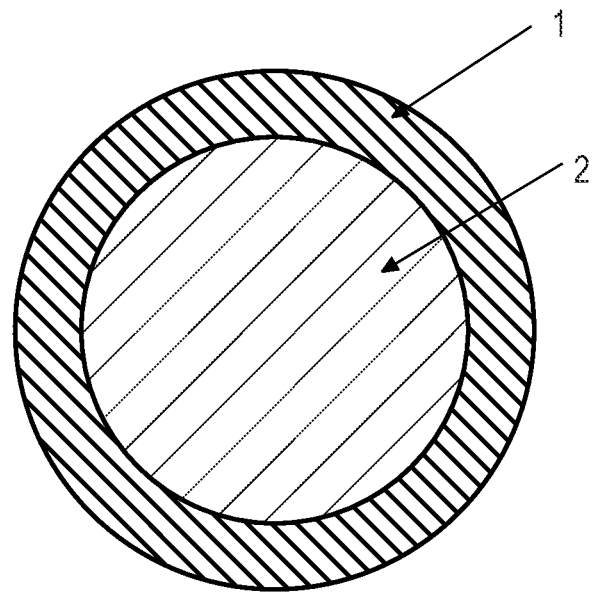
FIG. 1A is a schematic view for illustrating a developer carrying member according to one aspect of the present disclosure.

The inventors have investigated the problems when the developer carrying member of Japanese Patent Application Laid-Open No. 2014-197064 and the toner of Japanese Patent Application Laid-Open No. 2018-194837 are combined. The inventors have conceived a cause for the fact that particularly when the combination is used in the formation of many electrophotographic images under a high-temperature and high-humidity environment, filming and a flaw on the surface of the developer carrying member, and fogging cannot be satisfactorily suppressed at the same time in some cases to be as described below.

Unlike ordinary cases, when the combination is used in the formation of many electrophotographic images under the high-temperature and high-humidity environment, the developer carrying member of Japanese Patent Application Laid-Open No. 2014-197064 has high hardness and low flexibility, and hence a load on the toner is large. Accordingly, the surface of the developer carrying member has been filmed with the deteriorated toner in some cases. In addition, the toughness of an acrylic polymer present on the surface of the developer carrying member is low, and hence a crack is liable to occur owing to the rubbing of the member with any other member containing a developer. Accordingly, a flaw has occurred on the surface of the developer carrying member in some cases. Further, when the strength of the toner is reduced, the filming is liable to occur, and when the strength of the toner is improved, a flaw is liable to occur on the surface of the developer carrying member. Accordingly, it has been difficult to achieve both the suppressions of the filming and a flaw.

Next, an assumption made by the inventors for the cause by which the fogging performance could not be satisfied is described below. When the developer carrying member of Japanese Patent Application Laid-Open No. 2014-197064 and the high-hardness toner described in Japanese Patent Application Laid-Open No. 2018-194837 are combined, the flexibility of the developer carrying member is low, and hence an area of contact between both the member and the toner cannot be sufficiently secured. The inventors have conceived that as a result of the foregoing, the toner slid on the developer carrying member to preclude sufficient performance of triboelectric charging of the toner by the rolling thereof, and hence the fogging worsened.

<<Developing Device>>

In view of the foregoing, the inventors have made extensive investigations, and as a result, have found that the above-mentioned problems can be solved by using a developing device in which a developer carrying member whose surface has high hardness but has flexibility, and a high-hardness toner are combined.

That is, the developing device of the present disclosure includes: a toner; and a developer carrying member configured to carry the toner on a surface thereof, wherein the developer carrying member includes an electroconductive substrate and a surface layer, which is a single layer, on the substrate. The surface layer includes a matrix containing a crosslinked urethane resin as a binder. Herein, $E1 \geq 200$ MPa and $10 \text{ MPa} \leq E2 \leq 100$ MPa where E1 is an elastic modulus of the matrix in a first region from an outer surface of the surface layer to a depth of 0.1 μm, and E2 is an elastic modulus of the matrix in a second region corresponding to a depth of from 1.0 μm to 1.1 μm from the outer surface, the elastic moduli being measured in a section in a thickness direction of the surface layer.

In addition, the toner includes a toner particle, the toner particle containing a binder resin and a colorant, and the toner particle has a Martens hardness of 85 to 1,100 MPa when measured under a condition of a maximum load of $2.0 \times 10^{-4}$ N.

The inventors have assumed the reason why the developing device having such configuration can solve the problems to be as described below.

First, the inventors have conceived that the reason why both the suppressions of filming and a flaw were able to be achieved is the optimization of elastic moduli in a depth direction in the surface layer of the developer carrying member. That is, the inventors have conceived that an increase in hardness of only the outermost surface of the developer carrying member was able to suppress a flaw on the surface of the developer carrying member, and at the same time, the impartment of flexibility to the developer carrying member was able to reduce a load on the toner to suppress the filming. Details about the foregoing are described below.

The crosslinked urethane resin incorporated as the binder into the matrix of the surface layer is obtained by a formation method including causing a hydroxy group of a polyol and an isocyanate compound to react with each other to crosslink urethane bonds. The term "crosslinked" as used herein means that the structure of the urethane resin to be obtained is not a linear structure, and the resin is a urethane resin in which one, or each of both, of the polyol and the isocyanate compound has three or more reactive functional groups to form a three-dimensional network structure.

In addition, in the present disclosure, the elastic modulus E1 of the first region near the outer surface is set to a high value, and the elastic modulus E2 of the second region having a predetermined depth is set to a low value.

To that end, for example, an interpenetrating polymer network structure is formed for the crosslinked urethane resin for forming the matrix of the surface layer in order to increase the elastic modulus on the surface side. The interpenetrating polymer network structure (hereinafter referred to as "IPN structure") is a structure in which the network structures of two or more polymers are intertwined and entangled with each other without being bonded to each other through a covalent bond. In addition, the structure is not loosened unless molecular chains for forming its network are cleaved.

In the present disclosure, the IPN structure of the crosslinked urethane resin and a crosslinked acrylic resin, the structure having a thickness of about 1 is formed in the depth direction from the surface of the surface layer. Under a high-temperature and high-humidity environment, an improvement in strength of the surface layer by the introduction of the IPN structure involves antinomy between a flaw due to shaving and filming along with the deterioration of the toner. That is, when the IPN structure is thickly formed in the depth direction from the outer surface, a flaw due to the shaving of the surface of the developer carrying member can be suppressed, but a load on the toner becomes higher to worsen the filming on the surface of the developer carrying member. Meanwhile, when the IPN structure is thinly formed in the depth direction from the outer surface, the load on the toner is alleviated, and hence the filming on the surface of the developer carrying member can be suppressed. However, there is no choice but to reduce the amount of the crosslinked acrylic resin, and hence the strength of the outer surface is not sufficiently secured, thereby worsening a flaw due to the shaving. A method of improving the strength may be, for example, an approach including significantly increasing the crosslinking density of a rubber for forming the surface of the developer carrying member. In the case of such approach, however, an increase in hardness of the surface layer advances along with the improvement in strength. Accordingly, the load on the toner becomes higher to worsen the filming on the surface of the developer carrying member. In addition, when the strength is improved by such approach, the member may be reduced in pliability to embrittle, and hence a flaw due to the shaving is rather worsened. Accordingly, in a system using the developing device including such developer carrying member, density unevenness caused by the filming on the surface of the developer carrying member and leakage caused by a flaw on the surface of the developer carrying member occur in a trade-off manner.

The developer carrying member in the configuration of the present disclosure expresses its strength and flexibility because the improvement in strength by, for example, the IPN structure by the crosslinked acrylic resin is locally present extremely near the outer surface of the surface layer. Accordingly, there is no need to unnecessarily increase the crosslinking density, and hence the pliability and flexibility of the member are not lost. Accordingly, despite the fact that the developer carrying member in the present disclosure has high strength, a load on the toner is suppressed, and hence the filming does not worsen. That is, a flaw due to the shaving of the surface of the developer carrying member and the filming on the surface of the developer carrying member can be suppressed at an extremely high level. In other words, in the present disclosure including such developer carrying member as described above, the density unevenness caused by the filming on the surface of the developer carrying member and the leakage caused by a flaw on the surface of the developer carrying member can be suppressed at a high level.

Next, the reason why the use of the developing device of the present disclosure was able to satisfy the fogging performance is described. The developer carrying member of the present disclosure has flexibility, and hence can follow the high-hardness toner so as to enclose the toner. Accordingly, both the developer carrying member and the toner can be brought into close contact with each other, and hence the toner is strongly rubbed with the developer carrying member. The inventors have assumed that as a result of the foregoing, the triboelectric charging of the toner was sufficiently performed by the rolling thereof to provide satisfactory fogging performance.

The hardness (85 to 1,100 MPa) of the toner of the present disclosure has a wider range in low hardnesses than the hardness (200 to 1,100 MPa or less) of the toner of Japanese Patent Application Laid-Open No. 2018-194837 does. It is probably as a result of the following that a development stripe and a ghost are satisfactorily suppressed even when a toner having a low hardness (85 MPa or more and less than 200 MPa) is used: the developer carrying member of the present disclosure has flexibility, and hence a load on the toner is small and damage thereto is suppressed.

<<Developer Carrying Member>>

In the developer carrying member of the present disclosure, the elastic modulus $E1$ of the first region is 200 MPa ($200\times10^6$ Pa) or more, and hence a flaw due to the shaving of the surface of the member and the filming on the surface can be suppressed at an extremely high level.

Meanwhile, in the configuration of the present disclosure, the vicinity of the outer surface of the surface layer has high hardness, and the inside of the surface layer sufficiently holds flexibility. Accordingly, a flaw due to the shaving and the filming can be suppressed at an extremely high level. When the elastic modulus of the second region corresponding to a depth of from 1.0 μm to 1.1 μm from the outer surface is defined as $E2$, the $E2$ is 10 to 100 MPa ($100\times10^6$ Pa), preferably 20 to 50 MPa. Although the upper limit of the elastic modulus $E1$ of the first region is not particularly limited, the upper limit is set within an appropriate range in consideration of its relationships with the elastic modulus $E2$ of the second region and the elastic modulus $E3$ of a third region to be described later. Typically, the elastic modulus $E1$ of the first region is preferably 4,500 MPa ($4,500\times10^6$ Pa) or less. In addition, the surface layer may contain a surfactant, such as a modified silicone compound or a modified fluorine compound, in addition to the crosslinked urethane resin. The surfactant may simultaneously have a low-polarity group, such as a silicone-containing group or a fluorine-containing group, and a high-polarity group that is present at a modified site thereof. A difference in polarity between a urethane group of the crosslinked urethane resin or any other high-polarity group and the low-polarity group, such as a silicone-containing group or a fluorine-containing group, in a molecule of the surfactant is large, and hence the surfactant migrates to the vicinity of the outer surface of the surface layer to stay there. Further, in the case where the crosslinked urethane resin containing the surfactant is swollen with an acrylic monomer and a polymerization initiator from the outer surface, when the acrylic monomer whose polarity is different from that of the high-polarity group in a molecule of the surfactant to a small extent is used, the acrylic monomer stays near the surfactant. That is, the acrylic monomer stays near the outer surface to cure, and hence the IPN structure can be locally formed near the outer surface of the surface layer.

The developer carrying member according to the present disclosure is described below by taking a developing roller that is a roller shape as an example. However, the shape of the developer carrying member is not limited thereto.

Figure 1B:
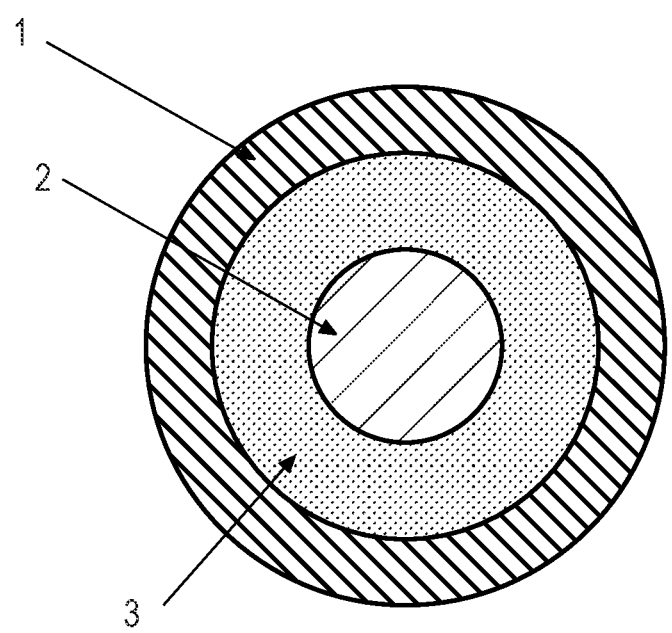
FIG. 1B is a schematic view for illustrating a developer carrying member according to one aspect of the present disclosure.

FIG. 1A is a sectional view in the circumferential direction of a developer carrying member of a roller shape including an electroconductive mandrel 2 serving as an electroconductive substrate and a surface layer 1 on the peripheral surface of the substrate. FIG. 1B is a sectional view in the circumferential direction of a developer carrying member of a roller shape including the mandrel 2 serving as an electroconductive substrate, the surface layer 1, and an intermediate layer 3 arranged between the surface layer 1 and the mandrel 2. The intermediate layer 3 is not limited to a single layer, and may include layers. In, for example, a nonmagnetic one-component contact development process, a developer carrying member in which the surface layer 1 is arranged on an electroconductive substrate obtained by laminating the intermediate layer 3 on the mandrel 2 is suitably used.

[Electroconductive Substrate]

A columnar or hollow cylindrical electroconductive mandrel, or a product obtained by further arranging one or more of electroconductive intermediate layers on such mandrel may be used as the electroconductive substrate. The shape of the mandrel is a columnar shape or a hollow cylindrical shape, and the mandrel includes any one of the following electroconductive materials: a metal or an alloy, such as aluminum, a copper alloy, or stainless steel; iron subjected to plating treatment with chromium or nickel; and a synthetic resin having electroconductivity. A known adhesive may be applied to the surface of the mandrel 2 for the purpose of improving its adhesive property with, for example, the intermediate layer 3 or the surface layer 1 on its outer periphery.

[Intermediate Layer]

As described above, in the nonmagnetic one-component contact development process, a developing roller in which the intermediate layer 3 is laminated between the mandrel 2 and the surface layer 1 is suitably used. The intermediate layer imparts, to the developing roller, such hardness and elasticity that the roller is pressed against an image-bearing member at an appropriate nip width and an appropriate nip pressure so that a toner can be supplied to an electrostatic latent image formed on the surface of the image-bearing member without excess and without insufficiency. Typically, the intermediate layer is preferably formed from a molded body of a rubber material. Examples of the rubber material include the following materials: an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluorine rubber, a silicone rubber, an epichlorohydrin rubber, a hydrogenated product of NBR, and a urethane rubber. Those rubber materials may be used alone or in combination thereof. Of those, a silicone rubber is particularly preferred because the rubber hardly causes a permanent compression set even when any other member (e.g., a toner-regulating member) is brought into abutment with the layer over a long time period. A specific example of the silicone rubber is a cured product of an addition-curable silicone rubber.

The intermediate layer may be an intermediate layer obtained by blending the rubber material with an electroconductivity-imparting agent, such as an electron conductive substance or an ion conductive substance. The volume resistivity of the intermediate layer is adjusted to preferably $10^3$ to $10^{11}$ Ωcm, more preferably $10^4$ to $10^{10}$ Ωcm.

Examples of the electron conductive substance include the following substances: carbon blacks, such as electroconductive carbons, carbons for rubbers, and carbons for colors (inks); for example, electroconductive carbon blacks, such as ketjen black EC and acetylene black; carbons for rubbers, such as SAF, ISAF, HAF, FEF, GPF, SRF, FT, and MT; carbons for colors (inks) each subjected to oxidation treatment; and metals, such as copper, silver, and germanium, and metal oxides thereof. Of those, electroconductive carbons [electroconductive carbons, carbons for rubbers, and carbons for colors (inks)] are preferred because the carbons each easily control the electroconductivity of the intermediate layer even when used in a small amount.

Examples of the ion conductive substance include the following substances: inorganic ion conductive substances, such as sodium perchlorate, lithium perchlorate, calcium perchlorate, and lithium chloride; and organic ion conductive substances, such as a modified aliphatic dimethylammonium ethosulfate and stearylammonium acetate.

Each of those electroconductivity-imparting agents, which is used in an amount required to adjust the volume resistivity of the intermediate layer to such an appropriate value as described above, is typically used in an amount in the range of from 0.5 to 50 parts by mass with respect to 100 parts by mass of a binder resin.

In addition, various additives, such as a plasticizer, a filler, an extender, a vulcanizing agent, a vulcanization aid, a crosslinking aid, a curing inhibitor, an antioxidant, an age inhibitor, and a processing aid, may each be further incorporated into the intermediate layer as required. Examples of the filler include silica, quartz powder, and calcium carbonate. Those optional components are each blended in an amount in such a range that the function of the intermediate layer is not inhibited.

The intermediate layer has elasticity required for the developer carrying member, and preferably has an Asker C hardness of 20° to 100°, and a thickness of 0.3 to 6.0 mm.

The respective materials for the intermediate layer may be mixed with a dynamic mixing device, such as a uniaxial continuous kneader, a biaxial continuous kneader, a twin roll, a kneader mixer, or Trimix, or a static mixing device such as a static mixer.

A method of forming the intermediate layer on the mandrel is not particularly limited, and examples thereof may include a mold molding method, an extrusion molding method, an injection molding method, and a coating molding method. An example of the mold molding method may be a method including: first, fixing, to both the ends of a cylindrical mold, dies for holding the mandrel in the mold; forming injection ports in the dies; then arranging the mandrel in the mold; injecting the materials for the intermediate layer from the injection ports; heating the mold after the injection at the temperature at which the materials cure; and removing the cured product from the mold. An example of the extrusion molding method may be a method including: coextruding the mandrel and the materials for the intermediate layer with a crosshead-type extruder; and curing the materials to form the intermediate layer on the periphery of the mandrel.

The surface of the intermediate layer may be modified by a surface modification method, such as surface polishing, corona treatment, flame treatment, or excimer treatment, for improving its adhesiveness with the surface layer.

[Surface Layer]

The surface layer is arranged on the outermost surface of the developer carrying member, and is a single layer. In the case of a member of a roller shape, the layer is arranged on its outermost peripheral surface. Although the surface layer may be directly formed on the mandrel, the surface layer may be formed on the outer peripheral surface of a substrate obtained by arranging the intermediate layer on the mandrel. The surface layer contains a binder resin. In addition, the crosslinked urethane resin is incorporated as the binder resin, and when an IPN structure is formed, the layer preferably has an IPN structure in which a crosslinked acrylic resin interpenetrates the crosslinked urethane resin.

In addition, resin particles may be added to the surface layer for the purpose of forming convex portions on the surface of an electrophotographic member. When a surface roughness is imparted to the surface layer, fine particles for imparting roughness may be incorporated into the surface layer. Specifically, the fine particles of a polyurethane resin, a polyester resin, a polyether resin, a polyamide resin, an acrylic resin, or a polycarbonate resin may be used. In addition, those fine particles are preferably crosslinked resin particles. When an IPN structure is formed on the outer surface side of the surface layer, the IPN structure may also be formed in each of the crosslinked resin particles. The volume-average particle diameter of the fine particles is preferably 1.0 to 30 µm, and a surface roughness (ten-point average roughness) Rzjis formed by the fine particles is preferably 0.1 to 20 µm. The Rzjis is a value measured based on JIS B0601 (1994).

[Method of Forming Surface Layer]

The surface layer of the present disclosure may be formed through the following steps:
a step of forming a resin layer containing the crosslinked urethane resin serving as a binder resin on the electroconductive substrate;
a step of impregnating a liquid acrylic monomer into the outer surface of the resin layer; and
a step of curing the impregnated acrylic monomer.

Although the formation of the resin layer containing the crosslinked urethane resin is not particularly limited, a coating molding method including using a liquid coating material is preferred. The layer may be formed by, for example, dispersing and mixing the respective materials for the resin layer in a solvent to prepare a coating material, applying the coating material onto the electroconductive substrate, and drying the applied coating material to solidify the coating material or heating the coating material to cure the coating material. The solvent is preferably a polar solvent from the viewpoint of its compatibility with each of the polyol and the isocyanate compound serving as raw materials for the crosslinked urethane resin. Examples of the polar solvent include: alcohols, such as methanol, ethanol, and n-propanol; ketones, such as acetone, methyl ethyl ketone, and methyl isobutyl ketone; and esters, such as methyl acetate and ethyl acetate. One kind, or a mixture of two or more kinds, of solvents each having satisfactory compatibility with any other material out of those solvents may be used. In addition, a solid content at the time of the preparation of the coating material, which may be freely adjusted by the mixing amount of the solvent, is preferably 20 to 40 mass % from the viewpoint of uniformly dispersing an electron conductive substance such as carbon black to be described later. A known dispersing device utilizing beads, such as a sand mill, a paint shaker, a dinomill, or a pearl mill, may be utilized for the dispersion and the mixing. In addition, dip coating, ring coating, spray coating, or roll coating may be utilized as a method for the application.

In the resin layer, the crosslinked urethane resin may be blended with an electroconductivity-imparting agent, such as an electron conductive substance or an ion conductive substance, for resistance adjustment. The volume resistivity of the surface layer is adjusted to preferably $10^3$ to $10^{11}$ Ωcm, more preferably $10^4$ to $10^{10}$ Ωcm.

Although an electroconductive filler to be described later may be used as the electron conductive substance, electroconductive carbon is preferred because the carbon easily controls the electroconductivity of the surface layer even when used in a small amount.

Examples of the ion conductive substance include the following substances: inorganic ion conductive substances, such as sodium perchlorate, lithium perchlorate, calcium perchlorate, and lithium chloride; and organic ion conductive substances, such as a modified aliphatic dimethylammonium ethosulfate and stearylammonium acetate.

Each of those electroconductivity-imparting agents, which is used in an amount required to adjust the volume resistivity of the surface layer to such an appropriate value as described above, is typically used in an amount in the range of from 0.5 to 50 parts by mass with respect to 100 parts by mass of the binder resin.

In addition, the crosslinked urethane resin may have an ionic structure in a molecule thereof for resistance adjustment. The crosslinked urethane resin having an ionic structure is obtained by, for example, causing an ionic compound having at least one functional group derived from a hydroxy group or an amino group and the raw materials for the crosslinked urethane resin to react with each other.

For example, a precursor of at least one cationic structure selected from the group consisting of structures represented by the structural formulae (1) to (6) may be used as the ionic compound. The structures represented by the structural formulae (1) to (6) are described below.

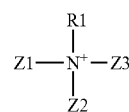

Structural formula (1)

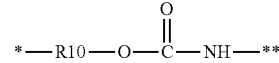

Structural formula (Z101)

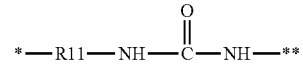

Structural formula (Z102)

In the structural formula (1), R1 represents a hydrogen atom or a monovalent hydrocarbon group having 1 to 4 carbon atoms. The hydrocarbon group is preferably an alkyl group. Z1 to Z3 each independently represent any one structure selected from the group consisting of structures represented by the structural formulae (Z101) and (Z102), or a monovalent hydrocarbon group having 1 to 4 carbon atoms, provided that at least one of Z1 to Z3 represents any one structure selected from the group consisting of the structures represented by the structural formulae (Z101) and (Z102). The monovalent hydrocarbon group is preferably an alkyl group.

The structure represented by the structural formula (1) represents a structure derived from an ionic compound having an ammonium cation having at least one functional group that is one of a hydroxy group and an amino group. When the cation of the ionic compound is a cation having at least one hydroxy group, a structure having at least one structure represented by the structural formula (Z101) is obtained by causing an ionic compound corresponding to the cation and an isocyanate group to react with each other. Similarly, when the cation of the ionic compound is a cation having at least one amino group, a structure having at least one structure represented by the structural formula (Z102) is obtained by causing an ionic compound corresponding to the cation and an isocyanate group to react with each other.

Ammonium cations each having a hydroxy group are listed below as examples of the cation of the ionic compound that can form the structure represented by the structural formula (1):
a 2-hydroxyethyltrimethylammonium cation, a 2-hydroxyethyltriethylammonium cation, a 4-hydroxybutyltrimethylammonium cation, a 4-hydroxybutyl-tri-n-butylammonium cation, an 8-hydroxyoctyltrimethylammonium cation, and an 8-hydroxyoctyl-tri-n-butylammonium cation;

a bis(hydroxymethyl)dimethylammonium cation, a bis(2-hydroxyethyl)dimethylammonium cation, a bis(3-hydroxypropyl)dimethylammonium cation, a bis(4-hydroxybutyl)dimethylammonium cation, a bis(8-hydroxyoctyl)dimethylammonium cation, and a bis(8-hydroxyoctyl)-di-n-butylammonium cation;

a tris(hydroxymethyl)methylammonium cation, a tris(2-hydroxyethyl)methylammonium cation, a tris(3-hydroxypropyl)methylammonium cation, a tris(4-hydroxybutyl)methylammonium cation, and a tris(8-hydroxyoctyl)methylammonium cation; and derivatives thereof.

Examples of the ammonium cation having an amino group include cations each having a structure obtained by substituting part or all of the hydroxy groups of those cations with an amino group.

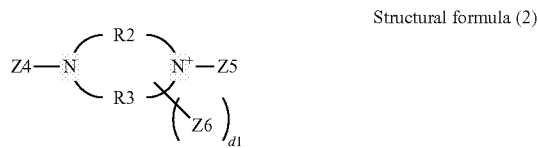

Structural formula (2)

In the structural formula (2), R2 and R3 each represent a divalent hydrocarbon group needed for forming a nitrogen-containing heteroaromatic five-membered ring together with nitrogen atoms to which the divalent hydrocarbon group is bonded. One of the divalent hydrocarbon groups has 1 carbon atom, and the other hydrocarbon group has 2 carbon atoms because the groups form a five-membered ring together with the two nitrogen atoms. π-Electrons are delocalized for expressing aromaticity. R2 and R3 may each have Z6 as a substituent except a hydrogen atom. Z4 and Z5 each independently represent any one structure selected from the group consisting of the structures represented by the structural formulae (Z101) and (Z102), a hydrogen atom, or a monovalent hydrocarbon group having 1 to 4 carbon atoms. The monovalent hydrocarbon group is preferably an alkyl group. Z6 represents any one structure selected from the group consisting of the structures represented by the structural formulae (Z101) and (Z102) or a monovalent hydrocarbon group having 1 to 4 carbon atoms. The monovalent hydrocarbon group is preferably an alkyl group. d1 represents an integer of 0 or 1, and at least one of Z4 to Z6 represents any one structure selected from the group consisting of the structures represented by the structural formulae (Z101) and (Z102).

The structure represented by the structural formula (2) is preferably a structure derived from an ionic compound having a nitrogen-containing heteroaromatic five-membered ring cation having at least one group, which is one of a hydroxy group and an amino group, and containing two nitrogen atoms. When the cation of the ionic compound has at least one hydroxy group, a structure having at least one structure represented by the structural formula (Z101) is obtained by causing an ionic compound corresponding to the cation and an isocyanate group to react with each other. Similarly, when the cation of the ionic compound has at least one amino group, a structure having at least one structure represented by the structural formula (Z102) is obtained by causing an ionic compound corresponding to the cation and an isocyanate group to react with each other.

Cations each having an imidazolium ring structure and a hydroxy group are listed below as examples of the cation of the ionic compound that can form the structure represented by the structural formula (2):

a 1-methyl-3-hydroxymethylimidazolium cation, a 1-methyl-3-(2-hydroxyethyl)imidazolium cation, a 1-methyl-3-(3-hydroxypropyl)imidazolium cation, a 1-methyl-3-(4-hydroxybutyl)imidazolium cation, a 1-methyl-3-(6-hydroxyhexyl)imidazolium cation, a 1-methyl-3-(8-hydroxyoctyl)imidazolium cation, a 1-ethyl-3-(2-hydroxyethyl)imidazolium cation, a 1-n-butyl-3-(2-hydroxyethyl)imidazolium cation, a 1,3-dimethyl-2-(2-hydroxyethyl)imidazolium cation, a 1,3-dimethyl-2-(4-hydroxybutyl)imidazolium cation, and a 1,3-dimethyl-4-(2-hydroxyethyl)imidazolium cation;

a 1,3-bishydroxymethylimidazolium cation, a 1,3-bis(2-hydroxyethyl)imidazolium cation, a 2-methyl-1,3-bishydroxymethylimidazolium cation, a 2-methyl-1,3-bis(2-hydroxyethyl)imidazolium cation, a 4-methyl-1,3-bis(2-hydroxyethyl)imidazolium cation, a 2-ethyl-1,3-bis(2-hydroxyethyl)imidazolium cation, a 4-ethyl-1,3-bis(2-hydroxyethyl)imidazolium cation, a 2-n-butyl-1,3-bis(2-hydroxyethyl)imidazolium cation, a 4-n-butyl-1,3-bis(2-hydroxyethyl)imidazolium cation, a 1,3-bis(3-hydroxypropyl)imidazolium cation, a 1,3-bis(4-hydroxybutyl)imidazolium cation, a 1,3-bis(6-hydroxyhexyl)imidazolium cation, a 1,3-bis(8-hydroxyoctyl)imidazolium cation, a 1-methyl-2,3-bis(2-hydroxyethyl)imidazolium cation, a 1-methyl-3,4-bis(2-hydroxyethyl)imidazolium cation, and a 1-methyl-3,5-bis(2-hydroxyethyl)imidazolium cation;

a 1,2,3-trishydroxymethylimidazolium cation, a 1,2,3-tris(2-hydroxyethyl)imidazolium cation, a 1,2,3-tris(3-hydroxypropyl)imidazolium cation, a 1,2,3-tris(4-hydroxybutyl)imidazolium cation, a 1,2,3-tris(6-hydroxyhexyl)imidazolium cation, a 1,2,3-tris(8-hydroxyoctyl)imidazolium cation, a 1,3,4-tris(2-hydroxyethyl)imidazolium cation, a 1,3,4-tris(3-hydroxypropyl)imidazolium cation, a 1,3,4-tris(4-hydroxybutyl)imidazolium cation, a 1,3,4-tris(6-hydroxyhexyl)imidazolium cation, and a 1,3,4-tris(8-hydroxyoctyl)imidazolium cation; andderivatives thereof.

Examples of the cation having an amino group include cations each having a structure obtained by substituting part or all of the hydroxy groups of those cations with an amino group.

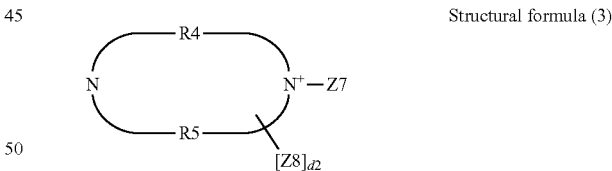

Structural formula (3)

In the structural formula (3), R4 and R5 each represent a divalent hydrocarbon group needed for forming a nitrogen-containing heteroaromatic six-membered ring together with nitrogen atoms to which the divalent hydrocarbon group is bonded. The divalent hydrocarbon groups are groups each having 1 to 3 carbon atoms, and the following combinations are conceivable because the groups form a six-membered ring together with the two nitrogen atoms: such a combination that one of the groups has 1 carbon atom, and the other group has 3 carbon atoms; and such a combination that both the groups each have 2 carbon atoms. π-Electrons are delocalized for expressing aromaticity. R4 and R5 may each have Z8 as a substituent except a hydrogen atom. Z7 represents any one structure selected from the group consisting of the structures represented by the structural formulae (Z101) and (Z102), a hydrogen atom, or a monovalent hydrocarbon group having 1 to 4 carbon atoms. The monovalent hydrocarbon group is preferably an alkyl group. Z8 represents any one structure selected from the group consisting of the structures represented by the structural formulae (Z101) and (Z102) or a monovalent hydrocarbon group having 1 to 4 carbon atoms. The monovalent hydrocarbon group is preferably an alkyl group. d2 represents an integer of from 0 to 2, and at least one of Z7 or Z8 represents any one structure selected from the group consisting of the structures represented by the structural formulae (Z101) and (Z102). When d2 represents 2, Z8s may be identical to or different from each other.

The structure represented by the structural formula (3) is a structure derived from an ionic compound having a nitrogen-containing heteroaromatic six-membered ring cation having at least one group, which is one of a hydroxy group and an amino group, and containing two nitrogen atoms. When the cation of the ionic compound has at least one hydroxy group, a structure having at least one structure represented by the structural formula (Z101) is obtained by causing an ionic compound corresponding to the cation and an isocyanate group to react with each other. Similarly, when the cation of the ionic compound has at least one amino group, a structure having at least one structure represented by the structural formula (Z102) is obtained by causing an ionic compound corresponding to the cation and an isocyanate group to react with each other.

Examples of the nitrogen-containing heteroaromatic six-membered ring in the structural formula (3) include a pyrimidine ring and a pyrazine ring.

Cations each having a pyrimidine ring structure and a hydroxy group are listed below as examples of the cation of the ionic compound that can form the structure represented by the structural formula (3):
a 1,4-bis(2-hydroxyethyl)pyrimidinium cation, a 1,5-bis(3-hydroxypropyl)pyrimidinium cation, a 1-(4-hydroxybutyl)-4-(2-hydroxyethyl)pyrimidinium cation, and a 1,4-bis(2-hydroxyethyl)-2-methylpyrimidinium cation; and derivatives thereof.

Examples of the cation having at least one amino group include cations each having a structure obtained by substituting part or all of the hydroxy groups of those cations with an amino group.

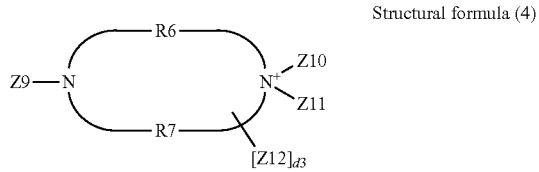

Structural formula (4)

In the structural formula (4), R6 and R7 each represent a divalent hydrocarbon group needed for forming a nitrogen-containing heteroalicyclic group together with nitrogen atoms to which the divalent hydrocarbon group is bonded. Examples of the nitrogen-containing heteroalicyclic group include five- to seven-membered ring structures, and examples of the divalent hydrocarbon group include an alkylene group having 1 to 3 carbon atoms, and an alkenylene group having 2 or 3 carbon atoms. Of those, an alkylene group is preferred. R6 and R7 may each have Z12 as a substituent except a hydrogen atom. Z9 to Z11 each independently represent any one structure selected from the group consisting of the structures represented by the structural formulae (Z101) and (Z102), a hydrogen atom, or a monovalent hydrocarbon group having 1 to 4 carbon atoms. The monovalent hydrocarbon group is preferably an alkyl group. Z12 represents any one structure selected from the group consisting of the structures represented by the structural formulae (Z101) and (Z102) or a monovalent hydrocarbon group having 1 to 4 carbon atoms. The monovalent hydrocarbon group is preferably an alkyl group. d3 represents an integer of from 0 to 2, and at least one of Z9 to Z12 represents any one structure selected from the group consisting of the structures represented by the structural formulae (Z101) and (Z102). When d3 represents 2, Z12s may be identical to or different from each other.

The structure represented by the structural formula (4) is a structure derived from an ionic compound having a nitrogen-containing heteroalicyclic cation having at least one group, which is one of a hydroxy group and an amino group, and containing two nitrogen atoms. When the cation of the ionic compound has at least one hydroxy group, a structure having at least one structure represented by the structural formula (Z101) is obtained by causing an ionic compound corresponding to the cation and an isocyanate group to react with each other. When the cation of the ionic compound has at least one amino group, a structure having at least one structure represented by the structural formula (Z102) is obtained by causing an ionic compound corresponding to the cation and an isocyanate group to react with each other.

Examples of the nitrogen-containing heteroalicyclic group in the structural formula (4) include a piperazine group (six-membered), an imidazoline group (five-membered), an imidazolidine group (five-membered), a 1,3-diazepane group (seven-membered), and a 1,4-diazepane group (seven-membered).

Cations each having a piperazine group and a hydroxy group are listed below as examples of the cation of the ionic compound that can form the structure represented by the structural formula (4):
a 1,1-bis(2-hydroxyethyl)piperazinium cation, a 1,1,4-tris(2-hydroxyethyl)piperazinium cation, a 1,4-bis(3-hydroxypropyl)-1-ethylpiperazinium cation, and a 1,4-bis(2-hydroxyethyl)-1,3-diethylpiperazinium cation; and derivatives thereof.

Examples of the cation having at least one amino group include cations each having a structure obtained by substituting part or all of the hydroxy groups of those cations with an amino group.

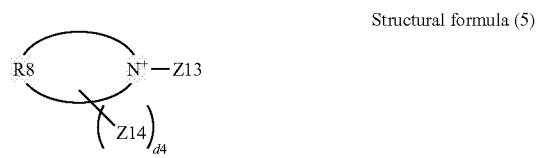

Structural formula (5)

In the structural formula (5), R8 represents a divalent hydrocarbon group needed for forming a nitrogen-containing aromatic ring together with a nitrogen atom to which the divalent hydrocarbon group is bonded. The nitrogen-containing aromatic ring is a five- to seven-membered ring, and is preferably a five-membered ring or a six-membered ring, more preferably a six-membered ring. R8 may have Z14 as a substituent except hydrogen. Z13 represents any one structure selected from the group consisting of the structures represented by the structural formulae (Z101) and (Z102), a hydrogen atom, or a monovalent hydrocarbon group having 1 to 4 carbon atoms. The monovalent hydrocarbon group is preferably an alkyl group. Z14 represents any one structure selected from the group consisting of the structures represented by the structural formulae (Z101) and (Z102) or a monovalent hydrocarbon group having 1 to 4 carbon atoms. The monovalent hydrocarbon group is preferably an alkyl group. d4 represents an integer of 0 or 1, and at least one of Z13 or Z14 represents any one structure selected from the group consisting of the structures represented by the structural formulae (Z101) and (Z102).

The structure represented by the structural formula (5) is a structure derived from an ionic compound having a nitrogen-containing aromatic ring cation having at least one group, which is one of a hydroxy group and an amino group, and containing one nitrogen atom. When the cation of the ionic compound has at least one hydroxy group, a structure having at least one structure represented by the structural formula (Z101) is obtained by causing an ionic compound corresponding to the cation and an isocyanate group to react with each other. When the cation of the ionic compound has at least one amino group, a structure having at least one structure represented by the structural formula (Z102) is obtained by causing an ionic compound corresponding to the cation and an isocyanate group to react with each other.

Examples of the nitrogen-containing aromatic ring in the structural formula (5) include a pyrrole ring, a pyridine ring, and an azepine ring.

Cations each having a pyridine ring structure and a hydroxy group are listed below as examples of the cation of the ionic compound that may form the structure represented by the structural formula (5):
a 1-hydroxymethylpyridinium cation, a 1-(2-hydroxyethyl) pyridinium cation, a 1-(3-hydroxypropyl)pyridinium cation, a 1-(4-hydroxybutyl)pyridinium cation, a 1-(6-hydroxyhexyl)pyridinium cation, a 1-(8-hydroxyoctyl)pyridinium cation, a 2-methyl-1-(2-hydroxyethyl)pyridinium cation, a 3-methyl-1-(2-hydroxyethyl)pyridinium cation, a 4-methyl-1-(2-hydroxyethyl)pyridinium cation, a 3-ethyl-1-(2-hydroxyethyl)pyridinium cation, a 3-n-butyl-1-(2-hydroxyethyl)pyridinium cation, a 1-methyl-2-hydroxymethylpyridinium cation, a 1-methyl-3-hydroxymethylpyridinium cation, a 1-methyl-4-hydroxymethylpyridinium cation, a 1-methyl-2-(2-hydroxyethyl)pyridinium cation, a 1-methyl-3-(2-hydroxyethyl)pyridinium cation, a 1-methyl-4-(2-hydroxyethyl)pyridinium cation, a 1-ethyl-3-(2-hydroxyethyl)pyridinium cation, a 1-n-butyl-3-(2-hydroxyethyl)pyridinium cation, and a 2-methyl-4-n-butyl-1-(2-hydroxyethyl)pyridinium cation;
a 1,2-bishydroxymethylpyridinium cation, a 1,3-bishydroxymethylpyridinium cation, a 1,4-bishydroxymethylpyridinium cation, a 1,2-bis(2-hydroxyethyl)pyridinium cation, a 1,3-bis(2-hydroxyethyl)pyridinium cation, a 1,4-bis(2-hydroxyethyl)pyridinium cation, a 1,2-bis(3-hydroxypropyl)pyridinium cation, a 1,3-bis(3-hydroxypropyl)pyridinium cation, a 1,4-bis(3-hydroxypropyl)pyridinium cation, a 1,2-bis(4-hydroxybutyl)pyridinium cation, a 1,3-bis(4-hydroxybutyl)pyridinium cation, a 1,4-bis(4-hydroxybutyl)pyridinium cation, a 1,2-bis(6-hydroxyhexyl)pyridinium cation, a 1,3-bis(6-hydroxyhexyl)pyridinium cation, a 1,4-bis(6-hydroxyhexyl)pyridinium cation, a 1,2-bis(8-hydroxyoctyl)pyridinium cation, a 1,3-bis(8-hydroxyoctyl)pyridinium cation, a 1,4-bis(8-hydroxyoctyl)pyridinium cation, a 2-methyl-1,3-bis(2-hydroxyethyl)pyridinium cation, a 2-ethyl-1,3-bis(2-hydroxyethyl)pyridinium cation, a 5-methyl-1,3-bis(2-hydroxyethyl)pyridinium cation, and a 5-ethyl-1,3-bis(2-hydroxyethyl)pyridinium cation;
a 1,2,4-trishydroxymethylpyridinium cation, a 1,2,4-tris(2-hydroxyethyl)pyridinium cation, a 1,2,4-tris(3-hydroxypropyl)pyridinium cation, a 1,2,4-tris(4-hydroxybutyl)pyridinium cation, a 1,2,4-tris(6-hydroxyhexyl)pyridinium cation, a 1,2,4-tris(8-hydroxyoctyl)pyridinium cation, a 1,3,5-trishydroxymethylpyridinium cation, a 1,3,5-tris(2-hydroxyethyl)pyridinium cation, a 1,3,5-tris(3-hydroxypropyl)pyridinium cation, a 1,3,5-tris(4-hydroxybutyl)pyridinium cation, a 1,3,5-tris(6-hydroxyhexyl)pyridinium cation, and a 1,3,5-tris(8-hydroxyoctyl)pyridinium cation; and derivatives thereof.

Examples of the cation having at least one amino group include cations each having a structure obtained by substituting part or all of the hydroxy groups of those cations with an amino group.

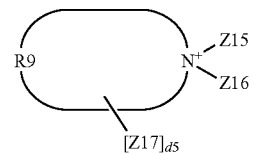

Structural formula (6)

In the structural formula (6), R9 represents a divalent hydrocarbon group needed for forming a nitrogen-containing alicyclic group together with a nitrogen atom to which the divalent hydrocarbon group is bonded. Examples of the nitrogen-containing alicyclic group include five- to eight-membered ring structures, and examples of the divalent hydrocarbon group include an alkylene group having 4 to 7 carbon atoms, and an alkenylene group having 4 to 7 carbon atoms. Of those, an alkylene group is preferred. R9 may have Z17 as a substituent except a hydrogen atom. Z15 and Z16 each independently represent any one structure selected from the group consisting of the structures represented by the structural formulae (Z101) and (Z102), a hydrogen atom, or a monovalent hydrocarbon group having 1 to 4 carbon atoms. The monovalent hydrocarbon group is preferably an alkyl group. Z17 represents any one structure selected from the group consisting of the structures represented by the structural formulae (Z101) and (Z102) or a monovalent hydrocarbon group having 1 to 4 carbon atoms. The monovalent hydrocarbon group is preferably an alkyl group. d5 represents an integer of 0 or 1, and at least one of Z15 to Z17 represents any one structure selected from the group consisting of the structures represented by the structural formulae (Z101) and (Z102).

The structure represented by the structural formula (6) is a structure derived from an ionic compound having a nitrogen-containing alicyclic cation having at least one group, which is one of a hydroxy group and an amino group, and containing one nitrogen atom. When the cation of the ionic compound has at least one hydroxy group, a structure having at least one structure represented by the structural formula (Z101) is obtained by causing an ionic compound corresponding to the cation and an isocyanate group to react with each other. When the cation of the ionic compound has at least one amino group, a structure having at least one structure represented by the structural formula (Z102) is obtained by causing an ionic compound corresponding to the cation and an isocyanate group to react with each other.

Examples of the nitrogen-containing alicyclic group in the structural formula (6) include a pyrrolidine group (five-membered), a pyrroline group (five-membered), a piperidine group (six-membered), an azepane group (seven-membered), and an azocane group (eight-membered).

Cations each having a pyrrolidine group and a hydroxy group are listed below as examples of the cation of the ionic compound that can form the structure represented by the structural formula (6):
a 1-methyl-1,2-bis(2-hydroxyethyl)pyrrolidinium cation, a 1-ethyl-1,2-bis(2-hydroxyethyl)pyrrolidinium cation, a 1-butyl-1,2-bis(2-hydroxyethyl)pyrrolidinium cation, and a 1-methyl-1,2-bis(4-hydroxybutyl)pyrrolidinium cation; and derivatives thereof.

Examples of the cation having an amino group include cations each having a structure obtained by substituting part or all of the hydroxy groups of those cations with an amino group.

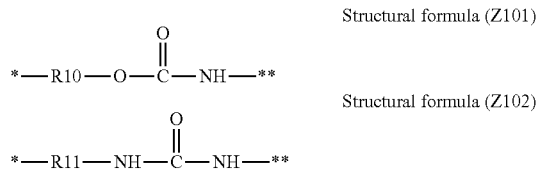

In the structural formulae (Z101) and (Z102), R10 and R11 each independently represent a linear or branched divalent hydrocarbon group. The hydrocarbon group is preferably a linear or branched alkylene group having 1 to 8 carbon atoms.

Symbol "*" represents a bonding site with a nitrogen atom in the structural formula (1) or a bonding site with a nitrogen atom in a nitrogen-containing heterocycle in any one of the structural formulae (2) to (6) or with a carbon atom in the nitrogen-containing heterocycle. Symbol "**" represents a bonding site with a carbon atom in a polymer chain forming a resin having the cation structure.

As described above, the structure represented by the structural formula (Z101) is a residue formed by a reaction between a hydroxy group of the cation of the ionic compound serving as a raw material and an isocyanate group. The structure represented by the structural formula (Z102) is a residue formed by a reaction between an amino group of the cation and an isocyanate group. The isocyanate group that reacts with the hydroxy group or the amino group is preferably an isocyanate group of the binder resin.

The resin layer may contain an anion as a counterion of the cation structure. For example, the following anions may each be used as the anion.

[Anion]

Examples of the anion include a fluorosulfonic acid anion, a fluorocarboxylic acid anion, a fluorosulfonylimide anion, a fluorosulfonylmethide anion, a fluoroalkylfluoroboric acid anion, a fluoroalkylfluorophosphoric acid anion, a halide ion, a carboxylic acid anion, a sulfonic acid anion, a tetrafluoroboric acid anion, a hexafluorophosphoric acid anion, a hexafluoroarsenic acid anion, a hexafluoroantimonic acid anion, a dicyanamide anion, a bis(oxalato)boric acid anion, a nitric acid anion, and a perchloric acid anion.

Examples of the fluorosulfonic acid anion include a trifluoromethanesulfonic acid anion, a fluoromethanesulfonic acid anion, a perfluoroethylsulfonic acid anion, a perfluoropropylsulfonic acid anion, a perfluorobutylsulfonic acid anion, a perfluoropentylsulfonic acid anion, a perfluorohexylsulfonic acid anion, and a perfluorooctylsulfonic acid anion.

Examples of the fluorocarboxylic acid anion include a trifluoroacetic acid anion, a perfluoropropionic acid anion, a perfluorobutyric acid anion, a perfluorovaleric acid anion, and a perfluorocaproic acid anion.

Examples of the fluorosulfonylimide anion include anions, such as a trifluoromethanesulfonylimide anion, a perfluoroethylsulfonylimide anion, a perfluoropropylsulfonylimide anion, a perfluorobutylsulfonylimide anion, a perfluoropentylsulfonylimide anion, a perfluorohexylsulfonylimide anion, a perfluorooctylsulfonylimide anion, and a fluorosulfonylimide anion, and cyclic anions such as a cyclo-hexafluoropropane-1,3-bis(sulfonyl)imide.

Examples of the fluorosulfonylmethide anion include a trifluoromethanesulfonylmethide anion, a perfluoroethylsulfonylmethide anion, a perfluoropropylsulfonylmethide anion, a perfluorobutylsulfonylmethide anion, a perfluoropentylsulfonylmethide anion, a perfluorohexylsulfonylmethide anion, and a perfluorooctylsulfonylmethide anion.

Examples of the fluoroalkylfluoroboric acid anion include a trifluoromethyltrifluoroboric acid anion and a perfluoroethyltrifluoroboric acid anion.

Examples of the fluoroalkylfluorophosphoric acid anion include a tris-trifluoromethyl-trifluorophosphoric acid anion and a tris-perfluoroethyl-trifluorophosphoric acid anion.

Examples of the halide ion include a fluoride ion, a chloride ion, a bromide ion, and an iodide ion.

Examples of the carboxylic acid anion include: alkyl carboxylic acid anions, such as an acetic acid anion, a propionic acid anion, a butyric acid anion, and a hexanoic acid anion; and aromatic carboxylic acid anions such as a benzoic acid anion. The anion may have, for example, one or more of the following substituents: a hydrocarbon group having 1 to 30 carbon atoms; a substituent having a heteroatom, including a halogen group, such as fluorine, chlorine, bromine, or iodine, an alkoxy group, such as a methoxy group or an ethoxy group, an amide group, or a cyano group; and a haloalkyl group such as a trifluoromethyl group.

Examples of the sulfonic acid anion include: alkylsulfonic acid anions, such as a methanesulfonic acid anion and an ethanesulfonic acid anion; and aromatic sulfonic acid anions, such as a benzenesulfonic acid anion and a p-toluenesulfonic acid anion. The sulfonic acid anion may be substituted with, for example, one or more of the following substituents: a hydrocarbon group having 1 to 30 carbon atoms; a substituent having a heteroatom, including a halogen group, such as fluorine, chlorine, bromine, or iodine, an alkoxy group, such as a methoxy group or an ethoxy group, an amide group, or a cyano group; and a haloalkyl group such as a trifluoromethyl group.

Next, the liquid acrylic monomer is impregnated into the resin layer formed as described above. The liquid acrylic monomer may be impregnated as it is, or may be impregnated as an impregnation treatment liquid appropriately diluted with any one of various solvents. When the liquid acrylic monomer is appropriately diluted with any one of the various solvents, a surface layer having more uniform surface composition is obtained. A solvent that satisfies both of an affinity for the resin layer and solubility for the acrylic monomer may be freely selected as the solvent. Examples thereof include: alcohols, such as methanol, ethanol, and n-propanol; ketones, such as acetone, methyl ethyl ketone, and methyl isobutyl ketone; and esters, such as methyl acetate and ethyl acetate. In addition, the impregnation treatment liquid may be appropriately mixed with a polymerization initiator. Details about the polymerization initiator are described later. Although a method of impregnating the impregnation treatment liquid is not particularly limited, dip coating, ring coating, spray coating, or roll coating may be utilized.

The surface layer may be formed by performing impregnation treatment with the impregnation treatment liquid as described above, and then polymerizing and curing the acrylic monomer. A method for the polymerization and the curing is not particularly limited, and a known method may be used. Specific examples thereof include methods, such as heat curing and UV irradiation.

Through such steps, the crosslinked acrylic resin is introduced in such a form as to be mutually entangled with the network structure of the crosslinked urethane resin of the resin layer, and hence the IPN structure can be formed. In the present disclosure, it is particularly preferred that an IPN structure by a crosslinked polymer having an elastic modulus higher than that of the crosslinked urethane resin, in particular, the crosslinked acrylic resin be formed for the crosslinked urethane resin. In the IPN structure, the acrylic monomer and the polymerization initiator are impregnated from the outer surface into the crosslinked urethane resin serving as a first component, and then the crosslinked acrylic resin is formed as the polymer of a second component. In this case, the acrylic monomer penetrates a space in the three-dimensional network structure of the crosslinked urethane resin to be polymerized, thereby forming the network structure of the crosslinked acrylic resin. The thickness of the surface layer thus obtained is 1.1 µm or more in order to satisfy the requirements of $E1 \geq 200$ MP and $10$ $MPa \leq E2 \leq 100$ MPa, and is preferably 1.4 µm or more, more preferably 2.0 µm or more from the viewpoint of its film strength. In addition, although the upper limit of the thickness of the surface layer is not particularly set, when a surface layer of a single layer is formed on the substrate having formed thereon the intermediate layer, the upper limit is 200.0 µm or less, preferably 160.0 µm or less, more preferably 150.0 µm or less from the viewpoint of its flexibility. The thickness of the surface layer as used herein refers to the thickness of a portion excluding portions each protruding in a convex shape as a result of the addition of roughness particles and the like.

[Crosslinked Urethane Resin]

The surface layer includes the matrix containing the crosslinked urethane resin as the binder. The crosslinked urethane resin is suitable as the binder because the resin is excellent in flexibility and strength. The urethane resin may be obtained from the polyol and the isocyanate, and a chain extender as required. Examples of the polyol that is a urethane resin raw material include a polyether polyol, a polyester polyol, a polycarbonate polyol, a polyolefin polyol, an acrylic polyol, and mixtures thereof Examples of the isocyanate that is a urethane resin raw material include the following isocyanates: tolylene diisocyanate (TDI), diphenylmethane diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethyl xylylene diisocyanate (TMXDI), cyclohexane diisocyanate, and mixtures thereof. Examples of the chain extender that is a urethane resin raw material include: bifunctional low-molecular-weight diols, such as ethylene glycol, 1,4-butanediol, and 3-methylpentanediol; trifunctional low-molecular-weight triols such as trimethylolpropane; and mixtures thereof. In addition, prepolymer-type isocyanate compounds each having an isocyanate group at a terminal thereof, the compounds being obtained by causing the various isocyanate compounds and the various polyols described above to react with each other in advance under a state in which an isocyanate group is excessive, may be used. In addition, materials obtained by blocking isocyanate groups with various blocking agents such as MEK oxime may be used as those isocyanate compounds.

No matter what material is used, the urethane resin can be obtained by causing the polyol and the isocyanate to react with each other through heating. Further, when one, or each of both, of the polyol and the isocyanate has a branched structure and three or more functional groups, the urethane resin to be obtained becomes the crosslinked urethane resin.

[Crosslinked Acrylic Resin]

Although the crosslinked acrylic resin has high hardness, the resin may be hard and brittle when used alone. Accordingly, when the resin is used as a single film in the surface layer of an electrophotographic member, a flaw is liable to occur on the layer owing to its shaving by rubbing because of the brittleness. In addition, the resin is hard, and hence a load on the toner is liable to be large, thereby causing filming in some cases. Meanwhile, when the resin is introduced as an IPN structure extremely near the outer surface of the surface layer formed by using the crosslinked urethane resin as the matrix, the hardness and the brittleness are hardly expressed, and hence high strength can be imparted to the layer while its flexibility is held.

The crosslinked acrylic resin is formed by the polymerization of an acrylic monomer. The term "acrylic monomer" as used herein means not only an acrylic monomer but also a methacrylic monomer. That is, the crosslinked acrylic resin is formed by the polymerization of one or both of the acrylic monomer and the methacrylic monomer.

As described above, the IPN structure of the crosslinked acrylic resin with the crosslinked urethane resin is formed extremely near the outer surface of the surface layer by impregnating a liquid acrylic monomer into a resin layer containing crosslinked urethane and curing the impregnated product. The kind of the acrylic monomer to be used herein preferably includes a polyfunctional monomer having acryloyl groups or methacryloyl groups as functional groups for forming a crosslinked structure. Meanwhile, when the number of functional groups is four or more, the viscosity of the acrylic monomer becomes remarkably high. Accordingly, the monomer hardly infiltrates the surface of the resin layer formed of the crosslinked urethane resin, and as a result, the IPN structure is hardly formed. Accordingly, such a monomer that the total number of an acryloyl group and a methacryloyl group present in a molecule is two or three is preferred as the acrylic monomer, and a bifunctional acrylic monomer having two such groups is given as a more preferred example thereof. In addition, a monofunctional monomer may be combined with the acrylic monomer as required.

The molecular weight of the acrylic monomer preferably falls within the range of from 200 to 750. When the molecular weight within the range is used, the IPN structure is easily formed for the network structure of the crosslinked urethane resin, and hence the strength of the surface layer can be effectively improved.

As described above, the acrylic monomer is impregnated into the resin layer containing the crosslinked urethane resin. To that end, the monomer has an appropriate viscosity. That is, when the monomer has a high viscosity, the monomer is hardly impregnated, and when the monomer has a low viscosity, its impregnated state is difficult to control. Accordingly, the viscosity of the acrylic monomer is preferably 5.0 to 140 mPa·s at 25° C.

That is, the IPN structure of the crosslinked urethane resin and the crosslinked acrylic resin may be formed by: selecting one or two or more kinds of acrylic monomers each satisfying the above-mentioned molecular weight range and viscosity range; impregnating the selected monomers into the resin layer; and polymerizing the monomers.

A method of polymerizing the acrylic monomer is not particularly limited, and a known method may be used. Specific examples thereof include methods, such as heating and UV irradiation.

A known radical polymerization initiator or ionic polymerization initiator may be used for each of the polymerization methods.

A polymerization initiator when the polymerization is performed by heating is, for example: a peroxide, such as 3-hydroxy-1,1-dimethylbutyl peroxyneodecanoate, α-cumyl peroxyneodecanoate, t-butyl peroxyneoheptanoate, t-butyl peroxypivalate, t-amylperoxy n-octoate, t-butylperoxy 2-ethylhexyl carbonate, dicumyl peroxide, di-t-butyl peroxide, di-t-amyl peroxide, 1,1-di(t-butylperoxy)cyclohexane, or n-butyl-4,4-di(t-butylperoxy)valerate; or an azo compound, such as 2,2-azobisisobutyronitrile, 2,2-azobis(4-methoxy-2,4-dimethylvaleronitrile), 2,2-azobis(2,4-dimethylvaleronitrile), 2,2-azobis(2-methylbutyronitrile), 1,1-azobis(cyclohexane-1-carbonitrile), 2,2-azobis[2-(2-imidazolin-2-yl)propane], 2,2-azobis[2-methyl-N-(2-hydroxyethyl)propionamide], 2,2-azobis[N-(2-propenyl)-2-methylpropionamide], 2,2-azobis(N-butyl-2-methoxypropionamide), or dimethyl-2,2-azobis(isobutyrate).

A polymerization initiator when the polymerization is performed by UV irradiation is, for example, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butan-1-one, 2-dimethylamino-2-(4-methylbenzyl)-1-(4-morpholin-4-yl-phenyl)-butan-1-one, bis(2,4,6-trimethylbenzoyl)-phenylphosphine oxide, or 2,4,6-trimethylbenzoyl-diphenylphosphine oxide.

Those polymerization initiators may be used alone or in combination thereof.

In addition, with regard to the blending amount of the polymerization initiator, when the total amount of a compound for forming a specific resin (e.g., a compound having a (meth)acryloyl group) is defined as 100 parts by mass, the initiator is preferably used in an amount of 0.5 to 10 parts by mass from the viewpoint of efficiently advancing a reaction for the formation of the resin.

A known device may be appropriately used as a heating device or a UV irradiation device. For example, an LED lamp, a high-pressure mercury lamp, a metal halide lamp, a xenon lamp, and a low-pressure mercury lamp may each be used as a light source for applying UV light. An integrated light quantity required at the time of the polymerization may be appropriately adjusted in accordance with the kinds and addition amounts of the compound and the polymerization initiator to be used.

[Filler]

In addition, a filler may be incorporated for the purpose of enhancing the reinforcing effect of the surface layer.

Examples of the filler include the following insulating fillers: quartz fine powder, silica particles, diatomaceous earth, zinc oxide, basic magnesium carbonate, active calcium carbonate, magnesium silicate, aluminum silicate, titanium dioxide, talc, mica powder, aluminum sulfate, calcium sulfate, barium sulfate, a glass fiber, an organic reinforcing agent, and an organic filler. The surfaces of those fillers may be made hydrophobic by being treated with an organosilicon compound such as polydiorganosiloxane. Silica particles are suitably used as the insulating filler because of their satisfactory uniform dispersibility in the surface layer. Further, silica particles whose surfaces are subjected to hydrophobic treatment out of the silica particles are particularly suitably used. The content of the silica particles is preferably 0.5 to 20 mass % with respect to 100 parts by mass of the resin components for forming the surface layer.

In consideration of the reinforcing performance and electroconductivity of the surface layer, with regard to the primary particle diameters of the silica particles, the number-average primary particle diameter thereof preferably falls within the range of from 10 to 120 nm. The number-average primary particle diameter more preferably falls within the range of from 15 to 80 nm, and particularly preferably falls within the range of from 15 to 40 nm. The number-average primary particle diameter is measured as described below. The silica particles are observed with a scanning electron microscope, and the particle diameters of 100 particles in its field of view are measured, followed by the determination of their average particle diameter.

Examples of the filler include the following electroconductive fillers: carbon-based substances, such as carbon black and graphite; metals or alloys, such as aluminum, silver, gold, a tin-lead alloy, and a copper-nickel alloy; metal oxides, such as zinc oxide, titanium oxide, aluminum oxide, tin oxide, antimony oxide, indium oxide, and silver oxide; and substances obtained by subjecting various fillers to plating with an electroconductive metal, such as copper, nickel, or silver. Carbon black is particularly suitably used as the electroconductive filler because of the following reasons: the carbon black easily controls the electroconductivity of the surface layer; and the carbon black is available at low cost. Of various types of carbon black, carbon black having a relatively small primary particle diameter and maintaining a hydrophobic tendency is particularly suitably used because of its satisfactory uniform dispersibility in the surface layer. In consideration of the reinforcing performance and electroconductivity of the surface layer, the primary particle diameter of the carbon black preferably falls within the range of from 20 to 60 nm in terms of number-average primary particle diameter. With regard to the surface characteristic of the carbon black, its pH is preferably 3.0 to 8.0. In addition, the content of the carbon black is preferably 5 to 45 mass % with respect to 100 parts by mass of the resin components for forming the surface layer.

[Other Component]

In addition, various additives, such as a crosslinking agent, a crosslinking aid, a plasticizer, a filler, an extender, a vulcanizing agent, a vulcanization aid, an antioxidant, an age inhibitor, a processing aid, a dispersant, and a leveling agent, may each be incorporated into the surface layer in addition to the above-mentioned components to the extent that the above-mentioned function is not inhibited.

<Method of measuring SPM Elastic Modulus>

First, a region of a section of an electrophotographic member to be subjected to measurement is cut out into a flake with a diamond knife under a state in which the member is held at −110° C. in a cryomicrotome (product name: EM FC6, manufactured by Leica Microsystems). Further, a 100-micrometer square sample having a width of 100 μm in its depth direction is produced from the flake.

Figure 5:
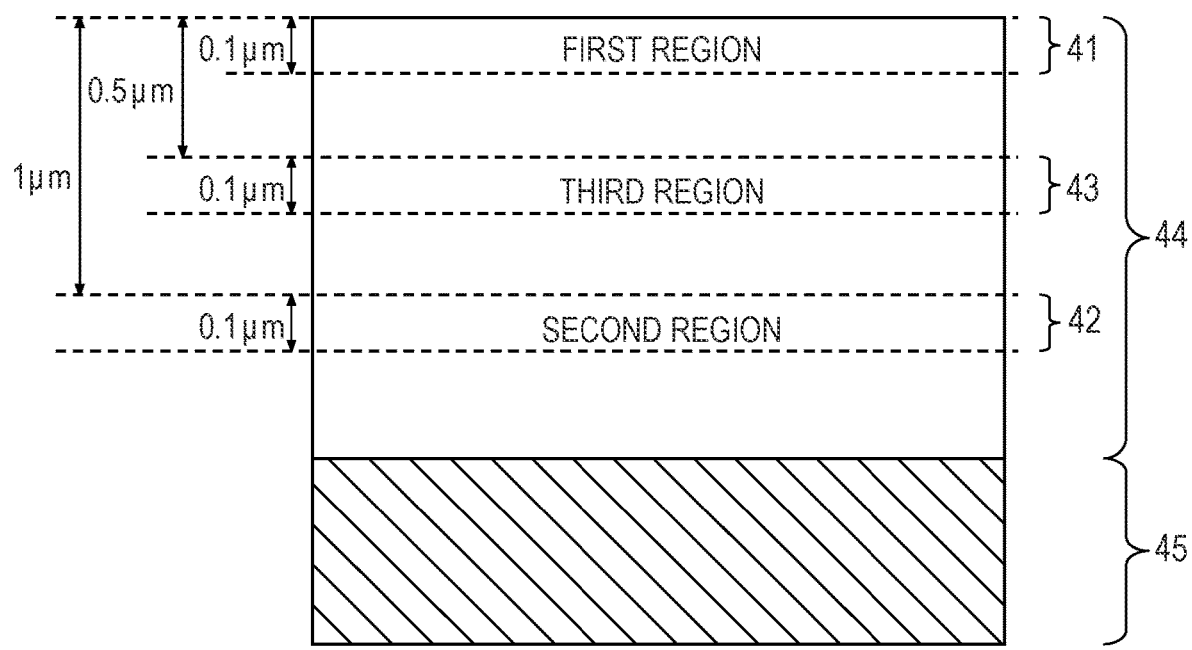
FIG. 5 is a sectional view of the surface layer of the developer carrying member according to one aspect of the present disclosure.

Herein, a schematic sectional view of a surface layer 44 formed on an electroconductive substrate 45 is illustrated in FIG. 5. In the present disclosure, as illustrated in FIG. 5, a region from the outer surface of the surface layer 44 to a depth of 0.1 μm is specified as a first region 41, a region corresponding to a depth of from 1.0 μm to 1.1 μm from the outer surface is specified as a second region 42, and a region corresponding to a depth of from 0.5 μm to 0.6 μm from the outer surface is specified as a third region 43. The elastic modulus of the matrix containing the crosslinked urethane resin as the binder is measured in each of the regions appearing in the section of the produced sample. A SPM device (product name: MFP-3D-Origin, manufactured by Oxford Instruments) and a probe (product name: AC160, manufactured by Olympus Corporation) are used in the measurement. At this time, the elastic modulus may be calculated based on the Hertz theory by measuring a force curve 10 times, and determining the arithmetic average of 8 values excluding the highest value and the lowest value. The elastic moduli of the matrix in the first region 41, the second region 42, and the third region 43 are defined as E1, E2, and E3, respectively.

<Method of recognizing Interpenetrating Polymer Network (IPN) Structure>

To recognize that the IPN structure is formed, for example, the following methods are available: a method based on solvent extraction; and a method of recognizing the fact from the shift of a glass transition point after the formation of the IPN structure as compared to that before the formation. In the present disclosure, the formation is recognized from a SPM elastic modulus and the peak top temperature of a thermal chromatogram.

When the IPN structure is formed, the elastic modulus is increased by the mutual entanglement of the polymers. Accordingly, the presence or absence of the IPN structure can be recognized by recognizing a magnitude relationship between the elastic modulus in the presence of the formation of the IPN structure and that in the absence of the formation. That is, in the present disclosure, when the elastic moduli of the outer surface in which the crosslinked urethane resin and the crosslinked acrylic resin form the IPN structure, and the vicinity of the outer surface (the first region), and those of the regions inside the outer surface (the second region and the third region) are compared, the former elastic moduli are the higher elastic moduli.

In addition, a thermal decomposition temperature, that is, the peak top temperature of the thermal chromatogram shifts to higher temperatures as a result of the mutual entanglement of the polymers. Accordingly, the presence or absence of the IPN structure can be recognized by recognizing a magnitude relationship between the peak top temperature of the thermal chromatogram in the presence of the formation of the IPN structure and that in the absence of the formation. That is, in the present disclosure, when the peak top of the crosslinked acrylic resin forming the IPN structure with the crosslinked urethane resin and that of the crosslinked acrylic resin present alone are compared, the peak top temperature of the former is present at higher temperatures. Accordingly, whether or not the IPN structure is formed can be recognized by comparing the peak top temperatures of the thermal chromatograms derived from the crosslinked acrylic resin before and after the decomposition and removal of the crosslinked urethane resin in a sample collected from the surface layer. Specifically, when the peak top temperature before the decomposition and removal of the crosslinked urethane resin is the higher, it can be recognized that the IPN structure is formed.

The term "thermal chromatogram" as used herein means a mass spectrum called an ion chromatogram that can be obtained by microsampling mass spectrometry. The outline of the microsampling mass spectrometry is described below.

<Microsampling Mass Spectrometry>

First, a region of the electrophotographic member to be subjected to measurement is cut out into a flake with a cryomicrotome as in the measurement of the SPM elastic modulus to prepare a sample. In the present disclosure, a 100-micrometer square sample having a width of 0.1 μm in its depth direction is produced from each of the first region to third region of the surface layer. For example, an ion trap-type mass spectrometer mounted on a gas chromatography mass spectrometer ("Polaris Q" (product name, manufactured by Thermo Electron Corporation)) is used in the measurement. The sample is fixed to a filament positioned at the tip of the probe of the ion trap-type mass spectrometer, and is directly inserted into the ionization chamber of the gas chromatography mass spectrometer. After that, the sample is rapidly heated from room temperature to a temperature of 1,000° C. at a constant heating rate. The sample that has been decomposed and evaporated by the heating is ionized by being irradiated with an electron beam, and is detected with the mass spectrometer. At this time, under such a condition that the heating rate is constant, a thermal chromatogram similar to a thermogravimetry-mass spectrometry (TG-MS) method, the chromatogram having a mass spectrum called a total ion chromatogram (TIC), is obtained. In addition, a thermal chromatogram for a fragment having a predetermined mass can also be obtained, and hence the peak temperature of the thermal chromatogram corresponding to the decomposition temperature of a desired molecular structure can be obtained. The peak temperature of the thermal chromatogram correlates with a crosslinked structure in the structural body of a resin, and hence the peak temperature shifts to higher temperatures as the crosslinkage of the crosslinked structure becomes denser.

In the developer carrying member of the present disclosure, the IPN structure of the crosslinked urethane resin and the crosslinked acrylic resin is formed extremely near the outer surface of the surface layer, and hence both the resins are held at close positions even in a high-temperature environment. Thus, the interaction of an intermolecular force between the crosslinked urethane resin and the crosslinked acrylic resin can be exhibited even in the high-temperature environment, and hence a flaw due to the shaving of the surface of the developer carrying member caused by its sliding is suppressed even in the high-temperature environment. When the crosslinked urethane resin forms the IPN structure with the crosslinked acrylic resin, a crosslinking density around the resin relatively increases to make the outer surface of the surface layer stronger, thereby improving a suppressing effect on a flaw due to the shaving.

Accordingly, the developer carrying member of the present disclosure is a member including the electroconductive substrate and the single layer surface layer, and the surface layer includes the matrix containing the crosslinked urethane resin as the binder. In addition, E1≥200 MPa and 10 MPa≤E2≤100 MPa where E1 is the elastic modulus of the matrix in the first region of the surface layer and E2 is the elastic modulus of the matrix in the second region corresponding to a depth of from 1.0 μm to 1.1 μm from the outer surface. At this time, while an improvement in strength of the outer surface of the surface layer is effectively held, the flexibility of the surface layer can be sufficiently held, and hence a flaw due to the shaving of the surface layer and filming on the surface of the member can be suppressed at a higher level:

In addition, (E1−E3)/E3>1 where E3 is the elastic modulus of the matrix in the third region corresponding to a depth of from 0.5 µm to 0.6 µm from the outer surface of the surface layer, the elastic modulus being measured in the section. (E1−E3)/E3>1 is satisfied, while an improvement in strength of the outer surface of the surface layer is effectively held, the flexibility of the surface layer can be sufficiently held, and hence a flaw due to the shaving of the surface layer and the filming can be suppressed at a higher level:

The surface layer of the present disclosure contains the crosslinked acrylic resin, and hence the crosslinked acrylic resin forms the IPN structure for the crosslinked urethane resin. Thus, the strength of the outer surface of the surface layer is effectively improved, and hence a flaw due to the shaving of the surface layer and the filming can be suppressed at a higher level.

To recognize that the crosslinked acrylic resin of the present disclosure forms the IPN structure for the crosslinked urethane resin, a difference between the peak temperatures of the thermal chromatograms of a fragment derived from the crosslinked acrylic resin before and after the decomposition and removal of the crosslinked urethane resin in the composition only needs to be recognized. That is, A1>A2 where A1 is the peak top temperature of a thermal chromatogram derived from the crosslinked acrylic resin, the thermal chromatogram being measured from a first sample sampled from the first region, and A2 is the peak top temperature of a thermal chromatogram derived from the crosslinked acrylic resin, the thermal chromatogram being measured from a second sample obtained by decomposing the crosslinked urethane resin in the first sample. A case in which the A1 and the A2 satisfy A1>A2 is preferred because the strength of the outer surface of the surface layer is effectively improved, and hence a flaw due to the shaving of the surface layer and the filming can be suppressed at a higher level:

In addition, in the developer carrying member of the present disclosure, the first region and second region of the surface layer preferably satisfy T1>T2, where T1 represents the peak top temperature (° C.) of a thermal chromatogram derived from the crosslinked urethane resin in the first region, and T2 represents the peak top temperature (° C.) of a thermal chromatogram derived from the crosslinked urethane resin in the second region. When T1>T2 is satisfied, the strength of the outer surface of the surface layer is more effectively improved, and hence a flaw due to the shaving of the surface layer and the filming can be suppressed at a higher level.

In addition, a case in which the T1 and the T2 satisfy (T1−T2)>1.0 is more preferred because the IPN structure is properly formed by the crosslinked acrylic resin, and hence the strength of the outer surface can be sufficiently kept:

An object in the present disclosure is to achieve the suppression of a flaw due to the shaving of the surface of the developer carrying member and the suppression of contamination due to the toner, that is, filming in durable use of the developer carrying member in printing on many sheets under a high-temperature and high-humidity environment at a high level. Accordingly, it is preferred that the IPN structure by the crosslinked acrylic resin and the like be formed extremely near the outer surface in the surface layer. This is because of the following reason. When the IPN structure is formed up to a deeper region, a relatively hard film is obtained, and hence a load on the toner is raised. The load may worsen the filming. Accordingly, T1>T3 and |T1−T3|>|T3−T2| are more preferably satisfied:

Herein, T1 and T2 each have the above-mentioned meaning, and T3 represents the peak top temperature of a thermal chromatogram derived from the crosslinked urethane resin in the third region. A case in which T1>T3 and |T1−T3|>|T3−T2| are satisfied means that most of the IPN structure is formed up to a depth of less than 1 µm from the surface of the surface layer. Accordingly, both of a flaw due to the shaving of the surface layer and the filming can be suppressed at a high level.

When at least one kind of a modified silicone compound and a modified fluorine compound are incorporated into the above-mentioned surface layer, the acrylic monomer remains near the outer surface of the surface layer, and hence the IPN structure can be locally formed extremely near the outer surface. In addition, the permeation of the acrylic monomer deep into the surface layer can be suppressed, and hence appropriate flexibility of the surface layer can be held. Accordingly, both of a flaw due to the shaving of the surface layer and the filming can be suppressed at a higher level.

It is preferred that a monomer for forming the crosslinked acrylic resin be a polyfunctional monomer having acryloyl groups or methacryloyl groups as functional groups, and the total number of presence of the acryloyl groups and the methacryloyl groups in a molecule thereof be two or three. At this time, the monomer effectively stays near the outer surface to locally form the IPN structure extremely near the outer surface side. Accordingly, both of a flaw due to the shaving of the surface layer and the filming can be suppressed at a high level.

<<Toner>>

Next, the toner in the present disclosure is described below.

As described above, a conventional technical concept for improving the abrasion resistance of toner has been investigated in such directivity that the toner is allowed to resist a strong shear. Meanwhile, even when such technology is used, the toner may be unable to resist the shear depending on process conditions. The inventors have conceived a reason for the foregoing to be as described below.

In the developing device, the toner receives not only a strong shear but also a weak shear such as rubbing with a hard substance, such as a metal member or an external additive. Although it has been thought that such weak shear due to the rubbing has no influence at a glance, it has been found that when the toner particle is scratched with a substance harder than the particle, a small change such as a microscopic flaw occurs on the surface of the toner particle. In addition, when the rotation speed of the developer carrying member (developing roller) or the stirring speed of a developer is increased, the rotation and the stirring are repeated many times, and eventually, the change becomes larger. The inventors have found that the prevention of the change of the toner due to the foregoing requires not only toner design that can resist a strong shear but also preparation for a very small change due to a weak shear.

The toner in the present disclosure is a toner including the toner particle containing the binder resin and the colorant, and the toner particle has a Martens hardness of 85 to 1,100 MPa when measured under the condition of a maximum load of $2.0 \times 10^{-4}$ N.

A hardness is one mechanical property of the surface of a body or the vicinity of the surface, and represents the difficulty with the body is deformed or the difficulty with which the body is flawed when an attempt is made to deform or flaw the body with foreign matter. There exist various measurement methods for, and definitions of, the hardness. For example, the measurement methods are separately used depending on the width of a measurement region, and such separate use as described below is often performed: when the measurement region has a width of 10 μm or more, a Vickers method is used; when the region has a width of 10 μm or less, a nanoindentation method is used; and when the region has a width of 1 μm or less, an AFM method is used. With regard to the definitions, such separate use as described below is performed: a Brinell hardness or a Vickers hardness is used as an indentation hardness; a Martens hardness is used as a scratch hardness; and a Shore hardness is used as a rebound hardness.

In the measurement of the hardness of the toner particle, the nanoindentation method is a measurement method to be preferably used because its particle diameter is generally from 3 μm to 10 μm. According to an investigation by the inventors, the Martens hardness representing a scratch hardness was appropriate as the specification of the hardness for expressing the effects of the present disclosure. The inventors have conceived that this is because it is a scratch resistance that can represent the strength of the toner particle against scratching with a hard substance, such as a metal or an external additive, in the developing device.

When the Martens hardness of the toner particle is measured by the nanoindentation method, the hardness may be calculated from a load-displacement curve obtained by using a commercial apparatus in conformity with ISO 14577-1 in accordance with the procedure of an indentation test specified in ISO 14577-1. In the present disclosure, an ultra-fine indentation hardness tester "ENT-1100b" (manufactured by Elionix Inc.) is used as an apparatus in conformity with the ISO standard. Although a method for the measurement is described in "ENT1100 Operation Manual" attached to the apparatus, a specific measurement method is as described below.

With regard to a measurement environment, a temperature in a shielding case is kept at 30.0° C. with a temperature-controlling device attached to the apparatus. A state in which the atmospheric temperature is kept constant is effective in reducing variation in measured data due to, for example, thermal expansion or drift. A preset temperature is set to the condition of 30.0° C. assuming the temperature of the vicinity of the developing device where the toner is rubbed. A standard sample stand attached to the apparatus is used as a sample stand, and the toner is applied thereto. After that, weak air is blown against the toner so that the toner particle may be dispersed, and the sample stand is set in the apparatus and held for 1 hour or more, followed by the measurement.

The measurement is performed by using a flat indenter (titanium-made indenter having a diamond-made tip) whose tip is a 20-micrometer square flat surface, the indenter being attached to the apparatus, as an indenter. In the hardness measurement of a body having a small diameter and a spherical shape, a body to which an external additive adheres, or a body having unevenness on its surface like the toner particle, a flat indenter is used because the use of a pointed indenter has a large influence on measurement accuracy. The test is performed while the maximum load is set to $2.0 \times 10^{-4}$ N. When the test load is set to the value, the hardness can be measured under a condition corresponding to a stress received by one toner particle in a developing portion without the breakage of the surface layer of the toner particle. In the present disclosure, friction resistance is important, and hence it is important that the hardness be measured while the surface layer is maintained without being broken.

The toner particle that is present alone in a screen (size of a field of view: a horizontal width of 160 μm and a vertical width of 120 μm for measurement with a microscope attached to the apparatus is selected as a particle to be subjected to measurement. However, the particle having a particle diameter (D) in the range of a number-average particle diameter (D1)±0.5 μm (D1−0.5 μm≤D≤D1+0.5 μm) is selected in order that the error of a displacement amount may be reduced to the extent possible. In the measurement of the particle diameter of the particle to be subjected to measurement, the long diameter and short diameter of the toner particle were measured with software attached to the apparatus, and a value calculated from the expression "[(long diameter+short diameter)/2]" was adopted as the particle diameter D (μm). In addition, the number-average particle diameter is measured with "Coulter Counter Multisizer 3" (manufactured by Beckman Coulter, Inc.) by a method to be described later.

At the time of the measurement, 100 arbitrary toner particles whose particle diameters D (μm) each satisfy the condition are selected and subjected to the measurement. Conditions to be input at the time of the measurement are as described below.

Test mode: a loading-unloading test
Test load: 20.000 mgf(=$2.0 \times 10^{-4}$ N)
Number of divisions: 1,000 steps
Step interval: 10 msec When the measurement is performed by selecting an analysis menu "Data Analysis (ISO)," a Martens hardness is analyzed with the software attached to the apparatus and output after the measurement. The measurement is performed for the 100 toner particles, and the arithmetic average of the measured values is adopted as the Martens hardness in the present disclosure.

The adjustment of the Martens hardness of the toner particle measured under the conditions to 85 to 1,100 MPa was able to significantly improve the abrasion resistance of the toner on the developer carrying member according to the present disclosure as compared to a conventional one when the toner was combined with the developer carrying member. Thus, the degree of freedom in process design for improvements in speed and image quality was able to be improved.

In other words, the rotation speed of the developer carrying member (developing roller) can be increased. Further, such a wider range of alternatives as described below are available: a nip width between a toner-regulating blade and the developing roller in the developing device can be increased; and the mixing and stirring speed of a carrier can be increased. As a result, there was able to provide a developing device that was able to satisfactorily suppress a development stripe, a ghost, filming and a flaw on the surface of its developer carrying member, and fogging at the same time even when used in the formation of many electrophotographic images under a high-temperature and high-humidity environment.

The developer carrying member of the present disclosure applies a low stress to the toner particle because its outermost surface is reduced in friction coefficient by the impregnation treatment and has flexibility. Accordingly, in the present disclosure, the abrasion resistance of the toner was able to be significantly improved in the Martens hardness range of from 85 to 1,100 MPa that was wider than that of Japanese Patent Application Laid-Open No. 2018-194837.

Means for adjusting the Martens hardness to be measured under the condition of a maximum load of $2.0\times10^{-4}$ N to 85 to 1,100 MPa is not particularly limited. However, the hardness is much higher than the hardness of an organic resin used in a general toner particle, and is hence difficult to achieve with means that has been typically performed for a hardness improvement. The hardness is difficult to achieve with, for example, means for designing the resin so that its glass transition temperature may be high, means for increasing the molecular weight of the resin, means for thermally curing the resin, or means for adding a filler to the surface layer of the toner particle.

The Martens hardness of the organic resin used in the general toner particle is from about 50 MPa to about 80 MPa when measured under the condition of a maximum load of $2.0\times10^{-4}$ N, and hence the toner particle of the present disclosure is harder than the general toner particle.

[Surface Layer of Toner Particle]

When the toner particle includes a surface layer, the surface layer is a layer present on the outermost surface of the toner particle so as to cover a toner core particle. For example, a surface layer containing an organosilicon polymer is very hard as compared to a conventional toner particle, and hence when the surface layer containing the organosilicon polymer is used, a portion where no surface layer is formed is preferably arranged on part of the surface of the toner particle from the viewpoint of fixability.

[Binder Resin]

The toner particle contains the binder resin. The binder resin is not particularly limited, and a conventionally known resin may be used. A vinyl-based resin, a polyester resin, or the like is preferred. Examples of the vinyl-based resin, the polyester resin, and any other binder resin may include the following resins or polymers:

homopolymers of styrene and substituted products thereof, such as polystyrene and polyvinyltoluene; styrene-based copolymers, such as a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleic acid ester copolymer; and polymethyl methacrylate, polybutyl methacrylate, polyvinyl acetate, polyethylene, polypropylene, polyvinyl butyral, a silicone resin, a polyamide resin, an epoxy resin, a polyacrylic resin, a rosin, a modified rosin, a terpene resin, a phenol resin, an aliphatic or alicyclic hydrocarbon resin, and an aromatic petroleum resin. Those binder resins may be used alone or as a mixture thereof.

The binder resin preferably contains a carboxy group from the viewpoint of chargeability, and is preferably a resin produced by using a polymerizable monomer having a carboxy group. Examples thereof include: acrylic acid; derivatives of α-alkyl unsaturated carboxylic acids or β-alkyl unsaturated carboxylic acids, such as mathacrylic acid, α-ethylacrylic acid, and crotonic acid; unsaturated dicarboxylic acids, such as fumaric acid, maleic acid, citraconic acid, and itaconic acid; and unsaturated dicarboxylic acid monoester derivatives, such as succinic acid monoacryloyloxyethyl ester, succinic acid monoacryloyloxyethylene ester, phthalic acid monoacryloyloxyethyl ester, and phthalic acid monomethacryloyloxyethyl ester.

Polyester resins obtained by subjecting the following carboxylic acid components and alcohol components to polycondensation may each be used as the polyester resin. Examples of the carboxylic acid component include terephthalic acid, isophthalic acid, phthalic acid, fumaric acid, maleic acid, cyclohexanedicarboxylic acid, and, and trimellitic acid. Examples of the alcohol component include bisphenol A, hydrogenated bisphenol, an ethylene oxide adduct of bisphenol A, a propylene oxide adduct of bisphenol A, glycerin, trimethylolpropane, and pentaerythritol.

In addition, the polyester resin may be a polyester resin containing a urea group. It is preferred that a carboxy group at, for example, a terminal of the polyester resin be not capped.

The binder resin may have a polymerizable functional group for the purpose of alleviating a change in viscosity of the toner at high temperatures. Examples of the polymerizable functional group include a vinyl group, an isocyanate group, an epoxy group, an amino group, a carboxy group, and a hydroxy group.

[Crosslinking Agent]

A crosslinking agent may be added at the time of the polymerization of the polymerizable monomer for controlling the molecular weight of the binder resin.

Examples thereof include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinyl benzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400, and #600, dipropylene glycol diacrylate, polypropylene glycol diacrylate, polyester-type diacrylate (MANDA, Nippon Kayaku Co., Ltd.), and compounds obtained by changing the above-mentioned acrylates to methacrylates.

The addition amount of the crosslinking agent is preferably 0.001 to 15.000 parts by mass with respect to 100 parts by mass of the polymerizable monomer.

[Releasing Agent]

The toner particle preferably contains a releasing agent. Examples of the releasing agent that may be used in the toner particle include: a petroleum-based wax, such as a paraffin wax, a microcrystalline wax, or petrolatum, and derivatives thereof; a montan wax and derivatives thereof; a hydrocarbon wax obtained by a Fischer-Tropsch method and derivatives thereof; a polyolefin wax, such as polyethylene or polypropylene, and derivatives thereof; a natural wax, such as a carnauba wax or a candelilla wax, and derivatives thereof; a higher aliphatic alcohol; a fatty acid, such as stearic acid or palmitic acid, or acid amides, esters, and ketones thereof; hydrogenated castor oil and derivatives thereof; and a plant wax, an animal wax, and a silicone resin. The derivatives encompass an oxide, a block copolymer with a vinyl-based monomer, and a graft-modified product.

The content of the releasing agent is preferably 5.0 to 20.0 parts by mass with respect to 100.0 parts by mass of the binder resin or the polymerizable monomer.

[Colorant]

The toner particle contains the colorant. The colorant is not particularly limited, and for example, the following known colorants may each be used.

As yellow pigments, there are used yellow iron oxide, naples yellow, naphthol yellow S, hansa yellow G, hansa yellow 10G, benzidine yellow G, benzidine yellow GR, quinoline yellow lake, permanent yellow NCG, tartrazine lake, and other condensed azo compounds, isoindolinone compounds, anthraquinone compounds, azo metal complexes, methine compounds, and allyl amide compounds. Specific examples thereof include the following pigments: C.I. Pigment Yellow 12, 13, 14, 15, 17, 62, 74, 83, 93, 94, 95, 109, 110, 111, 128, 129, 147, 155, 168, and 180.

As orange pigments, there are given permanent orange GTR, pyrazolone orange, vulcan orange, benzidine orange G, indanthrene brilliant orange RK, and indanthrene brilliant orange GK.

As red pigments, there are given colcothar, permanent red 4R, lithol red, pyrazolone red, watching red calcium salt, lake red C, lake red D, brilliant carmine 6B, brilliant carmine 3B, eosin lake, rhodamine lake B, alizarin lake, and other condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specific examples thereof include the following pigments: C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

As blue pigments, there are given alkali blue lake, Victoria blue lake, phthalocyanine blue, metal-free phthalocyanine blue, partially chlorinated phthalocyanine blue, fast sky blue, indanthrene blue BG, and other copper phthalocyanine compounds and derivatives thereof, anthraquinone compounds, and basic dye lake compounds. Specific examples thereof include the following pigments: C.I. Pigment Blue 1, 7, 15, 15:1, 15:2, 15:3, 15:4, 60, 62, and 66.

As violet pigments, there are given fast violet B and methyl violet lake.

As green pigments, there are given Pigment Green B, malachite green lake, and final yellow green G. As white pigments, there are given zinc white, titanium oxide, antimony white, and zinc sulfide.

As black pigments, there are given carbon black, aniline black, nonmagnetic ferrite, magnetite, and pigments toned to black with the yellow colorants, the red colorants, and the blue colorants. Those colorants may be used alone or as a mixture thereof, and in the state of a solid solution.

The colorant may be subjected to surface treatment with a substance having no polymerization-inhibiting property as required. The content of the colorant is preferably 3.0 to 15.0 parts by mass with respect to 100.0 parts by mass of the binder resin or the polymerizable monomer.

[Charge Control Agent]

The toner particle may contain a charge control agent. A known charge control agent may be used as the charge control agent. In particular, a charge control agent having high charging speed and being capable of stably maintaining a constant charge quantity is preferred. Further, when the toner particle is produced by a direct polymerization method, a charge control agent having a low polymerization-inhibiting property and being substantially free of any component that elutes into an aqueous medium is particularly preferred.

Examples of the charge control agent which controls a toner particle so that the particle may be negatively chargeable include the following agents: as organometallic compounds and chelate compounds, a monoazo metal compound, an acetylacetone metal compound, and aromatic oxycarboxylic acid-, aromatic dicarboxylic acid-, oxycarboxylic acid-, and dicarboxylic acid-based metallic compounds. Other examples thereof include aromatic oxycarboxylic acids, and aromatic mono- and polycarboxylic acids, and metallic salts, anhydrides, or esters thereof, and phenol derivatives, such as bisphenol. Further, there are given a urea derivative, a salicylic acid-based compound containing a metal, a naphthoic acid-based compound containing a metal, a boron compound, a quaternary ammonium salt, and a calixarene.

Meanwhile, examples of the charge control agent which controls a toner particle so that the particle may be positively chargeable include the following agents: nigrosine and modified nigrosine compounds with a fatty acid metal salt; a guanidine compound; an imidazole compound; quaternary ammonium salts, such as a tributylbenzylammonium-1-hydroxy-4-naphtosulfonate and tetrabutylammonium tetrafluoroborate, and onium salts which are analogs of the above-mentioned compounds, such as a phosphonium salt, and lake pigments thereof; a triphenylmethane dye and a lake pigment thereof (examples of a laking agent include phosphotungstic acid, phosphomolybdic acid, phosphotungstic molybdic acid, tannic acid, lauric acid, gallic acid, a ferricyanide, and a ferrocyanide); a metal salt of a higher fatty acid; and a resin-based charge control agent. Those charge control agents may be used alone or in combination thereof. The addition amount of the charge control agent is preferably 0.01 to 10 parts by mass with respect to 100 parts by mass of the binder resin.

[External Additive]

Although the toner may be formed without any external addition to the toner particle, the toner may be formed by adding, for example, a fluidizing agent or a cleaning aid serving as a so-called external additive for improving its fluidity, chargeability, cleaning property, or the like.

Examples of the external additive include: inorganic oxide fine particles, such as silica fine particles, alumina fine particles, and titanium oxide fine particles; inorganic stearic acid compound fine particles, such as aluminum stearate fine particles and zinc stearate fine particles; and inorganic titanic acid compound fine particles, such as strontium titanate and zinc titanate. Those external additives may be used alone or in combination thereof.

Those inorganic fine particles are preferably subjected to surface treatment with a silane coupling agent, a titanium coupling agent, a higher fatty acid, a silicone oil, or the like for improving their heat-resistant storage stability and improving their environmental stability. The BET specific surface area of the external additive is preferably 10 to 450 $m^2/g$.

The BET specific surface area may be determined by a low-temperature gas adsorption method based on a dynamic constant-pressure method in accordance with a BET method (preferably a BET multipoint method). For example, the BET specific surface area ($m^2/g$) may be calculated by measurement through use of the BET multipoint method after a nitrogen gas has been caused to adsorb to the surface of the sample with a specific surface area measuring apparatus (product name: GEMINI 2375 Ver. 5.0, manufactured by Shimadzu Corporation).

The total addition amount of those various external additives is preferably 0.05 to 5 parts by mass, more preferably 0.1 to 3 parts by mass with respect to 100 parts by mass of the toner particle. In addition, various external additives may be used in combination as the external additives.

The toner preferably has positively charged particles on the surface of the toner particle. The number-average particle diameter of the positively charged particles is preferably 0.10 to 1.00 µm, more preferably 0.20 to 0.80 µm.

The presence of such positively charged particles makes the transfer efficiency of the toner satisfactory throughout durable use thereof. This is probably because of the following reason. When the positively charged particles each have the particle diameter, the particles can roll on the surface of the toner particle, and are rubbed between a photosensitive drum and a transfer belt to promote the negative charging of the toner. As a result, the toner is suppressed from becoming positive owing to the application of a transfer bias. The toner of the present disclosure is characterized in that its surface is hard, and hence the positively charged particles are hardly stuck to, or embedded in, the surface of the toner particle. Accordingly, the transfer efficiency can be maintained at a high value. The positively charged particles in the present disclosure are particles that are charged to positive polarity when triboelectrically charged by being mixed and stirred with a standard carrier (anionic: N-01) provided from the Imaging Society of Japan. The number-average particle diameter of the external additive is measured with a scanning electron microscope "S-4800" (manufactured by Hitachi, Ltd.). The toner having externally added thereto the external additive is observed, and the long diameters of 100 primary particles of the external additive are randomly measured in a field of view enlarged at a magnification of up to 200,000, followed by the determination of the number-average particle diameter. The observation magnification is appropriately adjusted in accordance with the size of the external additive.

Various methods are conceivable as means for causing the positively charged particles to be present on the surface of the toner particle, and any one of the methods is permitted. However, a method including applying the particles to the surface through external addition is preferred.

Preferred examples of the kind of the positively charged particles include hydrotalcite, titanium oxide, and a melamine resin. Of those, hydrotalcite is particularly preferred.

[Developing Agent]

Although the toner of the present disclosure may be used as a magnetic or nonmagnetic one-component developer, the toner may be used as a two-component developer by being mixed with a carrier.

Magnetic particles each formed of such a known material as described below may be used as the carrier: a metal, such as iron, ferrite, or magnetite, or an alloy of such metal and another metal, such as aluminum or lead. Of those, ferrite particles are preferably used. In addition, a coated carrier obtained by coating the surfaces of the magnetic particles with a coating agent, such as a resin, a resin dispersion-type carrier obtained by dispersing magnetic material fine powder in a binder resin, or the like may be used as the carrier.

The volume-average particle diameter of the carrier is preferably 15 to 100 µm, more preferably 25 to 80 µm.

[With Regard to Method of Producing Toner Particle]

A known method may be used as a method of producing the toner particle, and for example, a kneading pulverization method or a wet production method may be used. The wet production method may be preferably used from the viewpoints of the uniformization of particle diameters and shape controllability. Further, examples of the wet production method may include a suspension polymerization method, a dissolution suspension method, an emulsion polymerization aggregation method, and an emulsion aggregation method.

Herein, the suspension polymerization method is described. In the suspension polymerization method, first, a polymerizable monomer composition in which a polymerizable monomer for producing a binder resin, a colorant, and any other additive as required are uniformly dissolved or dispersed is prepared (polymerizable monomer composition preparing step). The dispersion is performed by using a disperser, such as a ball mill or an ultrasonic disperser. At this time, a polyfunctional monomer, a chain transfer agent, a wax serving as a releasing agent, a charge control agent, a plasticizer, or the like may be appropriately added as required. Preferred examples of the polymerizable monomer in the suspension polymerization method may include the following vinyl-based polymerizable monomers:

Styrene; styrene derivatives, such as α-methylstyrene, β-methylstyrene, o-methylstyrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decylstyrene, p-n-dodecylstyrene, p-methoxystyrene, and p-phenylstyrene; acrylic polymerizable monomers, such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers, such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters, such as vinyl acetate, vinyl propionate, vinyl benzoate, vinyl butyrate, and vinyl formate; vinyl ethers, such as vinyl methyl ether, vinyl ethyl ether, and vinyl isobutyl ether; and vinyl methyl ketone, vinyl hexyl ketone, and vinyl isopropyl ketone.

Next, the polymerizable monomer composition is loaded into an aqueous medium prepared in advance, and droplets each formed of the polymerizable monomer composition are formed in a desired toner particle size with a stirring machine or disperser having a high shear force (granulating step).

The aqueous medium in the granulating step preferably contains a dispersion stabilizer for controlling the particle diameter of the toner particle, sharpening the particle size distribution of the toner particles, and suppressing the coalescence of the toner particles in a production process for the toner particle. In general, the dispersion stabilizers are roughly classified into a polymer that expresses a repulsive force based on steric hindrance and a hardly water-soluble inorganic compound that achieves dispersion stabilization with an electrostatic repulsive force. The fine particles of the hardly water-soluble inorganic compound are suitably used because the fine particles are dissolved with an acid or an alkali, and hence can be easily removed by being dissolved through washing with an acid or an alkali after the polymerization of the polymerizable monomer composition.

A dispersion stabilizer containing any of magnesium, calcium, barium, zinc, aluminum, and phosphorus is preferably used as a dispersion stabilizer for the hardly water-soluble inorganic compound. It is more preferred that the dispersion stabilizer contain any of magnesium, calcium, aluminum, and phosphorus. Specific examples thereof include the following dispersion stabilizers: magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite. An organic compound, such as polyvinyl alcohol, gelatin, methylcellulose, methylhydroxypropylcellulose, ethylcellulose, carboxymethylcellulose sodium salt, or starch, may be used in combination with the dispersion stabilizer. Any such dispersion stabilizer is preferably used in an amount of 0.01 to 2.00 parts by mass with respect to 100 parts by mass of the polymerizable monomer.

Further, a surfactant may be used in combination in an amount of 0.001 to 0.1 part by mass with respect to 100 parts by mass of the polymerizable monomer for reducing the size of any such dispersion stabilizer. Specifically, commercially available nonionic, anionic, or cationic surfactants may be utilized. For example, sodium dodecyl sulfate, sodium tetradecyl sulfate, sodium pentadecyl sulfate, sodium octyl sulfate, sodium oleate, sodium laurate, potassium stearate, and calcium oleate are preferably used.

After the granulating step or while the granulating step is performed, the polymerization of the polymerizable monomer in the polymerizable monomer composition is performed at a temperature preferably set to 50° C. to 90° C. to provide a toner particle-dispersed liquid (polymerizing step).

In the polymerizing step, a stirring operation is preferably performed so that a temperature distribution in a vessel may be uniform. When a polymerization initiator is added, the operation may be performed at an arbitrary timing for an arbitrary time period. In addition, a temperature in the vessel may be increased in the latter half of the polymerization reaction for the purpose of obtaining a desired molecular weight distribution. Further, part of the aqueous medium may be evaporated through a distillation operation in the latter half of the reaction or after the completion of the reaction for removing an unreacted polymerizable monomer, a by-product, or the like to the outside of the system. The distillation operation may be performed under normal pressure or reduced pressure.

An oil-soluble initiator is generally used as the polymerization initiator to be used in the suspension polymerization method. Examples thereof include the following oil-soluble initiators: azo compounds, such as 2,2'-azobisisobutyronitrile, 2,2'-azobis-2,4-dimethylvaleronitrile, 1,1'-azobis(cyclohexane-1-carbonitrile), and 2,2'-azobis-4-methoxy-2,4-dimethylvaleronitrile; and peroxide-based initiators, such as acetylcyclohexyl sulfonyl peroxide, diisopropyl peroxycarbonate, decanoyl peroxide, lauroyl peroxide, stearoyl peroxide, propionyl peroxide, acetyl peroxide, tert-butyl peroxy-2-ethyl hexanoate, benzoyl peroxide, tert-butyl peroxyisobutyrate, cyclohexanone peroxide, methyl ethyl ketone peroxide, dicumyl peroxide, tert-butyl hydroperoxide, di-tert-butyl peroxide, tert-butyl peroxypivalate, and cumene hydroperoxide.

In the polymerization initiator, a water-soluble initiator may be used in combination as required, and examples thereof include the following water-soluble initiators: ammonium persulfate, potassium persulfate, 2,2'-azobis(N, N'-dimethyleneisobutyramidine) hydrochloride, 2,2'-azobis (2-amidinopropane) hydrochloride, azobis(isobutyramidine) hydrochloride, sodium 2,2'-azobisisobutyronitrile sulfonate, ferrous sulfate, and hydrogen peroxide.

Those polymerization initiators may be used alone or in combination thereof, and a chain transfer agent, a polymerization inhibitor, or the like may be further added and used for controlling the polymerization degree of the polymerizable monomer.

With regard to the particle diameter of the toner particle, the weight-average particle diameter thereof is preferably 3.0 to 10.0 μm from the viewpoint of obtaining a high-definition and high-resolution image. The weight-average particle diameter of the toner may be measured by a pore electrical resistance method. The weight-average particle diameter may be measured with, for example, "Coulter Counter Multisizer 3" (manufactured by Beckman Coulter, Inc.). The toner particle-dispersed liquid thus obtained is fed to a filtering step of subjecting the toner particle and the aqueous medium to solid-liquid separation.

The solid-liquid separation for obtaining the toner particle from the resultant toner particle-dispersed liquid may be performed by a general filtration method. After that, washing is preferably further performed by, for example, reslurrying or washing by the application of washing water for removing foreign matter that could not be completely removed from the surface of the toner particle. After sufficient washing has been performed, solid-liquid separation is performed again to provide a toner cake. After that, the cake is dried by a known drying method, and as required, the group of particles having particle diameters deviating from a predetermined value is separated by classification. Thus, the toner particle is obtained. At this time, the separated group of particles having particle diameters deviating from the predetermined value may be reused for improving the final yield.

When the surface layer containing the organosilicon polymer is formed, in the case of the formation of the toner particle in the aqueous medium, the surface layer may be formed by adding a hydrolyzed liquid of an organosilicon compound as described above while performing the polymerization step or the like in the aqueous medium. The surface layer may be formed by adding the hydrolyzed liquid of the organosilicon compound to the toner particle-dispersed liquid after the polymerization to be used as a core particle-dispersed liquid. In addition, when the toner particle is formed in a medium except the aqueous medium like a kneading pulverization method, the surface layer may be formed as follows: the resultant toner particle is dispersed in the aqueous medium to provide a liquid to be used as a core particle-dispersed liquid; and the hydrolyzed liquid of the organosilicon compound is added to the liquid as described above.

[Method of Measuring Physical Property of Toner]

<Measurement of Particle Diameter of Toner Particle>

A precision particle size distribution-measuring apparatus based on a pore electrical resistance method (product name: Coulter Counter Multisizer 3) and its dedicated software (product name: Beckman Coulter Multisizer 3 Version 3.51, manufactured by Beckman Coulter, Inc.) are used. An aperture diameter to be used is set to 100 μm, and the particle diameter of the toner particle is measured at a number of effective measurement channels of 25,000, followed by the analysis of the measured data to calculate the particle diameter. A solution prepared by dissolving special grade sodium chloride in ion-exchanged water so as to have a concentration of about 1 mass %, for example, ISOTON II (product name) manufactured by Beckman Coulter, Inc. may be used as an electrolyte aqueous solution to be used in the measurement. The dedicated software is set as described below prior to the measurement and the analysis.

In the "Change Standard Operating Method (SOM)" screen of the dedicated software, the total count number of a control mode is set to 50,000 particles, the number of times of measurement is set to 1, and a value obtained by using (standard particles each having a particle diameter of 10.0 manufactured by Beckman Coulter, Inc.) is set as a Kd value. A threshold and a noise level are automatically set by pressing a "Threshold/Measure Noise Level" button. In addition, a current is set to 1,600 ρA, a gain is set to 2, and an electrolyte aqueous solution is set to ISOTON II (product name), and a check mark is placed in a check box "Flush Aperture Tube after Each Run."

In the "Convert Pulses to Size Settings Screen" of the dedicated software, a bin spacing is set to a logarithmic particle diameter, the number of particle diameter bins is set to 256, and a particle diameter range is set to 2 to 60 μm.

A specific measurement method is as described below.

(1) About 200 mL of the electrolyte aqueous solution is charged into a 250-milliliter round-bottom beaker made of glass dedicated for Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "Flush Aperture Tube" function of the dedicated software.

(2) About 30 mL of the electrolyte aqueous solution is charged into a 100-milliliter flat-bottom beaker made of glass. About 0.3 mL of a diluted solution prepared by diluting Contaminon N (product name) (10 mass % aqueous solution of a neutral detergent for washing a precision measuring device, manufactured by Fujifilm Wako Pure Chemical Corporation) with ion-exchanged water by three parts by mass fold is added to the electrolyte aqueous solution.

(3) A predetermined amount of ion-exchanged water and about 2 mL of the Contaminon N (product name) are charged into the water tank of an ultrasonic dispersing unit (product name: Ultrasonic Dispersion System Tetora 150, manufactured by Nikkaki Bios Co., Ltd.) in which two oscillators each having an oscillatory frequency of 50 kHz are built so as to be out of phase by 180° and which has an electrical output of 120 W.

(4) The beaker in the section (2) is set in the beaker fixing hole of the ultrasonic dispersing unit, and the ultrasonic dispersing unit is operated. Then, the height position of the beaker is adjusted in order that the liquid surface of the electrolyte aqueous solution in the beaker may resonate with an ultrasonic wave from the ultrasonic dispersing unit to the fullest extent possible.

(5) About 10 mg of the toner (particle) is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted so as to be 10° C. to 40° C. upon ultrasonic dispersion.

(6) The electrolyte aqueous solution in the section (5) in which the toner (particle) has been dispersed is dropped with a pipette to the round-bottom beaker in the section (1) placed in the sample stand, and the concentration of the toner particle to be measured is adjusted to about 5 mass %. Then, measurement is performed until the particle diameters of 50,000 particles are measured.

(7) The measurement data is analyzed with the dedicated software included with the apparatus, and the weight-average particle diameter (D4) is calculated. The "Average Diameter" on the "Analysis/Volume Statistics (Arithmetic Average)" screen of the dedicated software when the dedicated software is set to show a graph in a vol % unit is the weight-average particle diameter (D4). In addition, the "Average Diameter" on the "Analysis/Number Statistics (Arithmetic Average)" screen of the dedicated software when the dedicated software is set to show a graph in a number % unit is the number-average particle diameter (D1).

[Developing Device]

The developing device according to the present disclosure is applicable to any one of conventionally known developing devices as long as the developing device is a combination of the developer carrying member and the toner according to the present disclosure.

Figure 2:
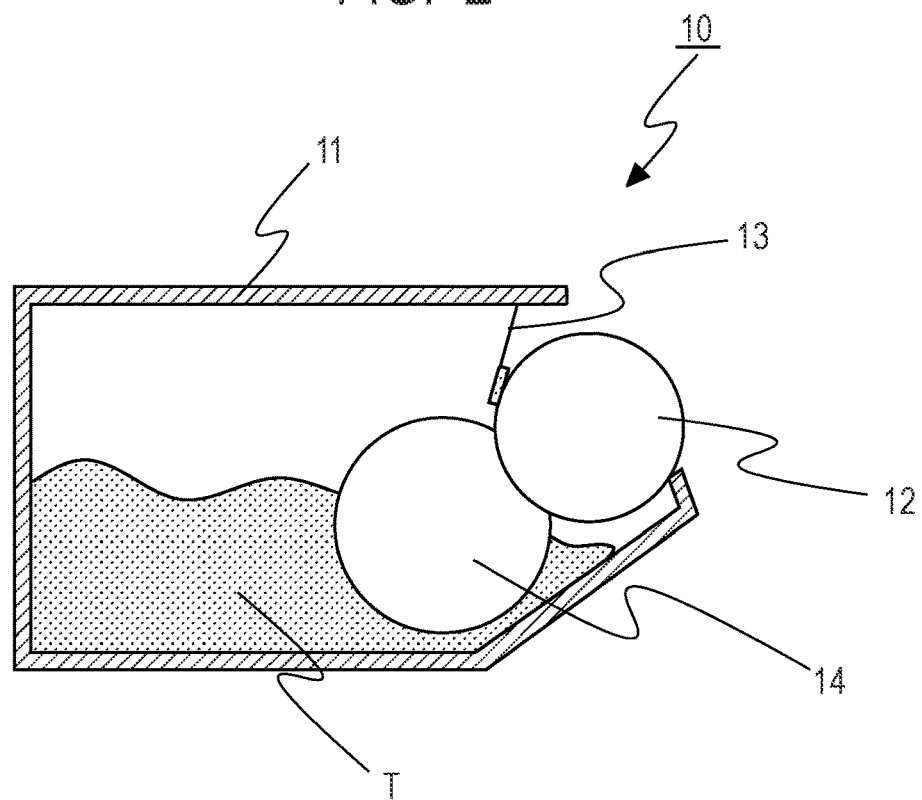
FIG. 2 is a schematic view of a developing device according to one aspect of the present disclosure.

For example, a developing device 10 includes a toner container 11 in which a toner T is stored and a developer carrying member of a roller shape (also referred to as "developing roller") 12 arranged in the opening portion of the toner container for conveying the toner to the outside of the toner container as illustrated in FIG. 2. In addition, the developing device includes a developing blade 13 that is a toner-regulating member, and a toner-supplying roller 14 on the upstream side of the rotation of the developing roller 12, the toner-supplying roller being brought into abutment with the developing roller 12 under a rotatable state. In addition, the developing device has arranged therein an end portion-sealing member (not shown) arranged in the end portion of the opening portion of the toner container 11, the member being brought into abutment with the developing roller 12. The end portion-sealing member includes a member, such as sponge or felt, in accordance with the shape of the opening portion of the toner container formed in correspondence with the shapes of both the end peripheral surfaces of the developer carrying member, and serves to prevent the leakage of the toner to the outside by being pressed against each of both the end peripheral surfaces of the developing roller. The toner and the developer carrying member according to the present disclosure are applied to the toner T and the developer carrying member 12. When a two-component toner is used, the toner container 11 may include a stirring member for stirring the toner and a carrier as required.

[Electrophotographic Process Cartridge and Electrophotographic Image Forming Apparatus]

An electrophotographic image forming apparatus of the present disclosure is not particularly limited, but includes, for example, the following configurations: an image-bearing member for bearing an electrostatic latent image; a charging device for primarily charging the image-bearing member; an exposing device for forming an electrostatic latent image on the image-bearing member that is primarily charged; a developing device for developing the electrostatic latent image with a toner to form a toner image; and a transferring device for transferring the toner image onto a transfer material. The electrophotographic image forming apparatus according to the present disclosure includes at least the developing device of the present disclosure as the developing device.

In addition, an electrophotographic process cartridge of the present disclosure includes the developing device of the present disclosure, and is detachably attachable to the main body of an electrophotographic image forming apparatus.

Figure 3:
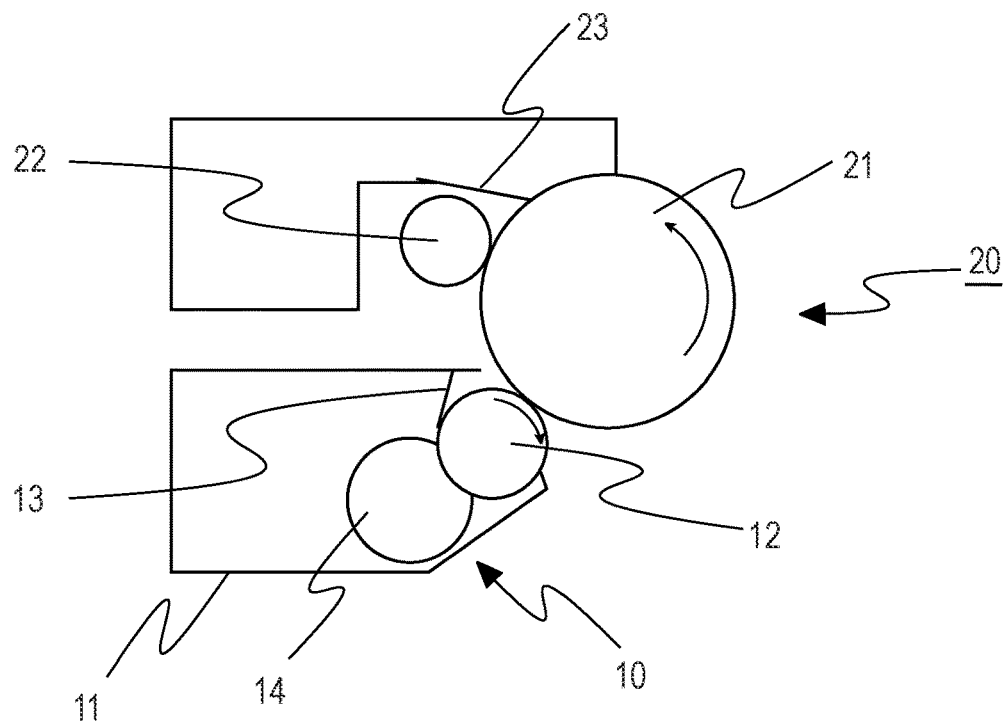
FIG. 3 is a schematic view of an electrophotographic process cartridge according to one aspect of the present disclosure.
Figure 4:
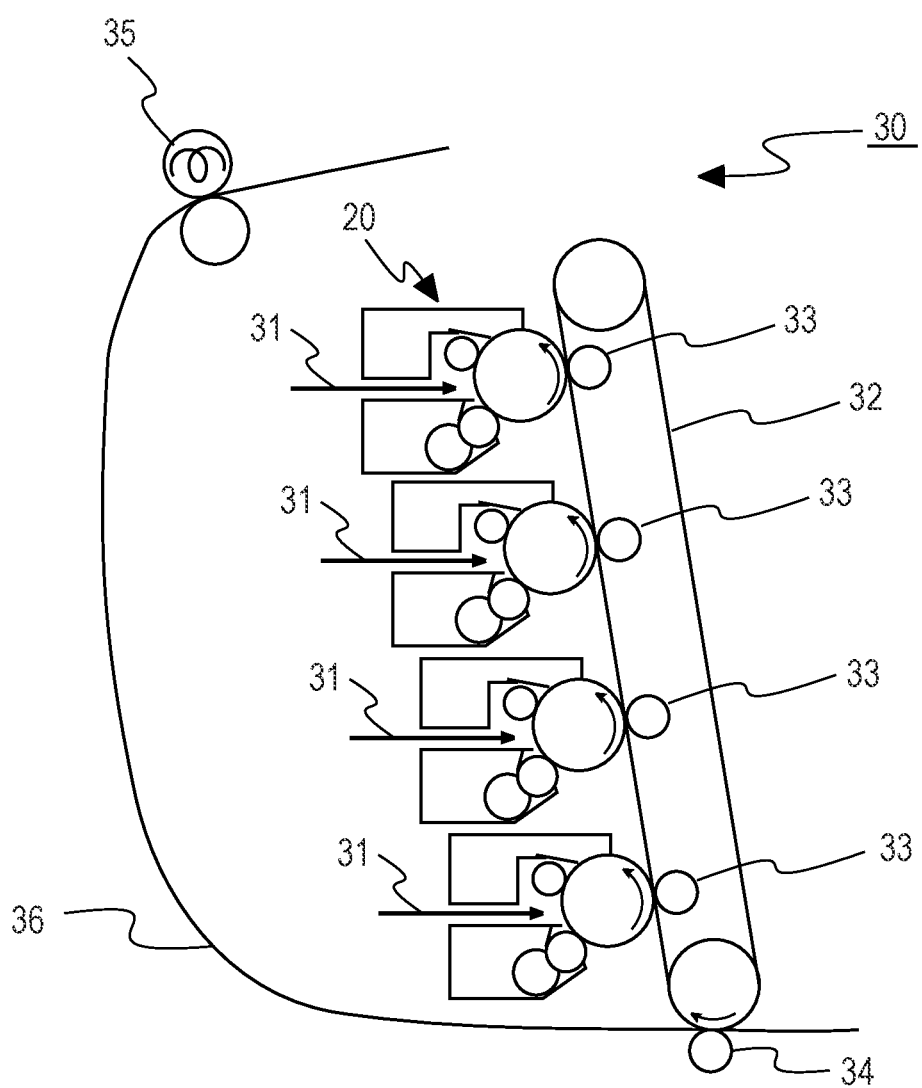
FIG. 4 is a schematic view of an electrophotographic image forming apparatus according to one aspect of the present disclosure.

FIG. 3 is an enlarged sectional view of an electrophotographic process cartridge 20 serving as one aspect of the present disclosure. The process cartridge 20 includes: an image-bearing member 21 such as a photosensitive drum; a charging device including a charging member 22; a developing device 10 including the developer carrying member 12 as illustrated in FIG. 2; and a cleaning device including a cleaning member 23. In addition, FIG. 4 is a schematic view of an electrophotographic image forming apparatus serving as one aspect of the present disclosure. In addition, the process cartridge 20 is detachably attachable to the main body of an electrophotographic image forming apparatus 30 of FIG. 4.

The image-bearing member 21 is uniformly charged (primarily charged) by the charging member 22 connected to a bias power source (not shown). The charging potential of the image-bearing member 21 at this time is −800 to −400 V. Next, as illustrated in FIG. 4, exposure light 31 for writing an electrostatic latent image is applied from an exposing device (not shown) to form the electrostatic latent image on the surface of the image-bearing member 21. Any one of LED light and laser light may be used as the exposure light 31. The surface potential of the image-bearing member 21 in the exposed portion is −200 to −100 V.

Next, a toner charged to negative polarity by the developing roller 12 of the developing device 10 is applied (developed) to the electrostatic latent image to form a toner image on the image-bearing member 21. Thus, the electrostatic latent image is converted into a visible image. At this time, a voltage of −500 to −300 V or less is applied to the developer carrying member 12 by a bias power source (not shown). The developer carrying member 12 is brought into contact with the image-bearing member 21 at a nip width of 0.5 to 3 mm.

The toner image developed on the image-bearing member 21 is primarily transferred onto an intermediate transfer belt 32. A primary transfer member 33 is brought into abutment with the rear surface of the intermediate transfer belt 32, and the application of a voltage of +100 to +1,500 V to the primary transfer member 33 primarily transfers the toner image of negative polarity from the image-bearing member 21 onto the intermediate transfer belt 32. The primary transfer member 33 may be a roller shape, or may be a blade shape.

When the electrophotographic image forming apparatus is a full-color image forming apparatus, the respective steps of charging, exposure, development, and primary transfer are performed for each of a yellow color, a cyan color, a magenta color, and a black color. To that end, in the electrophotographic image forming apparatus 30 illustrated in FIG. 4, a total of the four process cartridges 20 each containing the toner of one of the respective colors are detachably attachable to the main body of the electrophotographic image forming apparatus. In addition, the respective steps of charging, exposure, development, and primary transfer are sequentially performed at a predetermined time difference to establish a state in which the toner images of the four colors for representing a full-color image are superimposed on the intermediate transfer belt 32.

The toner images on the intermediate transfer belt 32 are conveyed to a position facing a secondary transfer member 34 along with the rotation of the intermediate transfer belt 32. Recording paper is conveyed into a space between the intermediate transfer belt 32 and the secondary transfer member 34 at a predetermined timing along a recording paper-conveying route 36, and the application of a secondary transfer bias to the secondary transfer member 34 transfers the toner images on the intermediate transfer belt 32 onto the recording paper. At this time, a bias voltage to be applied to the secondary transfer member 34 is +1,000 to +4,000 V. The recording paper onto which the toner images have been transferred by the secondary transfer member 34 is conveyed to a fixing device 35, and the toner images on the recording paper are melted to be fixed onto the recording paper. After that, the recording paper is discharged to the outside of the electrophotographic image forming apparatus. Thus, a printing operation is completed.

The toner remaining on the image-bearing member 21 without being transferred from the image-bearing member 21 onto the intermediate transfer belt 32 is scraped off by the cleaning member 23 for cleaning the surface of the image-bearing member 21. Thus, the surface of the image-bearing member 21 is cleaned.

According to one aspect of the present disclosure, the developing device that can satisfactorily suppress a development stripe, a ghost, filming and a flaw on the surface of its developer carrying member, and fogging at the same time even when used in the formation of many electrophotographic images under a high-temperature and high-humidity environment can be provided.

EXAMPLES

Now, the present disclosure is described in more detail by way of specific Examples. However, the technical scope of the present disclosure is not limited to these Examples. In the following description, the simple expression "part(s)" refers to "part(s) by mass."

[Production of Developing Roller]
(Developing Roller 1)

A developing roller 1 was produced as a developer carrying member to be used in Examples in accordance with the following procedure.

[Production of Electroconductive Substrate]

A primer (product name: DY35-051, manufactured by Dow Corning Toray Co., Ltd.) was applied to a cored bar made of SUS304 having an outer diameter of 6 mm and a length of 270 mm, and was heated at a temperature of 150° C. for 20 minutes. The cored bar was arranged in a cylindrical mold having an inner diameter of 12.0 mm so as to be concentric therewith.

An addition-type silicone rubber composition obtained by mixing materials shown in Table 1 below with a kneader (product name: Trimix TX-15, manufactured by Inoue Mfg., Inc.) as a material for an intermediate layer was injected into the mold heated to a temperature of 115° C. After having been injected, the material was heated and molded at a temperature of 120° C. for 10 minutes, and was cooled to room temperature, followed by removal from the mold. Thus, an electroconductive substrate (elastic roller) in which an intermediate layer having a thickness of 3.0 mm was formed on the outer periphery of the cored bar was obtained.

TABLE 1

| Material | Part(s) by mass |
| --- | --- |
| Liquid dimethylpolysiloxane having two or more silicon atom-bonded alkenyl groups in a molecule thereof (product name: SF3000E, viscosity: 10,000 cP, vinyl group equivalent: 0.05 mmol/g, manufactured by KCC Corporation) | 100 |
| Platinum-based catalyst (product name: SIP6832.2, manufactured by Gelest, Inc.) | 0.048 |
| Dimethylpolysiloxane having two or more silicon atom-bonded hydrogen atoms in a molecule thereof (product name: SP6000P, Si-H group equivalent: 15.5 mmol/g, manufactured by KCC Corporation) | 0.5 |
| Carbon black (product name: TOKABLACK #73605B, manufactured by Tokai Carbon Co., Ltd.) | 6.0 |

[Formation of Surface Layer]

In the formation of the surface layer, first, a resin layer is formed. As materials for the resin layer, materials except roughness-forming particles in Table 2 below were stirred and mixed. After that, the mixture was dissolved in methyl ethyl ketone (manufactured by Kishida Chemical Co., Ltd.) so that a solid content concentration became 30 mass %, and the materials were mixed, followed by uniform dispersion with a sand mill. Materials shown in the column "Roughness-forming particles" in Table 2 were added to the mixed liquid having added thereto methyl ethyl ketone to adjust the solid content concentration to 25 mass %, and the materials were stirred and dispersed with a ball mill to provide a coating material 1 for a resin layer. The elastic roller was immersed in the coating material, and the coating material was applied to the roller so that the thickness of the resin layer became about 15 After that, the coating film was dried and cured by being heated at a temperature of 135° C. for 60 minutes. Thus, the resin layer was formed.

TABLE 2

| Material | Part(s) by mass |
|---|---|
| Polyether polyol (product name: PTGL1000, manufactured by Hodogaya Chemical Co., Ltd.) | 100 |
| Polymeric MDI (product name: MR-400, manufactured by Tosoh Corporation) | 36.0 |
| Carbon black (product name: SUNBLACK X15, manufactured by Asahi Carbon Co., Ltd.) | 29.3 |
| Polyether monool (product name: NEWPOL 50HB100, manufactured by Sanyo Chemical Industries, Ltd.) | 3.0 |
| Modified silicone oil (product name: TSF4445, manufactured by Momentive Performance Materials Japan LLC) | 0.6 |
| Roughness-forming particles (product name: DAIMICBEAZ UCN-5090, manufactured by Dainichiseika Color & Chemicals Mfg. Co., Ltd.) | 17.6 |

Subsequently, the impregnation treatment and curing treatment of the acrylic monomer are performed by the following methods. As materials for an impregnation treatment liquid for the impregnation treatment, materials shown in Table 3 below were dissolved and mixed. The elastic roller having formed thereon the resin layer was treated by being immersed in the impregnation treatment liquid for 2 seconds so that the acrylic monomer component was impregnated into the layer. After that, the elastic roller was air-dried at normal temperature for 30 minutes, and was dried at 90° C. for 1 hour so that the solvent of the liquid was volatilized. While the elastic roller after the drying was rotated, UV light was applied so that its integrated light quantity became 15,000 mJ/cm$^2$, thereby curing the acrylic monomer. Thus, the surface layer was formed. A high-pressure mercury lamp (product name: HANDY TYPE UV CURING DEVICE, manufactured by Marionetwork) was used as a UV irradiation device.

TABLE 3

| Material | Part(s) by mass |
|---|---|
| Bifunctional acrylic monomer (product name: EBECRYL 145, manufactured by Daicel-Allnex Ltd.) | 5 |
| Photopolymerization initiator (product name: IRGACURE 184, manufactured by BASF SE) | 0.25 |
| Solvent (product name: methyl ethyl ketone, manufactured by Kishida Chemical Co., Ltd.) | 100 |

The resultant developing roller 1 was subjected to the following evaluations.

[Evaluation Method]

<Measurement of SPM Elastic Modulus>

The elastic moduli E1 to E3 of the first region to third region of the roller were determined by the above-mentioned method of measuring a SPM elastic modulus. Further, the value of the ratio "(E1−E3)/E3" was determined by substituting the elastic moduli E1 and E3 obtained by the measurement into the left side of (E1−E3)/E3>1. The results are shown in Table 7.

<Measurement of T1, T2, T3, A1, and A2>

The thermal chromatogram of a sample sampled from each of the above-mentioned first region to third region was obtained by the above-mentioned microsampling mass spectrometry. The peak top temperatures T1, T2, and T3 of thermal chromatograms derived from a crosslinked urethane resin in the respective first region, second region, and third region were obtained from the resultant thermal chromatograms. In addition, the peak top temperature A1 of a thermal chromatogram derived from a crosslinked acrylic resin was obtained from the first sample of the first region. Further, the peak top temperature A2 of a thermal chromatogram derived from the crosslinked acrylic resin, the thermal chromatogram being measured from a second sample obtained by decomposing the crosslinked urethane resin in the first sample, was obtained. With regard to each of the second and third regions, the surface of the roller was polished and removed to a predetermined depth with a rubber roll mirror finishing machine (product name: SZC, manufactured by Minakuchi Machinery Works Ltd.), and a flake was similarly cut out of a newly appearing surface with a microtome. Further, samples (a third sample and a fourth sample) for microsampling mass spectrometry were collected from the flake. In addition, the A2 is a value obtained by performing the microsampling mass spectrometry in the second sample obtained after the decomposition of the crosslinked urethane resin by a pyridine decomposition method to be described later. Each of the values is a value obtained by arithmetically averaging the respective peak temperatures obtained through five times of measurement. The results are shown in Table 7.

<Pyridine Decomposition Method>

A pyridine decomposition method is a method of selectively decomposing a urethane bond. When the pyridine decomposition method is performed in a sample having the IPN structure of the crosslinked acrylic resin and the crosslinked urethane resin, the crosslinked acrylic resin after the removal of a structure derived from the crosslinked urethane resin can be obtained. In addition, a change in peak temperature of a thermal chromatogram caused by the presence or absence of the IPN structure can be grasped. The pyridine decomposition method is specifically performed by the following method.

A sample having a thickness of 0.1 μm was cut out of the surface of the developing roller with a microtome, and 500 mg of the sample was collected. 0.5 Milliliter of a mixed liquid obtained by mixing pyridine (manufactured by FUJI-FILM Wako Pure Chemical Corporation) and water at 3:1 was added to the resultant sample, and the sample was decomposed by being heated in a closed container made of a fluorine resin ("TEFLON (trademark)") with a stainless steel jacket at 130° C. for 15 hours. The resultant decomposed product was treated under reduced pressure so that pyridine was removed. The value of the A2 was obtained by performing the above-mentioned microsampling mass spectrometry through use of the sample thus obtained.

(Developing Rollers 2 to 10, 13 to 15, 19 to 22, and 24)

By the same method as that of the developing roller 1, respective coating materials for resin layers were prepared by using materials shown in Table 4, respective impregnation treatment liquids were prepared by using materials shown in Table 5, and respective developing rollers were produced in accordance with such combinations as shown in Table 6. The resultant developing rollers were each subjected to physical property measurement by the same method as that of Example 1. The results of the physical property measurement are shown in Table 7.

(Developing Roller 11)

The thickness of the resin layer was changed to 5 μm by setting the solid content concentration of the coating material for a resin layer before its mixing with the roughness-forming particles to 20 mass %. By the same method as that of the developing roller 1 except the foregoing, the coating material 1 for a resin layer was prepared by using materials shown in Table 4, an impregnation treatment liquid 1 was prepared by using materials shown in Table 5, and a developing roller 11 was produced in accordance with such a combination as shown in Table 6. The resultant developing roller 11 was subjected to physical property measurement by the same method as that of Example 1. The results of the physical property measurement are shown in Table 7.

(Developing Roller 12)

The thickness of the resin layer was changed to 30 μm by setting the solid content concentration of the coating material for a resin layer before its mixing with the roughness-forming particles to 32 mass %. By the same method as that of the developing roller 1 except the foregoing, the coating material 1 for a resin layer was prepared by using materials shown in Table 4, an impregnation treatment liquid 1 was prepared by using materials shown in Table 5, and a developing roller 12 was produced in accordance with such a combination as shown in Table 6. The resultant developing roller 12 was subjected to physical property measurement by the same method as that of Example 1. The results of the physical property measurement are shown in Table 7.

(Developing Rollers 16 to 18)

First, the following ionic compound I was synthesized as a constituent material for a resin layer.

(Ionic Compound I)

Under a nitrogen atmosphere, 15.0 g of imidazole (manufactured by the Nippon Synthetic Chemical Industry Co., Ltd.) and 9.2 g of a 60% dispersed liquid of sodium hydride in liquid paraffin (manufactured by Tokyo Chemical Industry Co., Ltd.) were dissolved in 60.0 g of tetrahydrofuran. 60.7 Grams of 2-bromoethanol (manufactured by Tokyo Chemical Industry Co., Ltd.) dissolved in 80.0 g of tetrahydrofuran was dropped into the mixture at room temperature over 30 minutes, and then the whole was heated to reflux at 85° C. for 12 hours. Next, 100 ml of water was added to the reaction liquid, and the solvent was evaporated under reduced pressure. 200 Milliliters of ethanol was added to the residue, and the mixture was stirred at room temperature, followed by the removal of insoluble matter by Celite filtration. After that, the solvent was evaporated under reduced pressure again. The resultant product was dissolved in 200 ml of pure water, and 69.6 g of lithium N,N-bis(trifluoromethanesulfonyl)imide (product name: EF-N115, manufactured by Mitsubishi Materials Electronic Chemicals Co., Ltd.) was added as an anionic raw material to the solution, followed by stirring under room temperature for 1 hour. 200 Milliliters of ethyl acetate was added to the reaction liquid, and an organic layer was washed with 120 g of ion-exchanged water three times. Next, ethyl acetate was evaporated under reduced pressure. Thus, the ionic compound I was obtained. The ionic compound I is a compound represented by the following structural formula (7).

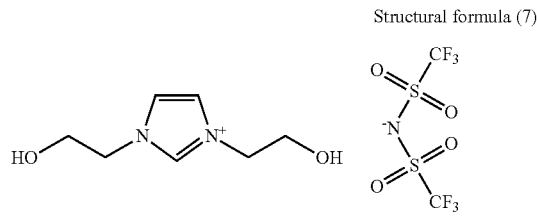

Structural formula (7)

By the same method as that of the developing roller 1, respective coating materials 15 to 17 for resin layers were prepared by using the ionic compound I and materials shown in Table 4, the impregnation treatment liquid 2 was prepared by using the materials shown in Table 5, and respective developing rollers were produced in accordance with such combinations as shown in Table 6. The resultant developing rollers were each subjected to physical property measurement by the same method as that of Example 1. The results of the physical property measurement are shown in Table 7.

(Developing Roller 23)

A synthetic liquid containing a photopolymerizable polymer A described in Examples of Japanese Patent Application Laid-Open No. 2014-197064 was obtained. Specifically, 1.66 g (0.36 mmol) of an acrylate-modified silicone oil (manufactured by Shin-Etsu Chemical Co., Ltd., "X-22-174DX"), 5.61 g (13 mmol) of 2-(perfluorohexyl)ethyl acrylate (manufactured by Daikin Industries, Ltd., "R-1620"), 1.69 g (13 mmol) of 2-hydroxyethyl methacrylate (manufactured by Tokyo Chemical Industry Co., Ltd.), 7.37 g (73.64 mmol) of methyl methacrylate (manufactured by Junsei Chemical Co., Ltd.), 1.24 g (4 mmol) of methyl 1,1'-azobis(1-cyclohexanecarboxylate) (manufactured by FUJIFILM Wako Pure Chemical Corporation, "VE-073"), and 75 g of methyl ethyl ketone (MEK) were loaded into a 100-milliliter reaction flask, and bubbling with nitrogen was performed for 5 minutes while the mixture was stirred. After that, the internal liquid was polymerized at a temperature of 75° C. for 7 hours to produce a copolymer. After that, 2.02 g (13 mmol) of 2-isocyanatoethyl methacrylate (manufactured by Showa Denko K.K., "KARENZ MOI") and 0.001 g of bismuth tris(2-ethylhexanoate) (manufactured by FUJIFILM Wako Pure Chemical Corporation) were added to the reaction flask, and then the internal liquid was stirred at a temperature of 75° C. for 10 hours to cause the hydroxy group of a polymerization unit based on 2-hydroxyethyl methacrylate in the copolymer and the isocyanate group of 2-isocyanatoethyl methacrylate to react with each other. Thus, a solution containing the photopolymerizable polymer A was obtained. By the same method as that of the developing roller 1 except that the solution was used as a material for an impregnation treatment liquid, a coating material 4 for a resin layer was prepared by using materials shown in Table 4, an impregnation treatment liquid 4 was prepared by using materials shown in Table 5, and a developing roller 23 was produced in accordance with such a combination as shown in Table 6. The resultant developing roller 23 was subjected to physical property measurement by the same method as that of Example 1. The results of the physical property measurement are shown in Table 7.

(Developing Roller 25)

By the same method as that of the developing roller 1 except that the impregnation treatment and curing treatment of the acrylic monomer were not performed, a coating material for a resin layer was prepared by using materials shown in Table 4, and a developing roller 25 was produced in accordance with such a combination as shown in Table 6. The resultant developing roller 25 was subjected to physical property measurement by the same method as that of Example 1. The results of the physical property measurement are shown in Table 7.

(Developing Roller 26)

A coating material 11 for a resin layer was prepared by using a surface modification agent A described in Examples of Japanese Patent Application Laid-Open No. 2017-049282 as a material for a coating material for a resin layer, and by using materials shown in Table 4, and a developing roller 26 was produced in accordance with such a combination as shown in Table 6. The resultant developing roller 26 was subjected to physical property measurement by the same method as that of Example 1. The results of the physical property measurement are shown in Table 7.

TABLE 4

| Classification | Material name | Number of coating material for resin layer ||||||||
|---|---|---|---|---|---|---|---|---|---|
| | | 1 | 2 | 3 | 4 | 5 | 6 | 7 | 8 |
| Polyol | PTGL1000 | 100 | 100 | — | 100 | — | 100 | 100 | 100 |
| | PTGL3500 | — | — | 100 | — | 100 | — | — | — |
| Isocyanate | MR-400 | 36.0 | 36.0 | 6.3 | 36.0 | 3.6 | 36.0 | 36.0 | 36.0 |
| Thermoplastic urethane resin | ME-8115LP | — | — | — | — | — | — | — | — |
| Carbon black | SUNBLACK X15 | 29.3 | 29.3 | 26.3 | 29.3 | 26.1 | 29.3 | 29.3 | 29.3 |
| Silica | MSP-013 | — | — | — | — | — | — | — | — |
| Monool component | 50HB-100 | 3.0 | 3.0 | 3.0 | 3.0 | 3.0 | 3.0 | 3.0 | 3.0 |
| Modified silicone compound | T5F4445 | 0.6 | 1.2 | 1.1 | — | — | 1.2 | 1.2 | 3.6 |
| Modified fluorine compound | MEGAFACE F430 | — | — | — | — | — | — | — | — |
| Ionic compound | Ionic compound I | — | — | — | — | — | — | — | — |
| Acrylate-derived copolymer | Surface modification agent A | — | — | — | — | — | — | — | — |
| | UCN-5090 | 17.6 | 17.6 | 15.8 | 17.6 | 15.7 | — | — | 17.6 |
| | UCN-5070 | — | — | — | — | — | 17.6 | — | — |
| Roughness-forming particles | UCN-5150 | — | — | — | — | — | — | 17.6 | — |
| | C-200 | — | — | — | — | — | — | — | — |
| | C-1000 | — | — | — | — | — | — | — | — |
| | CE-300TH | — | — | — | — | — | — | — | — |

| Classification | Material name | Number of coating material for resin layer |||||||||
|---|---|---|---|---|---|---|---|---|---|---|
| | | 9 | 10 | 11 | 12 | 13 | 14 | 15 | 16 | 17 |
| Polyol | PTGL1000 | — | 100 | 100 | 100 | 100 | 100 | — | — | — |
| | PTGL3500 | — | — | — | — | — | — | 100 | 100 | 100 |
| Isocyanate | MR-400 | — | 36.0 | 36.0 | 36.0 | 36.0 | 36.0 | 6.4 | 6.4 | 17.2 |
| Thermoplastic urethane resin | ME-8115LP | 100 | — | — | — | — | — | — | — | — |
| Carbon black | SUNBLACK X15 | 29.3 | 29.3 | 29.3 | 29.3 | 29.3 | 29.3 | 26.4 | 26.4 | 30.4 |
| Silica | MSP-013 | — | — | — | — | — | 5.9 | — | — | — |
| Monool component | 50HB-100 | 3.0 | 3.0 | 3.0 | 3.0 | 3.0 | 3.0 | 3.0 | 3.0 | 3.0 |
| Modified silicone compound | T5F4445 | — | — | — | 1.2 | 1.2 | 1.2 | 1.1 | 1.1 | 1.1 |
| Modified fluorine compound | MEGAFACE F430 | — | 1.2 | — | — | — | — | — | — | — |
| Ionic compound | Ionic compound I | — | — | — | — | — | — | 0.1 | 0.1 | 12.2 |
| Acrylate-derived copolymer | Surface modification agent A | — | — | 3.6 | — | — | — | — | — | — |
| | UCN-5090 | 17.6 | 17.6 | 17.6 | — | — | — | 15.8 | 110.0 | 15.8 |
| | UCN-5070 | — | — | — | — | — | — | — | — | — |

TABLE 4-continued

| | | | | | | | | | | | |
|---|---|---|---|---|---|---|---|---|---|---|---|
| Roughness- | UCN-5150 | — | — | — | — | — | — | — | — | — | — |
| forming | C-200 | — | — | — | 17.6 | — | — | — | — | — | — |
| particles | C-1000 | — | — | — | — | 17.6 | — | — | — | — | — |

*The numerical values in the table represent the blending amounts of the respective materials in the unit of part(s) by mass.
*The respective materials shown in the table are as described below.
"PTGL1000": product name; manufactured by Hodogaya Chemical Co., Ltd., polyol.
"PTGL3500": product name; manufactured by Hodogaya Chemical Co., Ltd., polyol.
"MR-400" ("Millionate MR-400"): product name; manufactured by Tosoh Corporation, isocyanate compound (Polymeric MDI).
"ME-8115LP" ("RESAMINE ME-8115LP"): product name; manufactured by Dainichiseika Color & Chemicals Mfg. Co., Ltd., thermoplastic urethane resin.
"SUNBLACK XI5": product name; manufactured by Asahi Carbon Co., Ltd., carbon black, volatile content = 2.1%.
"MSP-013": product name; manufactured by Tayca Corporation, hydrophobized silica.
"50HB-100" ("NEWPOL 50HB-100"): product name; manufactured by Sanyo Chemical Industries, Ltd., monool (poly(oxyethylene-oxypropylene) glycol monobutyl ether, molecular weight Mn = 510).
"TSF4445": product name; manufactured by Momentive Performance Materials Japan LLC, modified silicone compound.
"MEGAFACE F-430": product name; manufactured by DIC Corporation, modified fluorine compound.
"Ionic compound I": ionic compound I obtained by the synthesis method described in the above-mentioned section (ionic compound I).
Surface modification agent A: surface modification agent A described in Examples of Japanese Patent Application Laid-Open No. 2017-049282.
UCN-5090 ("DAIMICBEAZ UCN-5090"): product name; manufactured by Dainichiseika Color & Chemicals Mfg. Co., Ltd., crosslinked urethane resin particles, average particle diameter: 9 μm.
UCN-5070 ("DAIMICBEAZ UCN-5070"): product name; manufactured by Dainichiseika Color & Chemicals Mfg. Co., Ltd., crosslinked urethane resin particles, average particle diameter: 7 μm.
UCN-5150 ("DAIMICBEAZ UCN-5150"): product name; manufactured by Dainichiseika Color & Chemicals Mfg. Co., Ltd., crosslinked urethane resin particles, average particle diameter: 15 μm.
C-200 ("ART PEARL C-200 transparent"): product name; manufactured by Negami Chemical Industrial Co., Ltd., crosslinked urethane resin particles, average particle diameter: 32 μm.
C-1000 ("ART PEARL C-1000 transparent"): product name; manufactured by Negami
Chemical Industrial Co., Ltd., crosslinked urethane resin particles, average particle diameter: 3 μm.
CE-300TH ("ART PEARL CE-300TH"): product name; manufactured by Negami Chemical Industrial Co., Ltd., crosslinked urethane resin particles, average particle diameter: 23 μm.

TABLE 5

| | | Number of impregnation treatment liquid | | | | | |
|---|---|---|---|---|---|---|---|
| Classification | Material name | 1 | 2 | 3 | 4 | 5 | 6 |
| Acrylic monomer | EBECRYL 145 | 5 | — | — | — | — | — |
| | TMPTA | — | 1 | — | — | — | — |
| | EBECRYL 11 | — | — | 5 | — | — | — |
| | Pentaerythritol triacrylate | — | — | — | 23.8 | — | — |
| | NK Ester 9 G | — | — | — | — | 5 | — |
| | NK Ester 14 G | — | — | — | — | — | 5 |
| Acrylic polymer | Photopolymerizable polymer A solution (20 mass % solution) | — | — | — | 1.19 | — | — |
| Initiator | IRGACURE 184 | 0.25 | 0.25 | 0.25 | 1.19 | 0.25 | 0.25 |
| Solvent | Methyl ethyl ketone | 100 | 100 | 100 | 100 | 100 | 100 |

*The numerical values in the table represent the blending amounts of the respective materials in the unit of part(s) by mass.
*The respective materials shown in the table are as described below.
EBECRYL 145: product name, manufactured by Daicel-Allnex Ltd., bifunctional acrylic monomer
TMPTA: product name, manufactured by Daicel-Allnex Ltd., trifunctional acrylic monomer
EBECRYL 11: product name, manufactured by Daicel-Allnex Ltd., bifunctional acrylic monomer
Pentaerythritol triacrylate: manufactured by Shin-Nakamura Chemical Co., Ltd., trifunctional acrylic monomer
NK Ester 9 G: product name, manufactured by Shin-Nakamura Chemical Co., Ltd., bifunctional acrylic monomer
NK Ester 14 G: product name, manufactured by Shin-Nakamura Chemical Co., Ltd., bifunctional acrylic monomer
Photopolymerizable polymer A solution (20 mass % solution): photopolymerizable acrylic polymer described in Examples of Japanese Patent Application Laid-Open No. 2014-197064
IRGACURE 184: product name, manufactured by BASF SE, photopolymerization initiator

TABLE 6

| | Resin layer | Impregnation treatment |
|---|---|---|
| Developing roller 1 | Coating material 1 for resin layer | Impregnation treatment liquid 1 |
| Developing roller 2 | Coating material 2 for resin layer | Impregnation treatment liquid 1 |
| Developing roller 3 | Coating material 3 for resin layer | Impregnation treatment liquid 2 |
| Developing roller 4 | Coating material 2 for resin layer | Impregnation treatment liquid 2 |
| Developing roller 5 | Coating material 8 for resin layer | Impregnation treatment liquid 1 |
| Developing roller 6 | Coating material 1 for resin layer | Impregnation treatment liquid 5 |
| Developing roller 7 | Coating material 1 for resin layer | Impregnation treatment liquid 6 |
| Developing roller 8 | Coating material 10 for resin layer | Impregnation treatment liquid 1 |
| Developing roller 9 | Coating material 6 for resin layer | Impregnation treatment liquid 1 |
| Developing roller 10 | Coating material 7 for resin layer | Impregnation treatment liquid 1 |

TABLE 6-continued

| | Resin layer | Impregnation treatment |
|---|---|---|
| Developing roller 11 | Coating material 1 for resin layer | Impregnation treatment liquid 1 |
| Developing roller 12 | Coating material 1 for resin layer | Impregnation treatment liquid 1 |
| Developing roller 13 | Coating material 12 for resin layer | Impregnation treatment liquid 1 |
| Developing roller 14 | Coating material 13 for resin layer | Impregnation treatment liquid 1 |
| Developing roller 15 | Coating material 14 for resin layer | Impregnation treatment liquid 1 |
| Developing roller 16 | Coating material 15 for resin layer | Impregnation treatment liquid 2 |
| Developing roller 17 | Coating material 16 for resin layer | Impregnation treatment liquid 2 |
| Developing roller 18 | Coating material 17 for resin layer | Impregnation treatment liquid 2 |
| Developing roller 19 | Coating material 4 for resin layer | Impregnation treatment liquid 1 |
| Developing roller 20 | Coating material 4 for resin layer | Impregnation treatment liquid 3 |
| Developing roller 21 | Coating material 4 for resin layer | Impregnation treatment liquid 2 |
| Developing roller 22 | Coating material 5 for resin layer | Impregnation treatment liquid 3 |
| Developing roller 23 | Coating material 4 for resin layer | Impregnation treatment liquid 4 |
| Developing roller 24 | Coating material 9 for resin layer | Impregnation treatment liquid 1 |
| Developing roller 25 | Coating material 1 for resin layer | — |
| Developing roller 26 | Coating material 11 for resin layer | — |

Next, toners to be used in Examples were produced in accordance with the following procedures. The production examples of those toners are in conformity with Examples and Comparative Examples of Japanese Patent Application Laid-Open No. 2018-194837.

[Production of Toner]

(Toner 1)

<Step of Preparing Aqueous Medium 1>

14.0 Parts of sodium phosphate (dodecahydrate) (manufactured by Rasa Industries, Ltd.) was loaded into 1,000.0 parts of ion-exchanged water in a reaction vessel, and the temperature was held at 65° C. for 1.0 hour while the reaction vessel was purged with nitrogen.

Under stirring with T.K. Homomixer (manufactured by Tokushu Kika Kogyo Co., Ltd.) at 12,000 rpm, an aqueous solution of calcium chloride obtained by dissolving 9.2 parts of calcium chloride (dihydrate) in 10.0 parts of ion-exchanged water was collectively loaded to prepare an aqueous medium containing a dispersion stabilizer. Further, 10 mass % hydrochloric acid was loaded into the aqueous medium to adjust its pH to 5.0. Thus, an aqueous medium 1 was obtained.

<Step of Preparing Polymerizable Monomer Composition>

| Styrene | 60.0 parts |
|---|---|
| C.I. Pigment Blue 15:3 | 6.5 parts |

The materials were loaded into an attritor (manufactured by Mitsui Miike Chemical Engineering Machinery Co.,

TABLE 7

| Name | E1 (MPa) | E3 (MPa) | E2 (MPa) | (E1-E3)/E3 | A1 | A2 | T1 | T3 | T2 | T1-T2 | T1-T3 | T3-T2 | Film thickness (m) |
|---|---|---|---|---|---|---|---|---|---|---|---|---|---|
| Developing roller 1 | 350 | 100 | 40 | 2.50 | 395.0 | 392.0 | 382.3 | 378.6 | 378.3 | 4.0 | 3.7 | 0.3 | 15 |
| Developing roller 2 | 370 | 80 | 25 | 3.63 | 395.0 | 392.0 | 382.6 | 378.5 | 378.2 | 4.4 | 4.1 | 0.3 | 15 |
| Developing roller 3 | 210 | 50 | 10 | 3.20 | 394.0 | 391.0 | 382.2 | 378.4 | 377.8 | 4.4 | 3.8 | 0.6 | 15 |
| Developing roller 4 | 1,100 | 340 | 100 | 2.24 | 397.0 | 394.0 | 386.5 | 382.4 | 378.6 | 7.9 | 4.1 | 3.8 | 15 |
| Developing roller 5 | 400 | 70 | 25 | 4.71 | 395.3 | 392.3 | 382.7 | 378.5 | 378.2 | 4.5 | 4.2 | 0.3 | 15 |
| Developing roller 6 | 220 | 65 | 37 | 2.38 | 393.9 | 390.9 | 382.2 | 378.5 | 378.2 | 4.0 | 3.7 | 0.3 | 15 |
| Developing roller 7 | 200 | 55 | 30 | 2.64 | 393.7 | 390.9 | 382.1 | 378.4 | 378.2 | 3.9 | 3.7 | 0.2 | 15 |
| Developing roller 8 | 370 | 80 | 25 | 3.63 | 395.0 | 392.0 | 382.6 | 378.5 | 378.2 | 4.4 | 4.1 | 0.3 | 15 |
| Developing roller 9 | 370 | 80 | 25 | 3.63 | 395.0 | 392.0 | 382.6 | 378.5 | 378.2 | 4.4 | 4.1 | 0.3 | 15 |
| Developing roller 10 | 370 | 80 | 25 | 3.63 | 395.0 | 392.0 | 382.6 | 378.5 | 378.2 | 4.4 | 4.1 | 0.3 | 15 |
| Developing roller 11 | 350 | 100 | 40 | 2.50 | 395.0 | 392.0 | 382.3 | 378.6 | 378.3 | 4.0 | 3.7 | 0.3 | 5 |
| Developing roller 12 | 350 | 100 | 40 | 2.50 | 395.0 | 392.0 | 382.3 | 378.6 | 378.3 | 4.0 | 3.7 | 0.3 | 30 |
| Developing roller 13 | 370 | 80 | 25 | 3.63 | 395.0 | 392.0 | 382.6 | 378.5 | 378.2 | 4.4 | 4.1 | 0.3 | 15 |
| Developing roller 14 | 370 | 80 | 25 | 3.63 | 395.0 | 392.0 | 382.6 | 378.5 | 378.2 | 4.4 | 4.1 | 0.3 | 15 |
| Developing roller 15 | 372 | 82 | 27 | 3.54 | 395.0 | 392.0 | 382.6 | 378.5 | 378.2 | 4.4 | 4.1 | 0.3 | 15 |
| Developing roller 16 | 211 | 52 | 12 | 3.08 | 394.0 | 391.0 | 382.2 | 378.4 | 377.8 | 4.4 | 3.8 | 0.6 | 15 |
| Developing roller 17 | 211 | 52 | 12 | 3.08 | 394.0 | 391.0 | 382.2 | 378.4 | 377.8 | 4.4 | 3.8 | 0.6 | 15 |
| Developing roller 18 | 213 | 54 | 14 | 2.91 | 394.0 | 391.0 | 382.3 | 378.5 | 377.9 | 4.4 | 3.8 | 0.6 | 15 |
| Developing roller 19 | 320 | 250 | 150 | 0.28 | 394.9 | 391.9 | 382.3 | 380.0 | 379.1 | 3.2 | 2.3 | 0.9 | 15 |
| Developing roller 20 | 70 | 55 | 35 | 0.27 | 392.5 | 389.5 | 378.5 | 378.4 | 378.2 | 0.3 | 0.1 | 0.2 | 15 |
| Developing roller 21 | 1,050 | 910 | 380 | 0.15 | 397.0 | 394.0 | 386.5 | 384.0 | 382.5 | 4.0 | 2.5 | 1.5 | 15 |
| Developing roller 22 | 20 | 12 | 9 | 0.67 | 392.0 | 389.0 | 378.0 | 377.8 | 377.6 | 0.4 | 0.2 | 0.2 | 15 |
| Developing roller 23 | 4,500 | 4,500 | 4,500 | 0.00 | 395.0 | 395.0 | — | — | 390.0 | — | — | — | 15 |
| Developing roller 24 | 25 | 25 | 25 | 0.00 | 393.0 | 393.0 | 366.0 | 366.0 | 366.0 | 0.0 | 0.0 | 0.0 | 15 |
| Developing roller 25 | 20 | 20 | 20 | 0.00 | — | — | 378.0 | 378.0 | 378.0 | 0.0 | 0.0 | 0.0 | 15 |
| Developing roller 26 | 20 | 20 | 20 | 0.00 | — | — | 378.0 | 378.0 | 378.0 | 0.0 | 0.0 | 0.0 | 15 |

*The fact that the peak top temperatures T1 and T3 of the thermal chromatograms derived from the crosslinked urethane resin were not obtained for the developing roller 23 may show that the first region and the third region each mainly include the crosslinked acrylic resin.

Ltd.), and were dispersed with zirconia particles each having a diameter of 1.7 mm at 220 rpm for 5.0 hours to prepare a pigment-dispersed liquid. The following materials were added to the pigment-dispersed liquid.

| | |
|---|---|
| Styrene | 20.0 parts |
| n-Butyl acrylate | 20.0 parts |
| Methyltriethoxysilane | 8.0 parts |
| Crosslinking agent (divinylbenzene) | 0.3 part |
| Saturated polyester resin | 5.0 parts |

(polycondensate of propylene oxide-modified bisphenol A (2-mol adduct) and terephthalic acid (molar ratio: 10:12), glass transition temperature Tg=68° C., weight-average molecular weight Mw=10,000, molecular weight distribution Mw/Mn=5.12)

| | |
|---|---|
| Fischer-Tropsch wax (melting point: 78° C.) | 7.0 parts |

The materials were kept at 65° C., and were uniformly dissolved and dispersed with T.K. Homomixer (manufactured by Tokushu Kika Kogyo Co., Ltd.) at 500 rpm. Thus, a polymerizable monomer composition was prepared.

<Granulation Step>

While the temperature of the aqueous medium 1 was kept at 70° C. and the number of revolutions of T.K. Homomixer was kept at 12,000 rpm, the polymerizable monomer composition was loaded into the aqueous medium 1, and 9.0 parts of t-butyl peroxypivalate serving as a polymerization initiator was added to the mixture. The resultant was granulated as it was with the stirring machine for 10 minutes while the number of revolutions was maintained at 12,000 rpm.

<Polymerization Step>

After the granulation step, the stirring machine was changed to a propeller stirring blade, and polymerization was performed for 5.0 hours by holding the temperature of the granulated product at 70° C. while stirring the granulated product at 150 rpm. The temperature was increased to 85° C., and a polymerization reaction was performed by heating the resultant for 2.0 hours. Thus, core particles were obtained. The temperature of a slurry containing the core particles was cooled to 70° C., and the pH thereof was measured. After that, an aqueous solution of sodium hydroxide was used to adjust the pH of the slurry to 9.0 for completing the condensation thereof, followed by further holding for 300 minutes. Thus, surface layers were formed on the core particles to provide toner particles.

<Washing and Drying Step>

After the completion of the polymerization step, the slurry of the toner particles was cooled, and hydrochloric acid was added to the slurry of the toner particles to adjust its pH to 1.5 or less. The mixture was stirred and left to stand for 1 hour, and was then subjected to solid-liquid separation with a pressure filter to provide a toner cake. The cake was reslurried with ion-exchanged water to provide a dispersed liquid again, and then the liquid was subjected to solid-liquid separation with the above-mentioned filter. Reslurrying and solid-liquid separation were repeated until the electrical conductivity of the filtrate became 5.0 µS/cm or less. After that, the resultant was finally subjected to solid-liquid separation to provide a toner cake.

The resultant toner cake was dried with a flash dryer FLASH JET DRYER (manufactured by Seishin Enterprise Co., Ltd.), and fine powder and coarse powder were discarded with a multidivision classifier utilizing the Coanda effect. Thus, toner particles 1 were obtained. Conditions for the drying were as follows: a blowing temperature was 90° C., a dryer outlet temperature was 40° C., and the rate at which the toner cake was supplied was adjusted in accordance with the water content of the toner cake to such a rate that the outlet temperature did not deviate from 40° C.

The resultant toner particles 1 were used as they were as a toner 1 without any external addition.

Methods for evaluations performed for the toner are described below.

<Measurement of Martens Hardness>

Measurement was performed by the method described in the section "Description of Embodiments." The result is shown in Table 8.

(Toner 2)

A toner 2 was produced by the same method as the method of producing the toner 1 except that the number of parts of methyltriethoxysilane to be added in the "step of preparing the polymerizable monomer composition" in the method of producing the toner 1 was changed to 30 parts. The Martens hardness of the resultant toner 2 was measured by the same method as that of the toner 1. The measurement result is shown in Table 8.

(Toner 3)

A toner 3 was produced by the same method as the method of producing the toner 1 except that the following changes were made in the method of producing the toner 1:
 methyltriethoxysilane was not added in the "step of preparing the polymerizable monomer composition";
 the following "step of hydrolyzing an organosilicon compound for a surface layer" was added after the "step of preparing the aqueous medium 1"; and
 the "polymerization step" was changed to the following contents.

The Martens hardness of the resultant toner 3 was measured by the same method as that of the toner 1. The measurement result is shown in Table 8.

<Step of Hydrolyzing Organosilicon Compound for Surface Layer>

60.0 Parts of ion-exchanged water was weighed in a reaction vessel including a stirring machine and a temperature gauge, and its pH was adjusted to 3.0 with 10 mass % hydrochloric acid. The resultant was heated while being stirred so that its temperature reached 70° C. After that, 40.0 parts of methyltriethoxysilane serving as an organosilicon compound for a surface layer was added to the resultant, and the mixture was stirred for 2 hours or more so that methyltriethoxysilane was hydrolyzed. When it was visually observed that oil and water did not separate from each other but formed one layer, the hydrolysis was regarded as having reached its endpoint. The hydrolyzed product was cooled to provide a hydrolyzed liquid of the organosilicon compound for a surface layer.

<Polymerization Step>

After the granulation step, the stirring machine was changed to a propeller stirring blade, and polymerization was performed for 5.0 hours by holding the temperature of the granulated product at 70° C. while stirring the granulated product at 150 rpm. The temperature was increased to 85° C., and a polymerization reaction was performed by heating the resultant for 2.0 hours. Thus, core particles were obtained. The temperature of a slurry containing the core particles was cooled to 70° C., and the pH thereof was measured. As a result, the pH was 9.0. While the stirring was continued at 70° C., 20.0 parts of the hydrolyzed liquid of the organosilicon compound for a surface layer was added to start the formation of the surface layer of the toner. Immediately after that, an aqueous solution of sodium hydroxide was used to adjust the pH of the slurry to 9.0 for completing the condensation thereof, followed by further holding for 300 minutes. Thus, surface layers were formed.

(Toner 4)

A toner 4 was produced by the same method as the method of producing the toner 3 except that the "polymerization step" in the method of producing the toner 3 was changed to the following contents. The Martens hardness of the resultant toner 4 was measured by the same method as that of the toner 1. The measurement result is shown in Table 8.

<Polymerization Step>

After the granulation step, the stirring machine was changed to a propeller stirring blade, and polymerization was performed for 5.0 hours by holding the temperature of the granulated product at 70° C. while stirring the granulated product at 150 rpm. The temperature was increased to 85° C., and a polymerization reaction was performed by heating the resultant for 2.0 hours. Thus, core particles were obtained. The temperature of a slurry containing the core particles was cooled to 40° C., and the pH thereof was measured. As a result, the pH was 5.0. While the stirring was continued at 40° C., 20.0 parts of the hydrolyzed liquid of the organosilicon compound for a surface layer was added to start the formation of the surface layer of the toner. After the resultant was kept as it was for 90 minutes, an aqueous solution of sodium hydroxide was used to adjust the pH of the slurry to 9.0 for completing the condensation thereof, followed by further holding for 300 minutes. Thus, surface layers were formed.

(Toner 5)

<Production Example of Binder Resin 1>

| Terephthalic acid | 25.0 mol % |
| Adipic acid | 13.0 mol % |
| Trimellitic acid | 8.0 mol % |
| Propylene oxide-modified bisphenol A (2.5-mol adduct) | 33.0 mol % |
| Ethylene oxide-modified bisphenol A (2.5-mol adduct) | 21.0 mol % |

100 Parts of the total of the above-mentioned acid components and alcohol components, and 0.02 part of tin 2-ethylhexanoate serving as an esterification catalyst were loaded into a four-necked flask serving as a reaction vessel to perform a reaction. At that time, the four-necked flask was mounted with a decompression device, a water-separating device, a nitrogen gas-introducing device, a temperature-measuring device, and a stirring device, and the reaction was performed under a nitrogen atmosphere while the temperature of the mixture was increased to 230° C. After the completion of the reaction, the product was removed from the reaction vessel, and was cooled and pulverized to provide a binder resin 1.

<Production Example of Binder Resin 2>

A binder resin 2 was produced by the same method as that of the binder resin 1 except that the monomer composition ratio and the reaction temperature were changed as described below.

| Terephthalic acid | 50.0 mol % |
| Trimellitic acid | 3.0 mol % |
| Propylene oxide-modified bisphenol A (2.5-mol adduct) | 47.0 mol % |
| Reaction temperature: | 190° C. |

<Production Example of Toner 5>

| Binder resin 1 | 70.0 parts |
| Binder resin 2 | 30.0 parts |
| C.I. Pigment Blue 15:3 | 7.2 parts |
| Magnetic iron oxide particles (number-average particle diameter: 0.14 μm, Hc = 11.5 kA/m, σs = 84.0 Am²/kg, σr = 16.0 Am²/kg) | 90.0 parts |
| Fischer-Tropsch wax (melting point: 105° C.) | 2.0 parts |
| Charge control agent 1 (the following structural formula) | 2.0 parts |

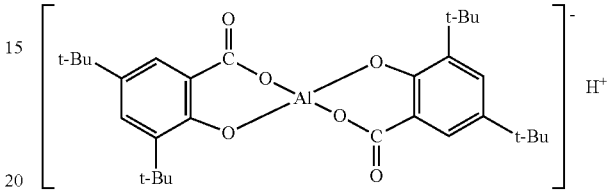

where tBu represents a tert-butyl group.

Figure 6:
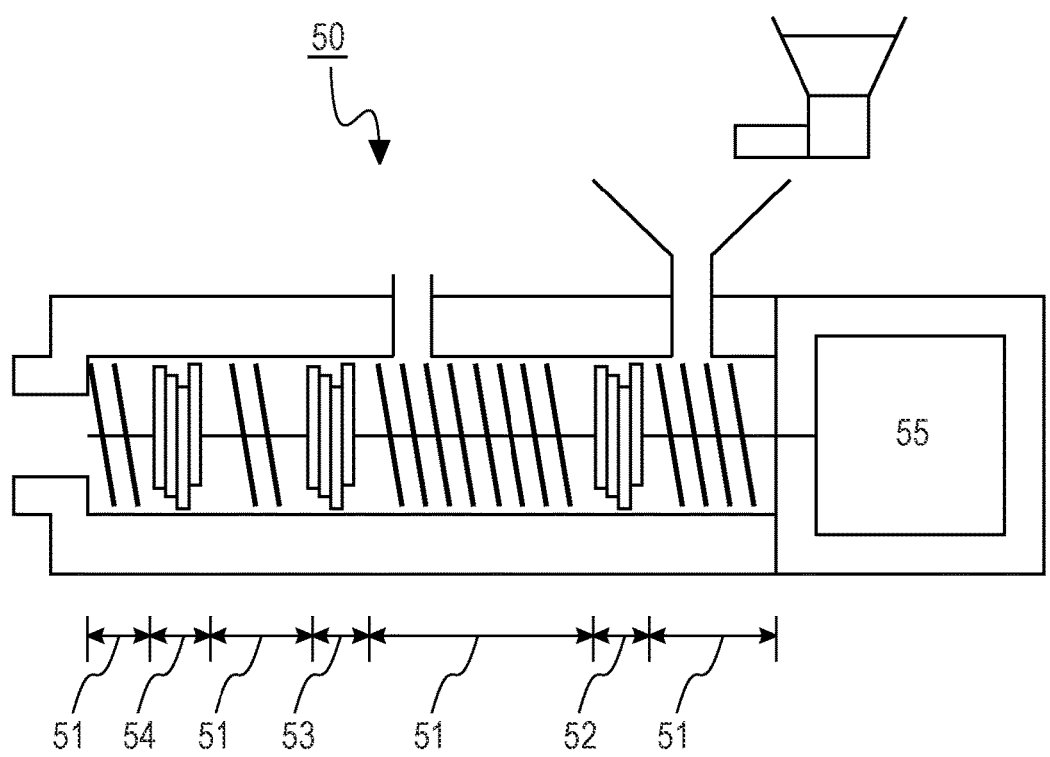
FIG. 6 is a schematic view of a biaxial kneading extruder used in the production of a toner 5.

The above-mentioned materials were premixed with a Henschel mixer, and were then melted and kneaded with such a biaxial kneading extruder 50 including three kneading portions and a screw portion 51 as illustrated in FIG. 6. At this time, the materials were melted and kneaded while the following setting was performed: the heating temperature of a first kneading portion 52 near the supply port of the extruder was set to 110° C.; the heating temperature of a second kneading portion 53 was set to 130° C.; the heating temperature of a third kneading portion 54 was set to 150° C.; and the number of revolutions of a paddle was adjusted to 200 rpm with a motor 55. The resultant kneaded product was cooled and coarsely pulverized with a hammer mill, and was then pulverized with a fine pulverizer using a jet stream. The resultant finely pulverized powder was classified with a multidivision classifier utilizing the Coanda effect to provide toner particles having a weight-average particle diameter of 7.0 μm.

1.0 Part of hydrophobic silica fine powder (BET specific surface area: 140 m²/g, surface treatment: silane coupling treatment and silicone oil treatment, degree of hydrophobicity: 78%) and 3.0 parts of strontium titanate (D50; 1.2 μm) were externally added to and mixed with 100 parts of the toner particles obtained in the foregoing, and the mixture was sieved with a mesh having an aperture of 150 μm to provide a toner 5. The Martens hardness of the resultant toner 5 was measured by the same method as that of the toner 1. The measurement result is shown in Table 8.

(Toner 6)

A toner 6 was produced by the same method as the method of producing the toner 3 except that the "polymerization step" was changed to the following contents in the method of producing the toner 3. The Martens hardness of the resultant toner 6 was measured by the same method as that of the toner 1. The measurement result is shown in Table 8.

<Polymerization Step>

After the granulation step, the stirring machine was changed to a propeller stirring blade, and polymerization was performed for 5.0 hours by holding the temperature of the granulated product at 70° C. while stirring the granulated product at 150 rpm. The temperature was increased to 85° C., and a polymerization reaction was performed by heating the resultant for 2.0 hours. Thus, core particles were obtained. The temperature of a slurry containing the core particles was cooled to 40° C., and the pH thereof was measured. As a result, the pH was 5.0. While the stirring was continued at 35° C., 20.0 parts of the hydrolyzed liquid of the organosilicon compound for a surface layer was added to start the formation of the surface layer of the toner. After the resultant was kept as it was for 150 minutes, an aqueous solution of sodium hydroxide was used to adjust the pH of the slurry to 9.0 for completing the condensation thereof, followed by further holding for 300 minutes. Thus, surface layers were formed.

Example 1

The developing roller 1 and the toner 1 were mounted on a process cartridge for a color laser printer (product name: HP Color LaserJet Enterprise M652dn, manufactured by Hewlett-Packard Company), and the process cartridge was left to stand under a high-temperature and high-humidity environment at a temperature of 30° C. and a relative humidity of 95% for 16 hours. After that, to perform an evaluation in printing on an extremely large number of sheets under the environment, a low-print percentage image having a print percentage of 0.2% was continuously output on 300,000 sheets of recording paper. However, the toner was consumed by the printing, and hence every time the image was output on 50,000 sheets, toner replenishment was performed so that the weight of the toner in the process cartridge became 100 g.

After that, the following evaluations (a flaw evaluation, a filming evaluation, a development stripe evaluation, a ghost evaluation, and a fogging evaluation) were performed. The results of the evaluations are shown in Table 8.

A cyan cartridge (product name: HP 656X High Yield Cyan Original LaserJet Toner Cartridge, manufactured by Hewlett-Packard Company) for the color laser printer was used in the evaluations.

<Durability Evaluation>
(Flaw Evaluation)

After the completion of the above-mentioned printing on 300,000 sheets, the developing roller was removed from the process cartridge, and air was blown against the surface of the roller to remove the toner coating the surface. The surface state of the roller was visually observed and evaluated by the following criteria.

Evaluation Criteria
Rank "A": No flaw due to shaving can be observed on the surface.
Rank "B": A flaw can be observed, but even the largest flaw has a length of less than 1 mm.
Rank "C": The occurrence of a flaw having a length of 1 mm or more can be observed.

A rank equal to or higher than the rank "B" was judged to be satisfactory.

(Filming Evaluation)

After the completion of the above-mentioned printing on 300,000 sheets, the developing roller was removed from the process cartridge, and air was blown against the surface of the roller to remove the toner coating the surface. The surface state of the roller was observed with a laser microscope (product name: VK-8700, manufactured by Keyence Corporation) and an objective lens having a magnification of 20, and the state of filming was evaluated by the following criteria.

Evaluation Criteria
Rank "A": The ratio of the area of the sticking toner to the total surface area of the roller is 10% or less.
Rank "B": The ratio of the area of the sticking toner to the total surface area of the roller is more than 10% and 20% or less.
Rank "C": The ratio of the area of the sticking toner to the total surface area of the roller is more than 20%.

A rank equal to or higher than the rank "B" was judged to be satisfactory.

(Development Stripe Evaluation)

After the completion of the above-mentioned printing on 300,000 sheets, a halftone image (toner laid-on level: 0.2 mg/cm$^2$) was printed out on LETTER SIZE XEROX 4200 PAPER (manufactured by Xerox Corporation, basis weight: 75 g/m$^2$), and a development stripe was evaluated.

Evaluation Criteria
Rank "A": No vertical stripe in a sheet-discharging direction is observed on each of the developing roller and the image.
Rank "B": Five or less thin stripes in a circumferential direction are observed at both the ends of the developing roller. Alternatively, a vertical stripe in the sheet-discharging direction is slightly observed on the image.
Rank "C": Six or more thin stripes in the circumferential direction are observed at both the ends of the developing roller. Alternatively, six or more fine stripes are observed on the image.

A rank equal to or higher than the rank "B" was judged to be satisfactory.

(Ghost Evaluation)

After the completion of the above-mentioned printing on 300,000 sheets, an image formed by the repetition of a solid image vertical line and a solid white vertical line each having a width of 3 cm was continuously printed on 10 sheets. After that, a halftone image was printed on 1 sheet, and the history of the previous image remaining on the image was visually judged. The image density of the halftone image was adjusted as follows: the reflection density thereof was measured with a Macbeth densitometer (manufactured by Macbeth) and an SPI filter; and the reflection density was adjusted to 0.4.

Evaluation Criteria
Rank "A": No ghost occurs.
Rank "B": A slight history of the previous image can be visually observed on part of the image.
Rank "C": The history of the previous image can be visually observed.

A rank equal to or higher than the rank "B" was judged to be satisfactory.

(Fogging Evaluation)

After the completion of the above-mentioned printing on 300,000 sheets, the process cartridge was left to stand under a high-temperature and high-humidity environment at a temperature of 30° C. and a relative humidity of 95% for 1 day. After that, a white solid image was output on 1 sheet and its fogging (%) was measured. Specifically, the reflection densities of the printed portion and nonprinted portion of the solid white image were measured with a white photometer TC-60DS/A (product name, manufactured by Tokyo Denshoku Co., Ltd.), and a difference between the densities was evaluated as the fogging (%) as described below.

Evaluation Criteria
Rank "A": 1.5% or less
Rank "B": More than 1.5% and less than 3.5%
Rank "C": 3.5% or more A rank equal to or higher than the rank "B" was judged to be satisfactory.

Examples 2 to 72 and Comparative Examples 1 to 68

Evaluations were performed by the same methods as those of Example 1 except that the developing rollers and the toners were used in accordance with combinations shown in Tables 8 to 11. The results of the evaluations are shown in Tables 8 to 11.

TABLE 8

| | Developer carrying member Name | Developer Name | Developer Martens hardness (MPa) | Evaluation result Flaw | Filming | Development stripe | Ghost | Fogging |
|---|---|---|---|---|---|---|---|---|
| Example 1 | Developing roller 1 | Toner 1 | 89 | A | A | B | B | B |
| Example 2 | | Toner 2 | 153 | A | A | B | B | B |
| Example 3 | | Toner 3 | 203 | A | A | A | A | A |
| Example 4 | | Toner 4 | 1,092 | A | A | A | A | A |
| Example 5 | Developing roller 2 | Toner 1 | 89 | A | A | B | B | B |
| Example 6 | | Toner 2 | 153 | A | A | B | B | B |
| Example 7 | | Toner 3 | 203 | A | A | A | A | A |
| Example 8 | | Toner 4 | 1,092 | A | A | A | A | A |
| Example 9 | Developing roller 3 | Toner 1 | 89 | B | A | B | B | B |
| Example 10 | | Toner 2 | 153 | B | A | B | B | B |
| Example 11 | | Toner 3 | 203 | B | A | A | A | A |
| Example 12 | | Toner 4 | 1,092 | B | A | A | A | A |
| Example 13 | Developing roller 4 | Toner 1 | 89 | A | B | B | B | B |
| Example 14 | | Toner 2 | 153 | A | B | B | B | B |
| Example 15 | | Toner 3 | 203 | A | B | A | A | A |
| Example 16 | | Toner 4 | 1,092 | A | B | A | A | A |
| Example 17 | Developing roller 5 | Toner 1 | 89 | A | B | B | B | B |
| Example 18 | | Toner 2 | 153 | A | B | B | B | B |
| Example 19 | | Toner 3 | 203 | A | B | A | A | A |
| Example 20 | | Toner 4 | 1,092 | A | B | A | A | A |
| Example 21 | Developing roller 6 | Toner 1 | 89 | A | A | B | B | B |
| Example 22 | | Toner 2 | 153 | A | A | B | B | B |
| Example 23 | | Toner 3 | 203 | A | A | A | A | A |
| Example 24 | | Toner 4 | 1,092 | A | A | A | A | A |
| Example 25 | Developing roller 7 | Toner 1 | 89 | B | A | B | B | B |
| Example 26 | | Toner 2 | 153 | B | A | B | B | B |
| Example 27 | | Toner 3 | 203 | B | A | A | A | A |
| Example 28 | | Toner 4 | 1,092 | B | A | A | A | A |
| Example 29 | Developing roller 8 | Toner 1 | 89 | A | A | B | B | B |
| Example 30 | | Toner 2 | 153 | A | A | B | B | B |
| Example 31 | | Toner 3 | 203 | A | A | A | A | A |
| Example 32 | | Toner 4 | 1,092 | A | A | A | A | A |

TABLE 9

| | Developer carrying member Name | Developer Name | Developer Martens hardness (MPa) | Evaluation result Flaw | Filming | Development stripe | Ghost | Fogging |
|---|---|---|---|---|---|---|---|---|
| Example 33 | Developing roller 9 | Toner 1 | 89 | A | A | B | B | B |
| Example 34 | | Toner 2 | 153 | A | A | B | B | B |
| Example 35 | | Toner 3 | 203 | A | A | A | A | A |
| Example 36 | | Toner 4 | 1,092 | A | A | A | A | A |
| Example 37 | Developing roller 10 | Toner 1 | 89 | A | A | B | B | B |
| Example 38 | | Toner 2 | 153 | A | A | B | B | B |
| Example 39 | | Toner 3 | 203 | A | A | A | A | A |
| Example 40 | | Toner 4 | 1,092 | A | A | A | A | A |
| Example 41 | Developing roller 11 | Toner 1 | 89 | A | A | B | B | B |
| Example 42 | | Toner 2 | 153 | A | A | B | B | B |
| Example 43 | | Toner 3 | 203 | A | A | A | A | A |
| Example 44 | | Toner 4 | 1,092 | A | A | A | A | A |
| Example 45 | Developing roller 12 | Toner 1 | 89 | A | A | B | B | B |
| Example 46 | | Toner 2 | 153 | A | A | B | B | B |
| Example 47 | | Toner 3 | 203 | A | A | A | A | A |
| Example 48 | | Toner 4 | 1,092 | A | A | A | A | A |
| Example 49 | Developing roller 13 | Toner 1 | 89 | A | A | B | B | B |
| Example 50 | | Toner 2 | 153 | A | A | B | B | B |
| Example 51 | | Toner 3 | 203 | A | A | A | A | A |
| Example 52 | | Toner 4 | 1,092 | A | A | A | A | A |
| Example 53 | Developing roller 14 | Toner 1 | 89 | A | A | B | B | B |
| Example 54 | | Toner 2 | 153 | A | A | B | B | B |
| Example 55 | | Toner 3 | 203 | A | A | A | A | A |
| Example 56 | | Toner 4 | 1,092 | A | A | A | A | A |

TABLE 9-continued

|  | Developer carrying member Name | Developer Name | Martens hardness (MPa) | Evaluation result |  |  |  |  |
|---|---|---|---|---|---|---|---|---|
|  |  |  |  | Flaw | Filming | Development stripe | Ghost | Fogging |
| Example 57 | Developing roller 15 | Toner 1 | 89 | A | B | B | B | B |
| Example 58 |  | Toner 2 | 153 | A | B | B | B | B |
| Example 59 |  | Toner 3 | 203 | A | B | A | A | A |
| Example 60 |  | Toner 4 | 1,092 | A | B | A | A | A |
| Example 61 | Developing roller 16 | Toner 1 | 89 | B | A | B | B | B |
| Example 62 |  | Toner 2 | 153 | B | A | B | B | B |
| Example 63 |  | Toner 3 | 203 | B | A | A | A | A |
| Example 64 |  | Toner 4 | 1,092 | B | A | A | A | A |
| Example 65 | Developing roller 17 | Toner 1 | 89 | B | A | B | B | B |
| Example 66 |  | Toner 2 | 153 | B | A | B | B | B |
| Example 67 |  | Toner 3 | 203 | B | A | A | A | A |
| Example 68 |  | Toner 4 | 1,092 | B | A | A | A | A |
| Example 69 | Developing roller 18 | Toner 1 | 89 | B | A | B | B | B |
| Example 70 |  | Toner 2 | 153 | B | A | B | B | B |
| Example 71 |  | Toner 3 | 203 | B | A | A | A | A |
| Example 72 |  | Toner 4 | 1,092 | B | A | A | A | A |

TABLE 10

|  | Developer carrying member Name | Developer Name | Martens hardness (MPa) | Evaluation result |  |  |  |  |
|---|---|---|---|---|---|---|---|---|
|  |  |  |  | Flaw | Filming | Development stripe | Ghost | Fogging |
| Comparative Example 1 | Developing roller 1 | Toner 5 | 43 | A | A | C | C | C |
| Comparative Example 2 |  | Toner 6 | 1,200 | A | A | C | B | C |
| Comparative Example 3 | Developing roller 2 | Toner 5 | 43 | A | A | C | C | C |
| Comparative Example 4 |  | Toner 6 | 1,200 | A | A | C | B | C |
| Comparative Example 5 | Developing roller 3 | Toner 5 | 43 | B | A | C | C | C |
| Comparative Example 6 |  | Toner 6 | 1,200 | B | A | C | B | C |
| Comparative Example 7 | Developing roller 4 | Toner 5 | 43 | A | B | C | C | C |
| Comparative Example 8 |  | Toner 6 | 1,200 | A | B | B | C | C |
| Comparative Example 9 | Developing roller 5 | Toner 5 | 43 | A | B | C | C | C |
| Comparative Example 10 |  | Toner 6 | 1,200 | A | B | C | B | C |
| Comparative Example 11 | Developing roller 6 | Toner 5 | 43 | A | A | C | C | C |
| Comparative Example 12 |  | Toner 6 | 1,200 | A | A | C | B | C |
| Comparative Example 13 | Developing roller 7 | Toner 5 | 43 | B | A | C | C | C |
| Comparative Example 14 |  | Toner 6 | 1,200 | B | A | C | B | C |
| Comparative Example 15 | Developing roller 8 | Toner 5 | 43 | A | A | C | C | C |
| Comparative Example 16 |  | Toner 6 | 1,200 | A | A | C | B | C |
| Comparative Example 17 | Developing roller 9 | Toner 5 | 43 | A | A | C | C | C |
| Comparative Example 18 |  | Toner 6 | 1,200 | A | A | C | B | C |
| Comparative Example 19 | Developing roller 10 | Toner 5 | 43 | A | A | C | C | C |
| Comparative Example 20 |  | Toner 6 | 1,200 | A | A | C | B | C |
| Comparative Example 21 | Developing roller 11 | Toner 5 | 43 | A | A | C | C | C |
| Comparative Example 22 |  | Toner 6 | 1,200 | A | A | C | B | C |

TABLE 10-continued

|  | Developer carrying member Name | Developer Name | Martens hardness (MPa) | Flaw | Filming | Development stripe | Ghost | Fogging |
|---|---|---|---|---|---|---|---|---|
| Comparative Example 23 | Developing roller 12 | Toner 5 | 43 | A | A | C | C | C |
| Comparative Example 24 |  | Toner 6 | 1,200 | A | A | C | B | C |
| Comparative Example 25 | Developing roller 13 | Toner 5 | 43 | A | A | C | C | C |
| Comparative Example 26 |  | Toner 6 | 1,200 | A | A | C | B | C |
| Comparative Example 27 | Developing roller 14 | Toner 5 | 43 | A | A | C | C | C |
| Comparative Example 28 |  | Toner 6 | 1,200 | A | A | C | B | C |
| Comparative Example 29 | Developing roller 15 | Toner 5 | 43 | A | B | C | C | C |
| Comparative Example 30 |  | Toner 6 | 1,200 | A | B | C | B | C |
| Comparative Example 31 | Developing roller 16 | Toner 5 | 43 | A | A | C | C | C |
| Comparative Example 32 |  | Toner 6 | 1,200 | A | A | C | B | C |
| Comparative Example 33 | Developing roller 17 | Toner 5 | 43 | A | A | C | C | C |
| Comparative Example 34 |  | Toner 6 | 1,200 | A | A | C | B | C |
| Comparative Example 35 | Developing roller 18 | Toner 5 | 43 | A | A | C | C | C |
| Comparative Example 36 |  | Toner 6 | 1,200 | A | A | C | B | C |

TABLE 11

|  | Developer carrying member Name | Developer Name | Martens hardness (MPa) | Flaw | Filming | Development stripe | Ghost | Fogging |
|---|---|---|---|---|---|---|---|---|
| Comparative Example 37 | Developing roller 19 | Toner 5 | 43 | A | C | C | C | C |
| Comparative Example 38 |  | Toner 1 | 89 | C | B | C | C | C |
| Comparative Example 39 |  | Toner 4 | 1,092 | C | A | B | B | C |
| Comparative Example 40 |  | Toner 6 | 1,200 | C | A | C | B | C |
| Comparative Example 41 | Developing roller 20 | Toner 5 | 43 | C | B | C | C | C |
| Comparative Example 42 |  | Toner 1 | 89 | C | B | C | C | C |
| Comparative Example 43 |  | Toner 4 | 1,092 | C | A | B | B | C |
| Comparative Example 44 |  | Toner 6 | 1,200 | C | A | C | B | C |
| Comparative Example 45 | Developing roller 21 | Toner 5 | 43 | A | C | C | C | C |
| Comparative Example 46 |  | Toner 1 | 89 | C | B | C | C | C |
| Comparative Example 47 |  | Toner 4 | 1,092 | C | B | B | B | C |
| Comparative Example 48 |  | Toner 6 | 1,200 | C | B | C | B | C |
| Comparative Example 49 | Developing roller 22 | Toner 5 | 43 | C | A | C | C | C |
| Comparative Example 50 |  | Toner 1 | 89 | C | A | C | C | C |
| Comparative Example 51 |  | Toner 4 | 1,092 | C | A | B | B | C |
| Comparative Example 52 |  | Toner 6 | 1,200 | C | A | C | B | C |

TABLE 11-continued

| | Developer carrying member Name | Developer Name | Developer Martens hardness (MPa) | Flaw | Filming | Development stripe | Ghost | Fogging |
|---|---|---|---|---|---|---|---|---|
| Comparative Example 53 | Developing roller 23 | Toner 5 | 43 | C | C | C | C | C |
| Comparative Example 54 | | Toner 1 | 89 | C | B | C | C | C |
| Comparative Example 55 | | Toner 4 | 1,092 | C | B | B | B | C |
| Comparative Example 56 | | Toner 6 | 1,200 | C | B | C | B | C |
| Comparative Example 57 | Developing roller 24 | Toner 5 | 43 | C | C | C | C | C |
| Comparative Example 58 | | Toner 1 | 89 | C | B | C | C | C |
| Comparative Example 59 | | Toner 4 | 1,092 | C | B | B | B | C |
| Comparative Example 60 | | Toner 6 | 1,200 | C | B | C | B | C |
| Comparative Example 61 | Developing roller 25 | Toner 5 | 43 | C | A | C | C | C |
| Comparative Example 62 | | Toner 1 | 89 | C | A | C | C | C |
| Comparative Example 63 | | Toner 4 | 1,092 | C | A | B | B | C |
| Comparative Example 64 | | Toner 6 | 1,200 | C | A | C | B | C |
| Comparative Example 65 | Developing roller 26 | Toner 5 | 43 | C | A | C | C | C |
| Comparative Example 66 | | Toner 1 | 89 | C | A | C | C | C |
| Comparative Example 67 | | Toner 4 | 1,092 | C | A | B | B | C |
| Comparative Example 68 | | Toner 6 | 1,200 | C | A | C | B | C |

[Discussion of Evaluation Results]

Examples 1 to 72 were discussed as described below.

The elastic moduli E1 and E2 of the surface layer of each of the developer carrying members of the developing rollers 1 to 18 simultaneously satisfy E1 ≥200 MP and 10 MPa≤E2≤100 MPa specified in the present disclosure. As a result, even in the durability evaluation by printing on an extremely large number of sheets in the high-temperature and high-humidity environment, the occurrence of a flaw due to shaving and the filming are suppressed.

In addition, the Martens hardness of each of the toners 1 to 4 serving as developers is 85 to 1,100 MPa when measured under the condition of a maximum load of 2.0× $10^{-4}$ N. When the toners were combined with the developing rollers 1 to 18 each simultaneously satisfying E1≥200 MP and 10 MPa≤E2≤100 MPa specified in the present disclosure, the development stripe and the ghost were satisfactorily suppressed. This is probably because of the following reason. The developing rollers each had flexibility, and hence damage to the developers were suppressed throughout the durability test. As a result, the development stripe and the ghost were satisfactorily suppressed.

Incidentally, the toners 3 and 4 each having a Martens hardness of 200 MPa or more when measured under the condition of a maximum load of 2.0×$10^{-4}$ N provided results in terms of development stripe and ghost better than those provided by the toners 1 and 2 each having a Martens hardness of less than 200 MPa. This is probably because the toners 3 and 4 were higher in strength than the toners 1 and 2 were, and hence damage thereto was suppressed.

Further, the developing rollers each had flexibility, and were hence able to be brought into contact with the toners while following the toners. Accordingly, the toners easily rolled on the rollers, and hence the rollers were each excellent in charge-imparting ability. Accordingly, satisfactory results in terms of fogging were obtained.

Accordingly, in each of Examples 1 to 72, the occurrence of a flaw due to the shaving of the developing roller and the filming were suppressed, and hence satisfactory results in terms of development stripe, ghost, and fogging performance were obtained.

Comparative Examples 1 to 36 were discussed as described below.

The elastic moduli E1 and E2 of the surface layer of each of the developer carrying members of the developing rollers 1 to 18 simultaneously satisfy the formulae E1≥200 MP and 10 MPa≤E2≤100 MPa specified in the present disclosure. As a result, even in the durability evaluation by printing on an extremely large number of sheets in the high-temperature and high-humidity environment, the occurrence of a flaw due to shaving and the filming are suppressed.

However, each of the developers of the toners 5 and 6 could not achieve both the suppressions of the development stripe and the ghost, and was poor in fogging performance because the Martens hardness of each of the toners deviated from the range specified in the present disclosure. The poor fogging performance of the toner 5 is probably due to damage by the durability test because of the weak strength of the toner. The poor fogging performance of the toner 6 is probably due to a charging failure resulting from the fact that the strength of the toner is excessively high, and hence the friction coefficient thereof is low.

Accordingly, none of Comparative Examples 1 to 36 was able to simultaneously satisfy all the evaluation items.

Comparative Examples 37 to 68 were discussed as described below.

The elastic moduli E1 and E2 of the surface layer of each of the developer carrying members of the developing rollers 19 to 26 do not simultaneously satisfy E1≥200 MP and 10 MPa≤E2≤100 MPa specified in the present disclosure. As a result, both the strength and flexibility of the surface of each of the developing rollers could not be achieved, and hence both the suppression of the occurrence of a flaw due to the shaving of the developing roller and filming performance could not be achieved.

The toners 1 and 4 cause no particular problems in practical use in terms of filming performance because their Martens hardnesses each fall within the range specified in the present disclosure. However, when a case in which the toners are combined with the developing rollers 19 to 26 is compared to a case in which the toners are combined with the developing rollers 1 to 18, the filming performance may be poor.

In addition, with regard to the fogging performance, when the developing roller 19, 21, or 23 poor in flexibility was used, the fogging performance deteriorated probably because the toners hardly rolled on the roller, and hence a charging failure occurred. In addition, when any one of the developing rollers 20, 22, and 24 to 26 was used, the fogging performance deteriorated probably because the surface of the developing roller had a low hardness and strong tackiness, and hence the toners hardly rolled on the roller, thereby causing a charging failure.

Accordingly, none of Comparative Examples 37 to 68 was able to simultaneously satisfy all the evaluation items.

The present disclosure is not limited to the embodiments described above, and various changes and modifications can be made without departing from the spirit and scope of the present disclosure. The following claims are appended hereto in order to make the scope of the present disclosure public.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A developing device comprising:
   a toner; and
   a developer carrying member configured to carry the toner on a surface thereof,
   wherein the developer carrying member includes
   an electroconductive substrate and
   a surface layer on the substrate, the surface layer being a single layer and including a matrix containing a crosslinked urethane resin as a binder, wherein
   E1≥200 MPa and 10 MPa≤E2≤100 MPa
   where E1 is an elastic modulus of the matrix in a first region from an outer surface of the surface layer to a depth of 0.1 μm, measured in a cross section of the surface layer in a thickness direction, and E2 is an elastic modulus of the matrix in a second region from a depth of 1.0 to 1.1 μm from the outer surface, measured in a cross section of the surface layer in a thickness direction, and wherein
   the toner includes a toner particle, the toner particle containing a binder resin and a colorant and having a Martens hardness of 85 to 1,100 MPa when measured under a condition of a maximum load of $2.0 \times 10^{-4}$ N.

2. The developing device according to claim 1, wherein (E1−E3)/E3>1
   where E3 is an elastic modulus of the matrix in a third region from a depth of from 0.5 to 0.6 μm from the outer surface of the surface layer, measured in the cross section in the thickness direction of the surface layer of the developer carrying member.

3. The developing device according to claim 1, wherein the surface layer of the developer carrying member contains a crosslinked acrylic resin, and the crosslinked acrylic resin constitutes an interpenetrating polymer network structure with the crosslinked urethane resin.

4. The developing device according to claim 3, wherein a monomer forming the crosslinked acrylic resin is a polyfunctional monomer having acryloyl groups or methacryloyl groups as functional groups, and a total number of presence of the acryloyl groups and the methacryloyl groups included in one molecule is 2 or 3.

5. The developing device according to claim 3, wherein A1>A2
   where A1 (° C.) is a peak top temperature of a thermal chromatogram derived from the crosslinked acrylic resin, the thermal chromatogram being measured from a first sample sampled from the first region of the surface layer, and A2 (° C.) is a peak top temperature of a thermal chromatogram derived from the crosslinked acrylic resin, the thermal chromatogram being measured from a second sample obtained by decomposing the crosslinked urethane resin contained in the first sample.

6. The developing device according to claim 1, wherein T1>T2
   where T1 (° C.) is a peak top temperature of a thermal chromatogram derived from the crosslinked urethane resin, the thermal chromatogram being measured from a first sample sampled from the first region of the surface layer, and T2 (° C.) is a peak top temperature of a thermal chromatogram derived from the crosslinked urethane resin, the thermal chromatogram being measured from a third sample sampled from the second region of the surface layer.

7. The developing device according to claim 6, wherein
   $(T1-T2)>1.0.$

8. The developing device according to claim 6, wherein T1>T3 and |T1−T3|>|T3−T2|
   where T3 (° C.) is a peak top temperature of a thermal chromatogram derived from the crosslinked urethane resin, the thermal chromatogram being measured from a fourth sample sampled from a third region from a depth of from 0.5 to 0.6 μm from the outer surface of the surface layer.

9. The developing device according to claim 1, wherein the surface layer further comprises at least one kind of a modified silicone compound and a modified fluorine compound.

10. The developing device according to claim 1, wherein the toner particle has a Martens hardness of 200 to 1,100 MPa when measured under the condition of a maximum load of $2.0 \times 10^{-4}$ N.

11. An electrophotographic process cartridge comprising a developing device, the electrophotographic process cartridge being detachably attachable to an electrophotographic image forming apparatus, the developing device comprising:
   a toner; and
   a developer carrying member configured to carry the toner on a surface thereof, wherein the developer carrying member includes an electroconductive substrate and a surface layer on the substrate, the surface layer being a single layer and including a matrix containing a cross-linked urethane resin as a binder, wherein $E1 \geq 200$ MPa and $10$ MPa $\leq E2 \leq 100$ MPa where E1 is an elastic modulus of the matrix in a first region from an outer surface of the surface layer to a depth of 0.1 μm, measured in a cross section of the surface layer in a thickness direction, and E2 is an elastic modulus of the matrix in a second region from a depth of 1.0 to 1.1 μm from the outer surface, measured in a cross section of the surface layer in a thickness direction, and wherein the toner includes a toner particle, the toner particle containing a binder resin and a colorant and having a Martens hardness of 85 to 1,100 MPa when measured under a condition of a maximum load of $2.0 \times 10^{-4}$ N.

12. An electrophotographic image forming apparatus comprising at least a developing device comprising:

a toner; and a developer carrying member configured to carry the toner on a surface thereof, wherein the developer carrying member includes an electroconductive substrate and a surface layer on the substrate, the surface layer being a single layer and including a matrix containing a cross-linked urethane resin as a binder, wherein $E1 \geq 200$ MPa and $10$ MPa $\leq E2 \leq 100$ MPa where E1 is an elastic modulus of the matrix in a first region from an outer surface of the surface layer to a depth of 0.1 measured in a cross section of the surface layer in a thickness direction, and E2 is an elastic modulus of the matrix in a second region from a depth of 1.0 to 1.1 μm from the outer surface, measured in a cross section of the surface layer in a thickness direction, and wherein the toner includes a toner particle, the toner particle containing a binder resin and a colorant and having a Martens hardness of 85 to 1,100 MPa when measured under a condition of a maximum load of $2.0 \times 10^{-4}$ N.

* * * * *